US012522655B2

(12) United States Patent
Kwan et al.

(10) Patent No.: US 12,522,655 B2
(45) Date of Patent: Jan. 13, 2026

(54) IL-23 ANTIBODY COMPOSITIONS AND METHODS OF USE

(71) Applicant: Paragon Therapeutics, Inc., Waltham, MA (US)

(72) Inventors: Byron Hua Kwan, Bothell, WA (US); Hussam Hisham Shaheen, Auburn, NH (US)

(73) Assignee: Paragon Therapeutics, Inc., Waltham, MA (US)

( * ) Notice: Subject to any disclaimer, the term of this patent is extended or adjusted under 35 U.S.C. 154(b) by 0 days.

(21) Appl. No.: 19/278,342

(22) Filed: Jul. 23, 2025

(65) Prior Publication Data
US 2025/0346660 A1     Nov. 13, 2025

Related U.S. Application Data

(63) Continuation of application No. PCT/US2025/014561, filed on Feb. 5, 2025.

(60) Provisional application No. 63/698,552, filed on Sep. 24, 2024, provisional application No. 63/550,178, filed on Feb. 6, 2024, provisional application No. 63/550,224, filed on Feb. 6, 2024, provisional application No. 63/550,173, filed on Feb. 6, 2024.

(51) Int. Cl.
*C07K 16/24*     (2006.01)

(52) U.S. Cl.
CPC ........ *C07K 16/244* (2013.01); *C07K 2317/24* (2013.01); *C07K 2317/565* (2013.01); *C07K 2317/76* (2013.01); *C07K 2317/92* (2013.01); *C07K 2317/94* (2013.01)

(58) Field of Classification Search
None
See application file for complete search history.

(56) References Cited

U.S. PATENT DOCUMENTS

| | | | |
|---|---|---|---|
| 7,872,102 B2 | 1/2011 | Beidler et al. | |
| 8,012,476 B2 | 9/2011 | Dall'Acqua et al. | |
| 8,778,346 B2 | 7/2014 | Barrett et al. | |
| 9,441,036 B2 | 9/2016 | Barrett et al. | |
| 10,059,763 B2 | 8/2018 | Barrett et al. | |
| 10,202,448 B2 | 2/2019 | Barrett et al. | |
| 10,280,231 B2 | 5/2019 | Singh et al. | |
| 10,507,241 B2 | 12/2019 | Visvanathan et al. | |
| 10,526,384 B2 | 1/2020 | Hinner et al. | |
| 11,016,099 B2 | 5/2021 | Georgantas, III et al. | |
| 11,028,166 B2 | 6/2021 | Cini et al. | |
| 11,078,265 B2 | 8/2021 | Nabozny et al. | |
| 11,168,134 B2 | 11/2021 | Alimonti et al. | |
| 11,345,728 B2 | 5/2022 | Hinner et al. | |
| 11,492,650 B2 | 11/2022 | Mandell et al. | |
| 12,098,195 B2 | 9/2024 | Liu et al. | |
| 12,319,742 B1 | 6/2025 | De Silva et al. | |
| 2012/0121597 A1 | 5/2012 | Ho et al. | |
| 2012/0282269 A1 | 11/2012 | Barrett et al. | |
| 2016/0060338 A1 * | 3/2016 | Barrett | A61P 37/06 435/69.6 |
| 2016/0222102 A1 | 8/2016 | Arndt et al. | |
| 2016/0304602 A1 | 10/2016 | Arndt et al. | |
| 2017/0022294 A1 | 1/2017 | Singh et al. | |
| 2017/0081400 A1 | 3/2017 | Poulton et al. | |
| 2017/0081402 A1 | 3/2017 | Boecher et al. | |
| 2017/0298126 A1 | 10/2017 | Baum et al. | |
| 2018/0105588 A1 | 4/2018 | Baum et al. | |
| 2019/0048078 A1 | 2/2019 | Georgiou et al. | |
| 2019/0144534 A1 | 5/2019 | Barrett et al. | |
| 2020/0299378 A1 | 9/2020 | Baum et al. | |
| 2020/0308271 A1 | 10/2020 | Baum et al. | |
| 2020/0376117 A1 | 12/2020 | Visvanathan et al. | |
| 2021/0032325 A1 | 2/2021 | Canavan et al. | |
| 2021/0070852 A1 | 3/2021 | Garidel et al. | |
| 2021/0115130 A1 | 4/2021 | Liu et al. | |
| 2021/0198355 A1 | 7/2021 | Barrett et al. | |
| 2021/0277105 A1 | 9/2021 | Gommoll et al. | |
| 2021/0317201 A1 | 10/2021 | Nabozny et al. | |
| 2022/0259301 A1 | 8/2022 | Wallace et al. | |
| 2023/0159633 A1 | 5/2023 | Germinaro et al. | |
| 2023/0173069 A1 | 6/2023 | Cao et al. | |
| 2023/0226095 A1 | 7/2023 | Chatila et al. | |
| 2024/0132558 A1 | 4/2024 | Bhandari et al. | |
| 2024/0141032 A1 | 5/2024 | Germinaro et al. | |
| 2024/0254217 A1 | 8/2024 | Krishnan et al. | |
| 2024/0391994 A1 | 11/2024 | Shan | |
| 2025/0034243 A1 | 1/2025 | Canavan et al. | |
| 2025/0101093 A1 | 3/2025 | Barrett et al. | |

FOREIGN PATENT DOCUMENTS

| | | |
|---|---|---|
| WO | 2012/061448 A1 | 5/2012 |
| WO | 2019/129261 A1 | 7/2019 |
| WO | 2023/064278 A2 | 4/2023 |
| WO | 2023051798 A1 | 4/2023 |
| WO | 2023133538 A2 | 7/2023 |

(Continued)

OTHER PUBLICATIONS

Ma (Modern Drug Discovery 2004, 7(6)) (Year: 2004).*
Steinman et al (Nat Med. Jan. 6, 2012;18(1):59-65) (Year: 2012).*
Blumberg et al (Nat Med.; 18(1): 35-41) (Year: 2015).*
Baeten et al (Front Immunol. Feb. 18, 2021;11:623874) (Year: 2021).*
McGonagle et al (Front Immunol. Mar. 19, 2021;12:614255) (Year: 2021).*
Booth, B. et al., "Extending human IgG half-life using structure-guided design," MABS, vol. 10(7):1098-1110 (2018).

(Continued)

*Primary Examiner* — Brian Gangle
*Assistant Examiner* — Andrea K Mccollum
(74) *Attorney, Agent, or Firm* — Nelson Mullins Riley & Scarborough LLP; Jane E. Remillard, Esq.; Jill Gorny Sloper, Esq.

(57) ABSTRACT

Provided herein are interleukin 23 (IL-23) binding proteins (e.g., antibodies) and methods of use.

30 Claims, 1 Drawing Sheet
Specification includes a Sequence Listing.

(56) References Cited

FOREIGN PATENT DOCUMENTS

| WO | 2023/241659 A1 | 12/2023 |
| WO | 2023244746 A1 | 12/2023 |
| WO | 2024/175031 A1 | 8/2024 |
| WO | 2024/178157 A1 | 8/2024 |
| WO | 2024263900 A2 | 12/2024 |
| WO | 2025/071362 A1 | 4/2025 |
| WO | 2025/111585 A1 | 5/2025 |
| WO | 2025137347 A1 | 6/2025 |
| WO | 2025/144089 A1 | 7/2025 |
| WO | 2025/171006 A1 | 8/2025 |

OTHER PUBLICATIONS

Dall'Acqua, W et al., "Properties of Human IgG1s Engineered for Enhanced Binding to the Neonatal Fc Receptor (FcRn)," The Journal of Biological Chemistry, vol. 281 ( 33): 23514-23524 (2006).

International Search Report and Written Opinion, PCT/US2025/014561, dated Aug. 5, 2025, 18 pages.

Kwan, B. et al., "Characterization of ORKA-001, a Novel Extended Half-life Monoclonal Antibody Targeting IL-23 for the Treatment of Psoriasis," EADV conference Jan. 17-20, 2025, Poster Presentation, 1 page.

Kwan, B. et al., "Characterization of ORKA-001, a Novel Extended Half-life Monoclonal Antibody Targeting IL-23 for the Treatment of Psoriasis," EADV conference Jan. 20-24, 2025, Poster Presentation, 1 page.

Kwan, B. et al., "Characterization of ORKA-001, a Novel Extended Half-life Monoclonal An-tibody Targeting IL-23 for the Treatment of Psoriasis," EADV conference Sep. 25-28, 2024, P3283, 1 page.

Oruka Corporate Deck, Apr. 2024, 31 pages.

Oruka Corporate Deck, Aug. 2024, 31 pages.

Oruka Corporate Deck, Jan. 2025, 35 pages.

Oruka Corporate Deck, May 2024, 30 pages.

Oruka Corporate Deck, Sep. 2024, 31 pages.

Oruka Corporate Deck, Sep. 25, 2024, 31 pages.

Robbie, G. et al., "A Novel Investigational Fc-Modified Humanized Monoclonal Antibody, Motavizumab-YTE, Has an Extended Half-Life in Healthy Adults," Antimicrobial Agents and Chemotherapy, vol. 57(12): 6147-6153 (2013).

Rocca, A. et al., "Passive Immunoprophylaxis against Respiratory Syncytial Virus in Children: Where Are We Now?," Int. J. Mol. Sci.., vol. 22 (3703) 22 pages (2021).

Steere, B. et al., "Generation and Characterization of Mirikizumab, a Humanized Monoclonal Antibody Targeting the p19 Subunit of IL-23", The Journal of Pharmacology and Experimental Therapeutics, vol. 387(2):180-187 (2023).

Singh et al., "Selective targeting of the IL23 pathway: Generation and characterization of a novel high-affinity humanized anti-IL23A antibody," mAbs, vol. 7 (Iss. 4) :778-791, Jul. 2015.

Bertani et al., "Baseline Assessment of Serum Cytokines Predicts Clinical and Endoscopic Response to Ustekinumab in Patients With Crohn's Disease: A Prospective Pilot Study", Inflammatory Bowel Diseases, vol. 30, pp. 2449-2456, 2024.

Danese et al., "Efficacy and safety of 48 weeks of guselkumab for patients with Crohn's disease: maintenance results from the phase 2, randomised, double-blind GALAXI-1 trial," Lancet Gastroenterol Hepatol., vol. 9(2):133-146 (2024).

D'Haens et al., "Mirikizumab as Induction and Maintenance Therapy for Ulcerative Colitis", . Engl. J. Med., vol. 388, No. 26: 2444-2445, Jun. 29, 2023.

D'Haens et al., "Risankizumab as induction therapy for Crohn's disease: results from the phase 3 Advance and Motivate induction trials", Lancet, vol. 399: 2015-2030, 2022.

Feagan et al., "Induction therapy with the selective interleukin-23 inhibitor risankizumab in patients with moderate-to-severe Crohn's disease: a randomised, double-blind, placebo-controlled phase 2 study", The Lancet, vol. 389: 1699-1709, Apr. 29, 2017.

Ferrante et al., "Maintenance Risankizumab Sustains Induction Response in Patients with Crohn's Disease in a Randomized Phase 3 Trial," 1 page, Manuscript Doi: 10.1093/ecco-jcc/jjad168, Oct. 15, 2023.

Ferrante et al., "Risankizumab as maintenance therapy for moderately to severely active Crohn's disease: results from the multicentre, randomised, double-blind, placebo-controlled, withdrawal phase 3 Fortify maintenance trial", Lancet, vol. 399: 2031-2046, May 28, 2022.

Gros et al., "Guselkumab in the IL-23 inhibition landscape for ulcerative colitis", The Lancet, vol. 405, No. 10472: 2-3, Jan. 4, 2025.

Louis et al., "Risankizumab for Ulcerative Colitis Two Randomized Clinical Trials", JAMA, Original Investigation, JAMA, vol. 332, No. 11: 881-897, 2024.

Louis et al., "Risankizumab Induction Therapy in Patients With Moderately to Severely Active Ulcerative Colitis: Efficacy and Safety in the Randomized Phase 3 INSPIRE Study", The American Journal of Gastroenterology, vol. 118, Supplement, pp. 1-2, Oct. 2023.

Papp et al., "Risankizumab versus Ustekinumab for Moderate-to-Severe Plaque Psoriasis", The New England Journal of Medicine, vol. 376, No. 16: 1551-1560, Apr. 20, 2017.

Sandborn et al., "Efficacy and Safety of Mirikizumab in a Randomized Phase 2 Study of Patients With Ulcerative Colitis", Gastroentolgy, vol. 158, No. 3: 537-549, Feb. 2020.

Suleiman et al., "Population Pharmacokinetic and Exposure-Response Analyses for Efficacy and Safety of Risankizumab in Patients With Active Crohn's Disease", Clinical Pharmacology & Therapeutics, vol. 113, No. 4: 839-850, Apr. 2023.

Thakre et al., "Population Pharmacokinetic and Exposure-Response Modeling to Inform Risankizumab Dose Selection in Patients With Ulcerative Colitis", Clinical Pharmacology & Therapeutics, vol. 116 No. 3: 847-857, Sep. 2024.

Zhuang et al., "First-in-human study to assess guselkumab (anti-IL-23 mAb) pharmacokinetics/safety in healthy subjects and patients with moderate-to-severe psoriasis", Eru. J. Clin. Pharmacol., vol. 72,: 1303-1310, 2016.

Zinger et al., "Risankizumab Effectiveness and Safety in Crohn's Disease: Real-world Data from a Large Tertiary Center", Clinical Gastroenterology and Hepatology, vol. 22: 1336-1338, Jun. 2024.

International Search Report and Written Opinion, PCT/US2024/034997, dated Jan. 21, 2025, 14 pages.

International Search Report and Written Opinion, PCT/US2025/014593, dated Jun. 2, 2025, 17 pages.

Kwan, B. et al., "Characterization of ORKA-001, a Novel Extended Half-life Monoclonal Antibody Targeting IL-23 for the Treatment of Psoriasis," EADV conference Oct. 24-27, 2024, Poster Presentation, 1 page.

Saunders, K., "Conceptual Approaches to Modulating Antibody Effector Functions and Circulation Half-Life," Frontiers in Immunology, vol. 10 (Article 1296): 20 pages (2019).

Timmins, P et al., "Industry update: the latest developments in the field of therapeutic delivery," Therapeutic Delivery, vol. 15(9): 639-651 (2024).

\* cited by examiner

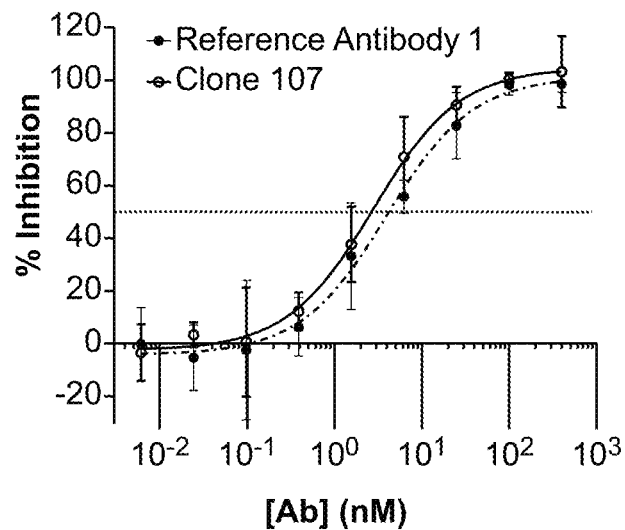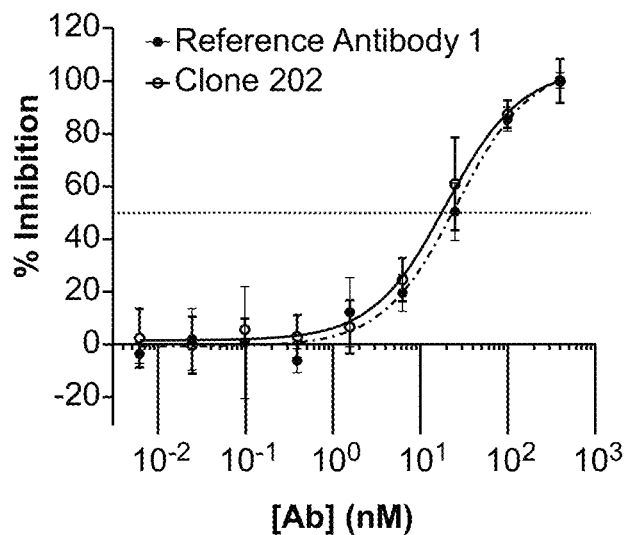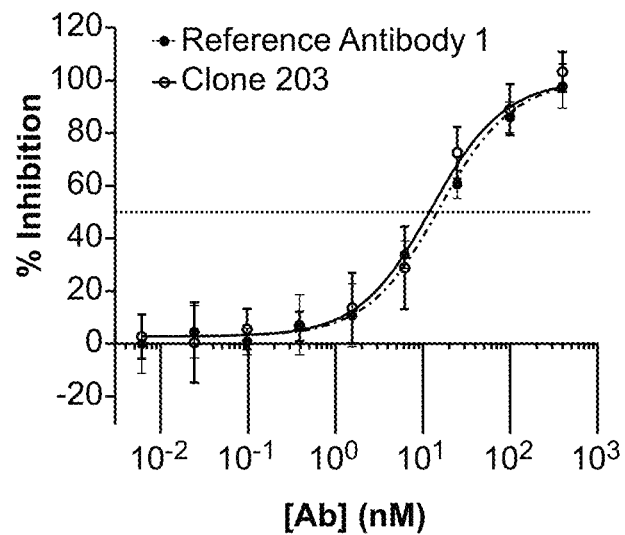

SEQUENCE LISTING

```
Sequence total quantity: 156
SEQ ID NO: 1                moltype = AA  length = 329
FEATURE                     Location/Qualifiers
source                      1..329
                            mol_type = protein
                            organism = synthetic construct
SEQUENCE: 1
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELLGG 120
PSVFLFPPKP KDTLMISRTP EVTCVVVDVS HEDPEVKFNW YVDGVEVHNA KTKPREEQYN 180
STYRVVSVLT VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPG                                   329

SEQ ID NO: 2                moltype = AA  length = 324
FEATURE                     Location/Qualifiers
source                      1..324
                            mol_type = protein
                            organism = synthetic construct
SEQUENCE: 2
ASTKGPSVFP LAPCSRSTSE STAALGCLVK DYFPEPVTVS WNSGALTSGV HTFPAVLQSS  60
GLYSLSSVVT VPSSNFGTQT YTCNVDHKPS NTKVDKTVER KCCVECPPCP APPVAGPSVF 120
LFPPKPKDTL MISRTPEVTC VVVDVSHEDP EVQFNWYVDG VEVHNAKTK REEQFNSTFR 180
VVSVLTVVHQ DWLNGKEYKC KVSNKGLPAP IEKTISKTKG QPREPQVYTL PPSREEMTKN 240
QVSLTCLVKG FYPSDIAVEW ESNGQPENNY KTTPPMLDSD GSFFLYSKLT VDKSRWQQGN 300
VFSCSVMHEA LHNHYTQKSL SLSP                                        324

SEQ ID NO: 3                moltype = AA  length = 327
FEATURE                     Location/Qualifiers
source                      1..327
                            mol_type = protein
                            organism = synthetic construct
SEQUENCE: 3
ASTKGPSVFP LAPCSRSTSE STAALGCLVK DYFPEPVTVS WNSGALTSGV HTFPAVLQSS  60
GLYSLSSVVT VPSSSLGTKT YTCNVDHKPS NTKVDKRVES KYGPPCPSCP APEFLGGPSV 120
FLFPPKPKDT LMISRTPEVT CVVVDVSQED PEVQFNWYVD GVEVHNAKTK PREEQFNSTY 180
RVVSVLTVLH QDWLNGKEYK CKVSNKGLPS SIEKTISKAK GQPREPQVYT LPPSQEEMTK 240
NQVSLTCLVK GFYPSDIAVE WESNGQPENN YKTTPPVLDS DGSFFLYSRL TVDKSRWQEG 300
NVFSCSVMHE ALHNHYTQKS LSLSLGK                                     327

SEQ ID NO: 4                moltype = AA  length = 327
FEATURE                     Location/Qualifiers
```

```
source                   1..327
                         mol_type = protein
                         organism = synthetic construct
SEQUENCE: 4
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPPCP APEFLGGPSV   120
FLFPPKPKDT LMISRTPEVT CVVVDVSQED PEVQFNWYVD GVEVHNAKTK PREEQFNSTY   180
RVVSVLTVLH QDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVMHE ALHNHYTQKS LSLSLGK                                      327

SEQ ID NO: 5             moltype = AA   length = 327
FEATURE                  Location/Qualifiers
source                   1..327
                         mol_type = protein
                         organism = synthetic construct
SEQUENCE: 5
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPPCP APEELGGPSV   120
FLFPPKPKDT LMISRTPEVT CVVVDVSQED PEVQFNWYVD GVEVHNAKTK PREEQFNSTY   180
RVVSVLTVLH QDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVMHE ALHNHYTQKS LSLSLGK                                      327

SEQ ID NO: 6             moltype = AA   length = 329
FEATURE                  Location/Qualifiers
source                   1..329
                         mol_type = protein
                         organism = synthetic construct
SEQUENCE: 6
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYA   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 7             moltype = AA   length = 329
FEATURE                  Location/Qualifiers
source                   1..329
                         mol_type = protein
                         organism = synthetic construct
SEQUENCE: 7
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVAVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 8             moltype = AA   length = 329
FEATURE                  Location/Qualifiers
source                   1..329
                         mol_type = protein
                         organism = synthetic construct
SEQUENCE: 8
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 9             moltype = AA   length = 329
FEATURE                  Location/Qualifiers
source                   1..329
                         mol_type = protein
                         organism = synthetic construct
SEQUENCE: 9
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELAGA   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 10            moltype = AA   length = 329
FEATURE                  Location/Qualifiers
source                   1..329
```

```
                            mol_type = protein
                            organism = synthetic construct
SEQUENCE: 10
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGA   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 11               moltype = AA   length = 329
FEATURE                     Location/Qualifiers
source                      1..329
                            mol_type = protein
                            organism = synthetic construct
SEQUENCE: 11
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LGAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 12               moltype = AA   length = 329
FEATURE                     Location/Qualifiers
source                      1..329
                            mol_type = protein
                            organism = synthetic construct
SEQUENCE: 12
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLYITREP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 13               moltype = AA   length = 329
FEATURE                     Location/Qualifiers
source                      1..329
                            mol_type = protein
                            organism = synthetic construct
SEQUENCE: 13
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLYITREP EVTCVVVDVS HEDPEVKFNW YVDGVEVHNA KTKPREEQYA   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 14               moltype = AA   length = 329
FEATURE                     Location/Qualifiers
source                      1..329
                            mol_type = protein
                            organism = synthetic construct
SEQUENCE: 14
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLYITREP EVTCVVVAVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 15               moltype = AA   length = 329
FEATURE                     Location/Qualifiers
source                      1..329
                            mol_type = protein
                            organism = synthetic construct
SEQUENCE: 15
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLYITREP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 16               moltype = AA   length = 329
FEATURE                     Location/Qualifiers
source                      1..329
                            mol_type = protein
```

```
                              organism = synthetic construct
SEQUENCE: 16
ASTKGPSVFP  LAPSSKSTSG  GTAALGCLVK  DYFPEPVTVS  WNSGALTSGV  HTFPAVLQSS    60
GLYSLSSVVT  VPSSSLGTQT  YICNVNHKPS  NTKVDKKVEP  KSCDKTHTCP  PCPAPELAGA   120
PSVFLFPPKP  KDTLYITREP  EVTCVVVDVS  HEDPEVKFNW  YVDGVEVHNA  KTKPREEQYN   180
STYRVVSVLT  VLHQDWLNGK  EYKCKVSNKA  LPAPIEKTIS  KAKGQPREPQ  VYTLPPSRDE   240
LTKNQVSLTC  LVKGFYPSDI  AVEWESNGQP  ENNYKTTPPV  LDSDGSFFLY  SKLTVDKSRW   300
QQGNVFSCSV  MHEALHNHYT  QKSLSLSPG                                       329

SEQ ID NO: 17           moltype = AA   length = 329
FEATURE                 Location/Qualifiers
source                  1..329
                        mol_type = protein
                        organism = synthetic construct
SEQUENCE: 17
ASTKGPSVFP  LAPSSKSTSG  GTAALGCLVK  DYFPEPVTVS  WNSGALTSGV  HTFPAVLQSS    60
GLYSLSSVVT  VPSSSLGTQT  YICNVNHKPS  NTKVDKKVEP  KSCDKTHTCP  PCPAPEAAGA   120
PSVFLFPPKP  KDTLYITREP  EVTCVVVDVS  HEDPEVKFNW  YVDGVEVHNA  KTKPREEQYN   180
STYRVVSVLT  VLHQDWLNGK  EYKCKVSNKA  LPAPIEKTIS  KAKGQPREPQ  VYTLPPSRDE   240
LTKNQVSLTC  LVKGFYPSDI  AVEWESNGQP  ENNYKTTPPV  LDSDGSFFLY  SKLTVDKSRW   300
QQGNVFSCSV  MHEALHNHYT  QKSLSLSPG                                       329

SEQ ID NO: 18           moltype = AA   length = 329
FEATURE                 Location/Qualifiers
source                  1..329
                        mol_type = protein
                        organism = synthetic construct
SEQUENCE: 18
ASTKGPSVFP  LAPSSKSTSG  GTAALGCLVK  DYFPEPVTVS  WNSGALTSGV  HTFPAVLQSS    60
GLYSLSSVVT  VPSSSLGTQT  YICNVNHKPS  NTKVDKKVEP  KSCDKTHTCP  PCPAPEAAGG   120
PSVFLFPPKP  KDTLYITREP  EVTCVVVDVS  HEDPEVKFNW  YVDGVEVHNA  KTKPREEQYN   180
STYRVVSVLT  VLHQDWLNGK  EYKCKVSNKA  LGAPIEKTIS  KAKGQPREPQ  VYTLPPSRDE   240
LTKNQVSLTC  LVKGFYPSDI  AVEWESNGQP  ENNYKTTPPV  LDSDGSFFLY  SKLTVDKSRW   300
QQGNVFSCSV  MHEALHNHYT  QKSLSLSPG                                       329

SEQ ID NO: 19           moltype = AA   length = 329
FEATURE                 Location/Qualifiers
source                  1..329
                        mol_type = protein
                        organism = synthetic construct
SEQUENCE: 19
ASTKGPSVFP  LAPSSKSTSG  GTAALGCLVK  DYFPEPVTVS  WNSGALTSGV  HTFPAVLQSS    60
GLYSLSSVVT  VPSSSLGTQT  YICNVNHKPS  NTKVDKKVEP  KSCDKTHTCP  PCPAPELLGG   120
PSVFLFPPKP  KDTLMISRTP  EVTCVVVDVS  HEDPEVKFNW  YVDGVEVHNA  KTKPREEQYN   180
STYRVVSVLT  VLHQDWLNGK  EYKCKVSNKA  LPAPIEKTIS  KAKGQPREPQ  VYTLPPSRDE   240
LTKNQVSLTC  LVKGFYPSDI  AVEWESNGQP  ENNYKTTPPV  LDSDGSFFLY  SKLTVDKSRW   300
QQGNVFSCSV  LHEALHSHYT  QKSLSLSPG                                       329

SEQ ID NO: 20           moltype = AA   length = 329
FEATURE                 Location/Qualifiers
source                  1..329
                        mol_type = protein
                        organism = synthetic construct
SEQUENCE: 20
ASTKGPSVFP  LAPSSKSTSG  GTAALGCLVK  DYFPEPVTVS  WNSGALTSGV  HTFPAVLQSS    60
GLYSLSSVVT  VPSSSLGTQT  YICNVNHKPS  NTKVDKKVEP  KSCDKTHTCP  PCPAPELLGG   120
PSVFLFPPKP  KDTLMISRTP  EVTCVVVDVS  HEDPEVKFNW  YVDGVEVHNA  KTKPREEQYA   180
STYRVVSVLT  VLHQDWLNGK  EYKCKVSNKA  LPAPIEKTIS  KAKGQPREPQ  VYTLPPSRDE   240
LTKNQVSLTC  LVKGFYPSDI  AVEWESNGQP  ENNYKTTPPV  LDSDGSFFLY  SKLTVDKSRW   300
QQGNVFSCSV  LHEALHSHYT  QKSLSLSPG                                       329

SEQ ID NO: 21           moltype = AA   length = 329
FEATURE                 Location/Qualifiers
source                  1..329
                        mol_type = protein
                        organism = synthetic construct
SEQUENCE: 21
ASTKGPSVFP  LAPSSKSTSG  GTAALGCLVK  DYFPEPVTVS  WNSGALTSGV  HTFPAVLQSS    60
GLYSLSSVVT  VPSSSLGTQT  YICNVNHKPS  NTKVDKKVEP  KSCDKTHTCP  PCPAPELLGG   120
PSVFLFPPKP  KDTLMISRTP  EVTCVVVAVS  HEDPEVKFNW  YVDGVEVHNA  KTKPREEQYN   180
STYRVVSVLT  VLHQDWLNGK  EYKCKVSNKA  LPAPIEKTIS  KAKGQPREPQ  VYTLPPSRDE   240
LTKNQVSLTC  LVKGFYPSDI  AVEWESNGQP  ENNYKTTPPV  LDSDGSFFLY  SKLTVDKSRW   300
QQGNVFSCSV  LHEALHSHYT  QKSLSLSPG                                       329

SEQ ID NO: 22           moltype = AA   length = 329
FEATURE                 Location/Qualifiers
source                  1..329
                        mol_type = protein
                        organism = synthetic construct
```

```
SEQUENCE: 22
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHSHYT QKSLSLSPG                                    329

SEQ ID NO: 23            moltype = AA   length = 329
FEATURE                  Location/Qualifiers
source                   1..329
                         mol_type = protein
                         organism = synthetic construct
SEQUENCE: 23
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELAGA   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHSHYT QKSLSLSPG                                    329

SEQ ID NO: 24            moltype = AA   length = 329
FEATURE                  Location/Qualifiers
source                   1..329
                         mol_type = protein
                         organism = synthetic construct
SEQUENCE: 24
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGA   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHSHYT QKSLSLSPG                                    329

SEQ ID NO: 25            moltype = AA   length = 329
FEATURE                  Location/Qualifiers
source                   1..329
                         mol_type = protein
                         organism = synthetic construct
SEQUENCE: 25
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LGAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHSHYT QKSLSLSPG                                    329

SEQ ID NO: 26            moltype = AA   length = 329
FEATURE                  Location/Qualifiers
source                   1..329
                         mol_type = protein
                         organism = synthetic construct
SEQUENCE: 26
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYN   180
STYRVVSVLT VDHHDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHSHYT QKSLSLSPG                                    329

SEQ ID NO: 27            moltype = AA   length = 329
FEATURE                  Location/Qualifiers
source                   1..329
                         mol_type = protein
                         organism = synthetic construct
SEQUENCE: 27
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYA   180
STYRVVSVLT VDHHDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHSHYT QKSLSLSPG                                    329

SEQ ID NO: 28            moltype = AA   length = 329
FEATURE                  Location/Qualifiers
source                   1..329
                         mol_type = protein
                         organism = synthetic construct
SEQUENCE: 28
```

```
SEQ ID NO: 29            moltype = AA  length = 329
FEATURE                  Location/Qualifiers
source                   1..329
                         mol_type = protein
                         organism = synthetic construct
SEQUENCE: 29
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELLGG 120
PSVFLFPPKP KDTLMISRTP EVTCVVVAVS HEDPEVKFNW YVDGVEVHNA KTKPREEQYN 180
STYRVVSVLT VDHHDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHSHYT QKSLSLSPG                                  329

SEQ ID NO: 29            moltype = AA  length = 329
FEATURE                  Location/Qualifiers
source                   1..329
                         mol_type = protein
                         organism = synthetic construct
SEQUENCE: 29
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGG 120
PSVFLFPPKP KDTLMISRTP EVTCVVVDVS HEDPEVKFNW YVDGVEVHNA KTKPREEQYN 180
STYRVVSVLT VDHHDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHSHYT QKSLSLSPG                                  329

SEQ ID NO: 30            moltype = AA  length = 329
FEATURE                  Location/Qualifiers
source                   1..329
                         mol_type = protein
                         organism = synthetic construct
SEQUENCE: 30
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELAGA 120
PSVFLFPPKP KDTLMISRTP EVTCVVVDVS HEDPEVKFNW YVDGVEVHNA KTKPREEQYN 180
STYRVVSVLT VDHHDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHSHYT QKSLSLSPG                                  329

SEQ ID NO: 31            moltype = AA  length = 329
FEATURE                  Location/Qualifiers
source                   1..329
                         mol_type = protein
                         organism = synthetic construct
SEQUENCE: 31
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGA 120
PSVFLFPPKP KDTLMISRTP EVTCVVVDVS HEDPEVKFNW YVDGVEVHNA KTKPREEQYN 180
STYRVVSVLT VDHHDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHSHYT QKSLSLSPG                                  329

SEQ ID NO: 32            moltype = AA  length = 329
FEATURE                  Location/Qualifiers
source                   1..329
                         mol_type = protein
                         organism = synthetic construct
SEQUENCE: 32
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGG 120
PSVFLFPPKP KDTLMISRTP EVTCVVVDVS HEDPEVKFNW YVDGVEVHNA KTKPREEQYN 180
STYRVVSVLT VDHHDWLNGK EYKCKVSNKA LGAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHSHYT QKSLSLSPG                                  329

SEQ ID NO: 33            moltype = AA  length = 327
FEATURE                  Location/Qualifiers
source                   1..327
                         mol_type = protein
                         organism = synthetic construct
SEQUENCE: 33
ASTKGPSVFP LAPCSRSTSE STAALGCLVK DYFPEPVTVS WNSGALTSGV HTFPAVLQSS  60
GLYSLSSVVT VPSSSLGTKT YTCNVDHKPS NTKVDKRVES KYGPPCPSCP APEFLGGPSV 120
FLFPPKPKDT LYITREPEVT CVVVDVSQED PEVQFNWYVD GVEVHNAKTK PREEQFNSTY 180
RVVSVLTVLH QDWLNGKEYK CKVSNKGLPS SIEKTISKAK GQPREPQVYT LPPSQEEMTK 240
NQVSLTCLVK GFYPSDIAVE WESNGQPENN YKTTPPVLDS DGSFFLYSRL TVDKSRWQEG 300
NVFSCSVMHE ALHNHYTQKS LSLSLGK                                    327

SEQ ID NO: 34            moltype = AA  length = 327
FEATURE                  Location/Qualifiers
source                   1..327
                         mol_type = protein
                         organism = synthetic construct
SEQUENCE: 34
ASTKGPSVFP LAPCSRSTSE STAALGCLVK DYFPEPVTVS WNSGALTSGV HTFPAVLQSS  60
```

```
GLYSLSSVVT VPSSSLGTKT YTCNVDHKPS NTKVDKRVES KYGPPCPPCP APEFLGGPSV  120
FLFPPKPKDT LYITREPEVT CVVVDVSQED PEVQFNWYVD GVEVHNAKTK PREEQFNSTY  180
RVVSVLTVLH QDWLNGKEYK CKVSNKGLPS SIEKTISKAK GQPREPQVYT LPPSQEEMTK  240
NQVSLTCLVK GFYPSDIAVE WESNGQPENN YKTTPPVLDS DGSFFLYSRL TVDKSRWQEG  300
NVFSCSVMHE ALHNHYTQKS LSLSLGK                                     327

SEQ ID NO: 35          moltype = AA  length = 327
FEATURE                Location/Qualifiers
source                 1..327
                       mol_type = protein
                       organism = synthetic construct
SEQUENCE: 35
ASTKGPSVFP LAPCSRSTSE STAALGCLVK DYFPEPVTVS WNSGALTSGV HTFPAVLQSS   60
GLYSLSSVVT VPSSSLGTKT YTCNVDHKPS NTKVDKRVES KYGPPCPPCP APEELGGPSV  120
FLFPPKPKDT LYITREPEVT CVVVDVSQED PEVQFNWYVD GVEVHNAKTK PREEQFNSTY  180
RVVSVLTVLH QDWLNGKEYK CKVSNKGLPS SIEKTISKAK GQPREPQVYT LPPSQEEMTK  240
NQVSLTCLVK GFYPSDIAVE WESNGQPENN YKTTPPVLDS DGSFFLYSRL TVDKSRWQEG  300
NVFSCSVMHE ALHNHYTQKS LSLSLGK                                     327

SEQ ID NO: 36          moltype = AA  length = 327
FEATURE                Location/Qualifiers
source                 1..327
                       mol_type = protein
                       organism = synthetic construct
SEQUENCE: 36
ASTKGPSVFP LAPCSRSTSE STAALGCLVK DYFPEPVTVS WNSGALTSGV HTFPAVLQSS   60
GLYSLSSVVT VPSSSLGTKT YTCNVDHKPS NTKVDKRVES KYGPPCPSCP APEFLGGPSV  120
FLFPPKPKDT LMISRTPEVT CVVVDVSQED PEVQFNWYVD GVEVHNAKTK PREEQFNSTY  180
RVVSVLTVLH QDWLNGKEYK CKVSNKGLPS SIEKTISKAK GQPREPQVYT LPPSQEEMTK  240
NQVSLTCLVK GFYPSDIAVE WESNGQPENN YKTTPPVLDS DGSFFLYSRL TVDKSRWQEG  300
NVFSCSVLHE ALHSHYTQKS LSLSLGK                                     327

SEQ ID NO: 37          moltype = AA  length = 327
FEATURE                Location/Qualifiers
source                 1..327
                       mol_type = protein
                       organism = synthetic construct
SEQUENCE: 37
ASTKGPSVFP LAPCSRSTSE STAALGCLVK DYFPEPVTVS WNSGALTSGV HTFPAVLQSS   60
GLYSLSSVVT VPSSSLGTKT YTCNVDHKPS NTKVDKRVES KYGPPCPPCP APEFLGGPSV  120
FLFPPKPKDT LMISRTPEVT CVVVDVSQED PEVQFNWYVD GVEVHNAKTK PREEQFNSTY  180
RVVSVLTVLH QDWLNGKEYK CKVSNKGLPS SIEKTISKAK GQPREPQVYT LPPSQEEMTK  240
NQVSLTCLVK GFYPSDIAVE WESNGQPENN YKTTPPVLDS DGSFFLYSRL TVDKSRWQEG  300
NVFSCSVLHE ALHSHYTQKS LSLSLGK                                     327

SEQ ID NO: 38          moltype = AA  length = 327
FEATURE                Location/Qualifiers
source                 1..327
                       mol_type = protein
                       organism = synthetic construct
SEQUENCE: 38
ASTKGPSVFP LAPCSRSTSE STAALGCLVK DYFPEPVTVS WNSGALTSGV HTFPAVLQSS   60
GLYSLSSVVT VPSSSLGTKT YTCNVDHKPS NTKVDKRVES KYGPPCPPCP APEELGGPSV  120
FLFPPKPKDT LMISRTPEVT CVVVDVSQED PEVQFNWYVD GVEVHNAKTK PREEQFNSTY  180
RVVSVLTVLH QDWLNGKEYK CKVSNKGLPS SIEKTISKAK GQPREPQVYT LPPSQEEMTK  240
NQVSLTCLVK GFYPSDIAVE WESNGQPENN YKTTPPVLDS DGSFFLYSRL TVDKSRWQEG  300
NVFSCSVLHE ALHSHYTQKS LSLSLGK                                     327

SEQ ID NO: 39          moltype = AA  length = 327
FEATURE                Location/Qualifiers
source                 1..327
                       mol_type = protein
                       organism = synthetic construct
SEQUENCE: 39
ASTKGPSVFP LAPCSRSTSE STAALGCLVK DYFPEPVTVS WNSGALTSGV HTFPAVLQSS   60
GLYSLSSVVT VPSSSLGTKT YTCNVDHKPS NTKVDKRVES KYGPPCPSCP APEFLGGPSV  120
FLFPPKPKDT LMISRTPEVT CVVVDVSQED PEVQFNWYVD GVEVHNAKTK PREEQFNSTY  180
RVVSVLTVDH HDWLNGKEYK CKVSNKGLPS SIEKTISKAK GQPREPQVYT LPPSQEEMTK  240
NQVSLTCLVK GFYPSDIAVE WESNGQPENN YKTTPPVLDS DGSFFLYSRL TVDKSRWQEG  300
NVFSCSVMHE ALHSHYTQKS LSLSLGK                                     327

SEQ ID NO: 40          moltype = AA  length = 327
FEATURE                Location/Qualifiers
source                 1..327
                       mol_type = protein
                       organism = synthetic construct
SEQUENCE: 40
ASTKGPSVFP LAPCSRSTSE STAALGCLVK DYFPEPVTVS WNSGALTSGV HTFPAVLQSS   60
GLYSLSSVVT VPSSSLGTKT YTCNVDHKPS NTKVDKRVES KYGPPCPPCP APEFLGGPSV  120
```

```
FLFPPKPKDT LMISRTPEVT CVVVDVSQED PEVQFNWYVD GVEVHNAKTK PREEQFNSTY      180
RVVSVLTVDH HDWLNGKEYK CKVSNKGLPS SIEKTISKAK GQPREPQVYT LPPSQEEMTK      240
NQVSLTCLVK GFYPSDIAVE WESNGQPENN YKTTPPVLDS DGSFFLYSRL TVDKSRWQEG      300
NVFSCSVMHE ALHSHYTQKS LSLSLGK                                         327

SEQ ID NO: 41               moltype = AA   length = 327
FEATURE                     Location/Qualifiers
source                      1..327
                            mol_type = protein
                            organism = synthetic construct
SEQUENCE: 41
ASTKGPSVFP LAPCSRSTSE STAALGCLVK DYFPEPVTVS WNSGALTSGV HTFPAVLQSS       60
GLYSLSSVVT VPSSSLGTKT YTCNVDHKPS NTKVDKRVES KYGPPCPPCP APEELGGPSV      120
FLFPPKPKDT LMISRTPEVT CVVVDVSQED PEVQFNWYVD GVEVHNAKTK PREEQFNSTY      180
RVVSVLTVDH HDWLNGKEYK CKVSNKGLPS SIEKTISKAK GQPREPQVYT LPPSQEEMTK      240
NQVSLTCLVK GFYPSDIAVE WESNGQPENN YKTTPPVLDS DGSFFLYSRL TVDKSRWQEG      300
NVFSCSVMHE ALHSHYTQKS LSLSLGK                                         327

SEQ ID NO: 42               moltype = AA   length = 324
FEATURE                     Location/Qualifiers
source                      1..324
                            mol_type = protein
                            organism = synthetic construct
SEQUENCE: 42
ASTKGPSVFP LAPCSRSTSE STAALGCLVK DYFPEPVTVS WNSGALTSGV HTFPAVLQSS       60
GLYSLSSVVT VPSSNFGTQT YTCNVDHKPS NTKVDKKCCV ECPPCP APPVAGPSVF         120
LFPPKPKDTL YITREPEVTC VVVDVSHEDP EVQFNWYVDG VEVHNAKTKP REEQFNSTFR      180
VVSVLTVVHQ DWLNGKEYKC KVSNKGLPAP IEKTISKTKG QPREPQVYTL PPSREEMTKN      240
QVSLTCLVKG FYPSDIAVEW ESNGQPENNY KTTPPMLDSD GSFFLYSKLT VDKSRWQQGN      300
VFSCSVLHEA LHSHYTQKSL SLSP                                            324

SEQ ID NO: 43               moltype = AA   length = 324
FEATURE                     Location/Qualifiers
source                      1..324
                            mol_type = protein
                            organism = synthetic construct
SEQUENCE: 43
ASTKGPSVFP LAPCSRSTSE STAALGCLVK DYFPEPVTVS WNSGALTSGV HTFPAVLQSS       60
GLYSLSSVVT VPSSNFGTQT YTCNVDHKPS NTKVDKTVER KCCVECPPCP APPVAGPSVF     120
LFPPKPKDTL MISRTPEVTC VVVDVSHEDP EVQFNWYVDG VEVHNAKTKP REEQFNSTFR      180
VVSVLTVVHQ DWLNGKEYKC KVSNKGLPAP IEKTISKTKG QPREPQVYTL PPSREEMTKN      240
QVSLTCLVKG FYPSDIAVEW ESNGQPENNY KTTPPMLDSD GSFFLYSKLT VDKSRWQQGN      300
VFSCSVLHEA LHSHYTQKSL SLSP                                            324

SEQ ID NO: 44               moltype = AA   length = 324
FEATURE                     Location/Qualifiers
source                      1..324
                            mol_type = protein
                            organism = synthetic construct
SEQUENCE: 44
ASTKGPSVFP LAPCSRSTSE STAALGCLVK DYFPEPVTVS WNSGALTSGV HTFPAVLQSS       60
GLYSLSSVVT VPSSNFGTQT YTCNVDHKPS NTKVDKTVER KCCVECPPCP APPVAGPSVF     120
LFPPKPKDTL MISRTPEVTC VVVDVSHEDP EVQFNWYVDG VEVHNAKTKP REEQFNSTFR      180
VVSVLTVDHH DWLNGKEYKC KVSNKGLPAP IEKTISKTKG QPREPQVYTL PPSREEMTKN      240
QVSLTCLVKG FYPSDIAVEW ESNGQPENNY KTTPPMLDSD GSFFLYSKLT VDKSRWQQGN      300
VFSCSVMHEA LHSHYTQKSL SLSP                                            324

SEQ ID NO: 45               moltype = AA   length = 329
FEATURE                     Location/Qualifiers
source                      1..329
                            mol_type = protein
                            organism = synthetic construct
SEQUENCE: 45
ASTKGPSVFP LAPSSKSTSG GTAALGCLVK DYFPEPVTVS WNSGALTSGV HTFPAVLQSS       60
GLYSLSSVVT VPSSSLGTQT YICNVNHKPS NTKVDKKVEP KSCDKTHTCP PCPAPELLGG     120
PSVFLFPPKP KDTLMISRTP EVTCVVVDVS HEDPEVKFNW YVDGVEVHNA KTKPREEQYN      180
STYRVVSVLT VLHQDWLNGK EYKCKVSNKA LPAPIEKTIS KAKGQPREPQ VYTLPPSRDE      240
LTKNQVSLTC LVKGFYPSDI AVEWESNGQP ENNYKTTPPV LDSDGSFFLY SKLTVDKSRW      300
QQGNVFSCSV LHEALHAHYT QKSLSLSPG                                       329

SEQ ID NO: 46               moltype = AA   length = 329
FEATURE                     Location/Qualifiers
source                      1..329
                            mol_type = protein
                            organism = synthetic construct
SEQUENCE: 46
ASTKGPSVFP LAPSSKSTSG GTAALGCLVK DYFPEPVTVS WNSGALTSGV HTFPAVLQSS       60
GLYSLSSVVT VPSSSLGTQT YICNVNHKPS NTKVDKKVEP KSCDKTHTCP PCPAPELLGG     120
PSVFLFPPKP KDTLMISRTP EVTCVVVDVS HEDPEVKFNW YVDGVEVHNA KTKPREEQYA      180
```

```
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHAHYT QKSLSLSPG                                    329

SEQ ID NO: 47              moltype = AA   length = 329
FEATURE                    Location/Qualifiers
source                     1..329
                           mol_type = protein
                           organism = synthetic construct
SEQUENCE: 47
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG   120
PSVFLFPPKP KDTLMISRTP EVTCVVVAVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHAHYT QKSLSLSPG                                    329

SEQ ID NO: 48              moltype = AA   length = 329
FEATURE                    Location/Qualifiers
source                     1..329
                           mol_type = protein
                           organism = synthetic construct
SEQUENCE: 48
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHAHYT QKSLSLSPG                                    329

SEQ ID NO: 49              moltype = AA   length = 329
FEATURE                    Location/Qualifiers
source                     1..329
                           mol_type = protein
                           organism = synthetic construct
SEQUENCE: 49
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELAGA   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHAHYT QKSLSLSPG                                    329

SEQ ID NO: 50              moltype = AA   length = 329
FEATURE                    Location/Qualifiers
source                     1..329
                           mol_type = protein
                           organism = synthetic construct
SEQUENCE: 50
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHAHYT QKSLSLSPG                                    329

SEQ ID NO: 51              moltype = AA   length = 329
FEATURE                    Location/Qualifiers
source                     1..329
                           mol_type = protein
                           organism = synthetic construct
SEQUENCE: 51
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LGAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHAHYT QKSLSLSPG                                    329

SEQ ID NO: 52              moltype = AA   length = 329
FEATURE                    Location/Qualifiers
source                     1..329
                           mol_type = protein
                           organism = synthetic construct
SEQUENCE: 52
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
```

```
LTKNQVSLTC LVKGFYPSDI AVEWESNGQP ENNYKTTPPV LDSDGSFFLY SKLTVDKSRW    300
QQGNVFSCSV MHEALHAHYT QKSLSLSPG                                     329

SEQ ID NO: 53           moltype = AA  length = 329
FEATURE                 Location/Qualifiers
source                  1..329
                        mol_type = protein
                        organism = synthetic construct
SEQUENCE: 53
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG    120
PSVFLFPPKP KDTLMISRTP EVTCVVVDVS HEDPEVKFNW YVDGVEVHNA KTKPREEQYA    180
STYRVVSVLT VLHQDWLNGK EYKCKVSNKA LPAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
QQGNVFSCSV MHEALHAHYT QKSLSLSPG                                     329

SEQ ID NO: 54           moltype = AA  length = 329
FEATURE                 Location/Qualifiers
source                  1..329
                        mol_type = protein
                        organism = synthetic construct
SEQUENCE: 54
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG    120
PSVFLFPPKP KDTLMISRTP EVTCVVVAVS HEDPEVKFNW YVDGVEVHNA KTKPREEQYN    180
STYRVVSVLT VLHQDWLNGK EYKCKVSNKA LPAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
QQGNVFSCSV MHEALHAHYT QKSLSLSPG                                     329

SEQ ID NO: 55           moltype = AA  length = 329
FEATURE                 Location/Qualifiers
source                  1..329
                        mol_type = protein
                        organism = synthetic construct
SEQUENCE: 55
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG    120
PSVFLFPPKP KDTLMISRTP EVTCVVVDVS HEDPEVKFNW YVDGVEVHNA KTKPREEQYN    180
STYRVVSVLT VLHQDWLNGK EYKCKVSNKA LPAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
QQGNVFSCSV MHEALHAHYT QKSLSLSPG                                     329

SEQ ID NO: 56           moltype = AA  length = 329
FEATURE                 Location/Qualifiers
source                  1..329
                        mol_type = protein
                        organism = synthetic construct
SEQUENCE: 56
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELAGA    120
PSVFLFPPKP KDTLMISRTP EVTCVVVDVS HEDPEVKFNW YVDGVEVHNA KTKPREEQYN    180
STYRVVSVLT VLHQDWLNGK EYKCKVSNKA LPAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
QQGNVFSCSV MHEALHAHYT QKSLSLSPG                                     329

SEQ ID NO: 57           moltype = AA  length = 329
FEATURE                 Location/Qualifiers
source                  1..329
                        mol_type = protein
                        organism = synthetic construct
SEQUENCE: 57
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAGA    120
PSVFLFPPKP KDTLMISRTP EVTCVVVDVS HEDPEVKFNW YVDGVEVHNA KTKPREEQYN    180
STYRVVSVLT VLHQDWLNGK EYKCKVSNKA LPAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
QQGNVFSCSV MHEALHAHYT QKSLSLSPG                                     329

SEQ ID NO: 58           moltype = AA  length = 329
FEATURE                 Location/Qualifiers
source                  1..329
                        mol_type = protein
                        organism = synthetic construct
SEQUENCE: 58
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG    120
PSVFLFPPKP KDTLMISRTP EVTCVVVDVS HEDPEVKFNW YVDGVEVHNA KTKPREEQYN    180
STYRVVSVLT VLHQDWLNGK EYKCKVSNKA LGAPIEKTIS KAKGQPREPQ VYTLPPSRDE    240
LTKNQVSLTC LVKGFYPSDI AVEWESNGQP ENNYKTTPPV LDSDGSFFLY SKLTVDKSRW    300
```

```
QQGNVFSCSV MHEALHAHYT QKSLSLSPG                                              329

SEQ ID NO: 59              moltype = AA  length = 329
FEATURE                    Location/Qualifiers
source                     1..329
                           mol_type = protein
                           organism = synthetic construct
SEQUENCE: 59
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHWHYT QKSLSLSPG                                    329

SEQ ID NO: 60              moltype = AA  length = 329
FEATURE                    Location/Qualifiers
source                     1..329
                           mol_type = protein
                           organism = synthetic construct
SEQUENCE: 60
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVDVS HEDPEVKFNW YVDGVEVHNA KTKPREEQYA  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHWHYT QKSLSLSPG                                    329

SEQ ID NO: 61              moltype = AA  length = 329
FEATURE                    Location/Qualifiers
source                     1..329
                           mol_type = protein
                           organism = synthetic construct
SEQUENCE: 61
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVAVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHWHYT QKSLSLSPG                                    329

SEQ ID NO: 62              moltype = AA  length = 329
FEATURE                    Location/Qualifiers
source                     1..329
                           mol_type = protein
                           organism = synthetic construct
SEQUENCE: 62
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHWHYT QKSLSLSPG                                    329

SEQ ID NO: 63              moltype = AA  length = 329
FEATURE                    Location/Qualifiers
source                     1..329
                           mol_type = protein
                           organism = synthetic construct
SEQUENCE: 63
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELAGA  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHWHYT QKSLSLSPG                                    329

SEQ ID NO: 64              moltype = AA  length = 329
FEATURE                    Location/Qualifiers
source                     1..329
                           mol_type = protein
                           organism = synthetic construct
SEQUENCE: 64
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGA  120
PSVFLFPPKP KDTLMISRTP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHWHYT QKSLSLSPG                                    329
```

```
SEQ ID NO: 65            moltype = AA  length = 329
FEATURE                  Location/Qualifiers
source                   1..329
                         mol_type = protein
                         organism = synthetic construct
SEQUENCE: 65
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGG 120
PSVFLFPPKP KDTLMISRTP EVTCVVVDVS HEDPEVKFNW YVDGVEVHNA KTKPREEQYN 180
STYRVVSVLT VLHQDWLNGK EYKCKVSNKA LGAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHWHYT QKSLSLSPG                                  329

SEQ ID NO: 66            moltype = AA  length = 329
FEATURE                  Location/Qualifiers
source                   1..329
                         mol_type = protein
                         organism = synthetic construct
SEQUENCE: 66
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELLGG 120
PSVFLFPPKP KDTLMISRDP EVTCVVVDVS HEDPEVKFNW YVDGVEVHNA KTKPREEQYN 180
STYRVVSVLQ VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPG                                  329

SEQ ID NO: 67            moltype = AA  length = 329
FEATURE                  Location/Qualifiers
source                   1..329
                         mol_type = protein
                         organism = synthetic construct
SEQUENCE: 67
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELLGG 120
PSVFLFPPKP KDTLMISRDP EVTCVVVDVS HEDPEVKFNW YVDGVEVHNA KTKPREEQYA 180
STYRVVSVLQ VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPG                                  329

SEQ ID NO: 68            moltype = AA  length = 329
FEATURE                  Location/Qualifiers
source                   1..329
                         mol_type = protein
                         organism = synthetic construct
SEQUENCE: 68
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELLGG 120
PSVFLFPPKP KDTLMISRDP EVTCVVVAVS HEDPEVKFNW YVDGVEVHNA KTKPREEQYN 180
STYRVVSVLQ VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPG                                  329

SEQ ID NO: 69            moltype = AA  length = 329
FEATURE                  Location/Qualifiers
source                   1..329
                         mol_type = protein
                         organism = synthetic construct
SEQUENCE: 69
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGG 120
PSVFLFPPKP KDTLMISRDP EVTCVVVDVS HEDPEVKFNW YVDGVEVHNA KTKPREEQYN 180
STYRVVSVLQ VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPG                                  329

SEQ ID NO: 70            moltype = AA  length = 329
FEATURE                  Location/Qualifiers
source                   1..329
                         mol_type = protein
                         organism = synthetic construct
SEQUENCE: 70
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELAGA 120
PSVFLFPPKP KDTLMISRDP EVTCVVVDVS HEDPEVKFNW YVDGVEVHNA KTKPREEQYN 180
STYRVVSVLQ VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPG                                  329
```

```
SEQ ID NO: 71              moltype = AA   length = 329
FEATURE                    Location/Qualifiers
source                     1..329
                           mol_type = protein
                           organism = synthetic construct
SEQUENCE: 71
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRDP EVTCVVVDVS HEDPEVKFNW YVDGVEVHNA KTKPREEQYN   180
STYRVVSVLQ VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                     329

SEQ ID NO: 72              moltype = AA   length = 329
FEATURE                    Location/Qualifiers
source                     1..329
                           mol_type = protein
                           organism = synthetic construct
SEQUENCE: 72
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRDP EVTCVVVDVS HEDPEVKFNW YVDGVEVHNA KTKPREEQYN   180
STYRVVSVLQ VLHQDWLNGK EYKCKVSNKA LGAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                     329

SEQ ID NO: 73              moltype = AA   length = 329
FEATURE                    Location/Qualifiers
source                     1..329
                           mol_type = protein
                           organism = synthetic construct
SEQUENCE: 73
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRDP EVTCVVVDVS HEDPEVKFNW YVDGVEVHNA KTKPREEQYN   180
STYRVVSVLW VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                     329

SEQ ID NO: 74              moltype = AA   length = 329
FEATURE                    Location/Qualifiers
source                     1..329
                           mol_type = protein
                           organism = synthetic construct
SEQUENCE: 74
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRDP EVTCVVVDVS HEDPEVKFNW YVDGVEVHNA KTKPREEQYA   180
STYRVVSVLW VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                     329

SEQ ID NO: 75              moltype = AA   length = 329
FEATURE                    Location/Qualifiers
source                     1..329
                           mol_type = protein
                           organism = synthetic construct
SEQUENCE: 75
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRDP EVTCVVVAVS HEDPEVKFNW YVDGVEVHNA KTKPREEQYN   180
STYRVVSVLW VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                     329

SEQ ID NO: 76              moltype = AA   length = 329
FEATURE                    Location/Qualifiers
source                     1..329
                           mol_type = protein
                           organism = synthetic construct
SEQUENCE: 76
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRDP EVTCVVVDVS HEDPEVKFNW YVDGVEVHNA KTKPREEQYN   180
STYRVVSVLW VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                     329

SEQ ID NO: 77              moltype = AA   length = 329
```

```
FEATURE              Location/Qualifiers
source               1..329
                     mol_type = protein
                     organism = synthetic construct
SEQUENCE: 77
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELAGA   120
PSVFLFPPKP KDTLMISRDP EVTCVVVDVS HEDPEVKFNW YVDGVEVHNA KTKPREEQYN   180
STYRVVSVLW VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 78        moltype = AA  length = 329
FEATURE              Location/Qualifiers
source               1..329
                     mol_type = protein
                     organism = synthetic construct
SEQUENCE: 78
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGA   120
PSVFLFPPKP KDTLMISRDP EVTCVVVDVS HEDPEVKFNW YVDGVEVHNA KTKPREEQYN   180
STYRVVSVLW VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 79        moltype = AA  length = 329
FEATURE              Location/Qualifiers
source               1..329
                     mol_type = protein
                     organism = synthetic construct
SEQUENCE: 79
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRDP EVTCVVVDVS HEDPEVKFNW YVDGVEVHNA KTKPREEQYN   180
STYRVVSVLW VLHQDWLNGK EYKCKVSNKA LGAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 80        moltype = AA  length = 329
FEATURE              Location/Qualifiers
source               1..329
                     mol_type = protein
                     organism = synthetic construct
SEQUENCE: 80
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLYISRDP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 81        moltype = AA  length = 329
FEATURE              Location/Qualifiers
source               1..329
                     mol_type = protein
                     organism = synthetic construct
SEQUENCE: 81
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLYISRDP EVTCVVVDVS HEDPEVKFNW YVDGVEVHNA KTKPREEQYA   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 82        moltype = AA  length = 329
FEATURE              Location/Qualifiers
source               1..329
                     mol_type = protein
                     organism = synthetic construct
SEQUENCE: 82
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLYISRDP EVTCVVVAVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPG                                    329

SEQ ID NO: 83        moltype = AA  length = 329
FEATURE              Location/Qualifiers
```

```
source                  1..329
                        mol_type = protein
                        organism = synthetic construct
SEQUENCE: 83
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLYISRDP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPG                                   329

SEQ ID NO: 84           moltype = AA  length = 329
FEATURE                 Location/Qualifiers
source                  1..329
                        mol_type = protein
                        organism = synthetic construct
SEQUENCE: 84
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELAGA  120
PSVFLFPPKP KDTLYISRDP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPG                                   329

SEQ ID NO: 85           moltype = AA  length = 329
FEATURE                 Location/Qualifiers
source                  1..329
                        mol_type = protein
                        organism = synthetic construct
SEQUENCE: 85
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGA  120
PSVFLFPPKP KDTLYISRDP EVTCVVVDVS HEDPEVKFNW YVDGVEVHNA KTKPREEQYN  180
STYRVVSVLT VLHQDWLNGK EYKCKVSNKA LPAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPG                                   329

SEQ ID NO: 86           moltype = AA  length = 329
FEATURE                 Location/Qualifiers
source                  1..329
                        mol_type = protein
                        organism = synthetic construct
SEQUENCE: 86
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLYISRDP EVTCVVVDVS HEDPEVKFNW YVDGVEVHNA KTKPREEQYN  180
STYRVVSVLT VLHQDWLNGK EYKCKVSNKA LGAPIEKTIS KAKGQPREPQ VYTLPPSRDE  240
LTKNQVSLTC LVKGFYPSDI AVEWESNGQP ENNYKTTPPV LDSDGSFFLY SKLTVDKSRW  300
QQGNVFSCSV MHEALHNHYT QKSLSLSPG                                   329

SEQ ID NO: 87           moltype = AA  length = 329
FEATURE                 Location/Qualifiers
source                  1..329
                        mol_type = protein
                        organism = synthetic construct
SEQUENCE: 87
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVDVS HEDPEVKFNW YVDGVEVHNA KTKPREEQYN  180
STYRVVSVLQ VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 88           moltype = AA  length = 329
FEATURE                 Location/Qualifiers
source                  1..329
                        mol_type = protein
                        organism = synthetic construct
SEQUENCE: 88
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVDVS HEDPEVKFNW YVDGVEVHNA KTKPREEQYA  180
STYRVVSVLQ VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 89           moltype = AA  length = 329
FEATURE                 Location/Qualifiers
source                  1..329
```

```
                        mol_type = protein
                        organism = synthetic construct
SEQUENCE: 89
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRTP EVTCVVVAVS HEDPEVKFNW YVDGVEVHNA KTKPREEQYN  180
STYRVVSVLQ VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 90           moltype = AA   length = 329
FEATURE                 Location/Qualifiers
source                  1..329
                        mol_type = protein
                        organism = synthetic construct
SEQUENCE: 90
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLMISRTP EVTCVVVDVS HEDPEVKFNW YVDGVEVHNA KTKPREEQYN  180
STYRVVSVLQ VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 91           moltype = AA   length = 329
FEATURE                 Location/Qualifiers
source                  1..329
                        mol_type = protein
                        organism = synthetic construct
SEQUENCE: 91
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELAGA  120
PSVFLFPPKP KDTLMISRTP EVTCVVVDVS HEDPEVKFNW YVDGVEVHNA KTKPREEQYN  180
STYRVVSVLQ VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 92           moltype = AA   length = 329
FEATURE                 Location/Qualifiers
source                  1..329
                        mol_type = protein
                        organism = synthetic construct
SEQUENCE: 92
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGA  120
PSVFLFPPKP KDTLMISRTP EVTCVVVDVS HEDPEVKFNW YVDGVEVHNA KTKPREEQYN  180
STYRVVSVLQ VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 93           moltype = AA   length = 329
FEATURE                 Location/Qualifiers
source                  1..329
                        mol_type = protein
                        organism = synthetic construct
SEQUENCE: 93
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLMISRTP EVTCVVVDVS HEDPEVKFNW YVDGVEVHNA KTKPREEQYN  180
STYRVVSVLQ VLHVDWLNGK EYKCKVSNKA LGAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 94           moltype = AA   length = 329
FEATURE                 Location/Qualifiers
source                  1..329
                        mol_type = protein
                        organism = synthetic construct
SEQUENCE: 94
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRDP EVTCVVVDVS HEDPEVKFNW YVDGVEVDNA KTKPREEQYN  180
STYRVVSVLR VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 95           moltype = AA   length = 329
FEATURE                 Location/Qualifiers
source                  1..329
                        mol_type = protein
```

```
SEQUENCE: 95
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRDP EVTCVVVDVS HEDPEVKFNW YVDGVEVDNA KTKPREEQYN  180
STYRVVSVLR VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 96          moltype = AA  length = 329
FEATURE                Location/Qualifiers
source                 1..329
                       mol_type = protein
                       organism = synthetic construct
SEQUENCE: 96
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELLGG  120
PSVFLFPPKP KDTLMISRDP EVTCVVVAVS HEDPEVKFNW YVDGVEVDNA KTKPREEQYN  180
STYRVVSVLR VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 97          moltype = AA  length = 329
FEATURE                Location/Qualifiers
source                 1..329
                       mol_type = protein
                       organism = synthetic construct
SEQUENCE: 97
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLMISRDP EVTCVVVDVS HEDPEVKFNW YVDGVEVDNA KTKPREEQYA  180
STYRVVSVLR VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 98          moltype = AA  length = 329
FEATURE                Location/Qualifiers
source                 1..329
                       mol_type = protein
                       organism = synthetic construct
SEQUENCE: 98
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPELAGA  120
PSVFLFPPKP KDTLMISRDP EVTCVVVDVS HEDPEVKFNW YVDGVEVDNA KTKPREEQYN  180
STYRVVSVLR VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 99          moltype = AA  length = 329
FEATURE                Location/Qualifiers
source                 1..329
                       mol_type = protein
                       organism = synthetic construct
SEQUENCE: 99
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGA  120
PSVFLFPPKP KDTLMISRDP EVTCVVVDVS HEDPEVKFNW YVDGVEVDNA KTKPREEQYN  180
STYRVVSVLR VLHVDWLNGK EYKCKVSNKA LPAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 100         moltype = AA  length = 329
FEATURE                Location/Qualifiers
source                 1..329
                       mol_type = protein
                       organism = synthetic construct
SEQUENCE: 100
ASTKGPSVFP LAPSSKSTSG GTAALGCLVK DYFPEPVTVS WNSGALTSGV HTFPAVLQSS   60
GLYSLSSVVT VPSSSLGTQT YICNVNHKPS NTKVDKKVEP KSCDKTHTCP PCPAPEAAGG  120
PSVFLFPPKP KDTLMISRDP EVTCVVVDVS HEDPEVKFNW YVDGVEVDNA KTKPREEQYN  180
STYRVVSVLR VLHVDWLNGK EYKCKVSNKA LGAPIEKTIS KAKGQPREPQ VYTLPPSRDE  240
LTKNQVSLTC LVKGFYPSDI VVEWESNGQP ENNYKTTPPV LDSDGSFFLY SKLTVDKSRW  300
QQGNVFSCSV MHEALHNHYT QKSLSLSPG                                   329

SEQ ID NO: 101         moltype = AA  length = 329
FEATURE                Location/Qualifiers
source                 1..329
                       mol_type = protein
                       organism = synthetic construct
```

```
SEQUENCE: 101
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYN   180
STYRVVSVLT VLHRDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 102         moltype = AA  length = 327
FEATURE                Location/Qualifiers
source                 1..327
                       mol_type = protein
                       organism = synthetic construct
SEQUENCE: 102
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPSCP APEFLGGPSV   120
FLFPPKPKDT LMISRTPEVT CVVVDVSQED PEVQFNWYVD GVEVHNAKTK PREEQFNSTY   180
RVVSVLTVLH RDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVLHE ALHNHYTQKS LSLSLGK                                      327

SEQ ID NO: 103         moltype = AA  length = 327
FEATURE                Location/Qualifiers
source                 1..327
                       mol_type = protein
                       organism = synthetic construct
SEQUENCE: 103
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPPCP APEFLGGPSV   120
FLFPPKPKDT LMISRTPEVT CVVVDVSQED PEVQFNWYVD GVEVHNAKTK PREEQFNSTY   180
RVVSVLTVLH RDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVLHE ALHNHYTQKS LSLSLGK                                      327

SEQ ID NO: 104         moltype = AA  length = 327
FEATURE                Location/Qualifiers
source                 1..327
                       mol_type = protein
                       organism = synthetic construct
SEQUENCE: 104
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPPCP APEELGGPSV   120
FLFPPKPKDT LMISRTPEVT CVVVDVSQED PEVQFNWYVD GVEVHNAKTK PREEQFNSTY   180
RVVSVLTVLH RDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVLHE ALHNHYTQKS LSLSLGK                                      327

SEQ ID NO: 105         moltype = AA  length = 324
FEATURE                Location/Qualifiers
source                 1..324
                       mol_type = protein
                       organism = synthetic construct
SEQUENCE: 105
ASTKGPSVFP LAPCSRSTSE STAALGCLVK DYFPEPVTVS WNSGALTSGV HTFPAVLQSS    60
GLYSLSSVVT VPSSNFGTQT YTCNVDHKPS NTKVDKKVES KCCPPECPPCP APPVAGPSVF   120
LFPPKPKDTL MISRTPEVTC VVVDVSHEDP EVQFNWYVDG VEVHNAKTKP REEQFNSTFR   180
VVSVLTVVHR DWLNGKEYKC KVSNKGLPAP IEKTISKTKG QPREPQVYTL PPSREEMTKN   240
QVSLTCLVKG FYPSDIAVEW ESNGQPENNY KTTPPMLDSD GSFFLYSKLT VDKSRWQQGN   300
VFSCSVLHEA LHNHYTQKSL SLSP                                         324

SEQ ID NO: 106         moltype = AA  length = 329
FEATURE                Location/Qualifiers
source                 1..329
                       mol_type = protein
                       organism = synthetic construct
SEQUENCE: 106
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYA   180
STYRVVSVLT VLHRDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 107         moltype = AA  length = 329
FEATURE                Location/Qualifiers
source                 1..329
                       mol_type = protein
                       organism = synthetic construct
SEQUENCE: 107
```

```
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVAVS HEDPEVKFNW YVDGVEVHNA KTKPREEQYN   180
STYRVVSVLT VLHRDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 108          moltype = AA   length = 329
FEATURE                 Location/Qualifiers
source                  1..329
                        mol_type = protein
                        organism = synthetic construct
SEQUENCE: 108
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHRDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 109          moltype = AA   length = 329
FEATURE                 Location/Qualifiers
source                  1..329
                        mol_type = protein
                        organism = synthetic construct
SEQUENCE: 109
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELAGA   120
PSVFLFPPKP KDTLMISRTP EVTCVVVDVS HEDPEVKFNW YVDGVEVHNA KTKPREEQYN   180
STYRVVSVLT VLHRDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 110          moltype = AA   length = 329
FEATURE                 Location/Qualifiers
source                  1..329
                        mol_type = protein
                        organism = synthetic construct
SEQUENCE: 110
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGA   120
PSVFLFPPKP KDTLMISRTP EVTCVVVDVS HEDPEVKFNW YVDGVEVHNA KTKPREEQYN   180
STYRVVSVLT VLHRDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 111          moltype = AA   length = 329
FEATURE                 Location/Qualifiers
source                  1..329
                        mol_type = protein
                        organism = synthetic construct
SEQUENCE: 111
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPEAAGG   120
PSVFLFPPKP KDTLMISRTP EVTCVVVDVS HEDPEVKFNW YVDGVEVHNA KTKPREEQYN   180
STYRVVSVLT VLHRDWLNGK EYKCKVSNKA LGAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV LHEALHNHYT QKSLSLSPG                                    329

SEQ ID NO: 112          moltype = AA   length = 120
FEATURE                 Location/Qualifiers
source                  1..120
                        mol_type = protein
                        organism = synthetic construct
SEQUENCE: 112
QVQLVQSGAE VKKPGSSVKV SCKASGYTFT DQTIHWMRQA PGQGLEWIGY IYPRDDSPKY    60
NENFKGKVTI TADKSTSTAY MELSSLRSED TAVYYCAIPD RSGYAWFIYW GQGTLVTVSS   120

SEQ ID NO: 113          moltype = AA   length = 107
FEATURE                 Location/Qualifiers
source                  1..107
                        mol_type = protein
                        organism = synthetic construct
SEQUENCE: 113
DIQMTQSPSS LSASVGDRVT ITCKASRDVA IAVAWYQQKP GKVPKLLIYW ASTRHTGVPS    60
RFSGSGSRTD FTLTISSLQP EDVADYFCHQ YSSYPFTFGS GTKLEIK                107

SEQ ID NO: 114          moltype = AA   length = 5
FEATURE                 Location/Qualifiers
```

```
source                  1..5
                        mol_type = protein
                        organism = synthetic construct
SEQUENCE: 114
DQTIH                                                                    5

SEQ ID NO: 115          moltype = AA   length = 17
FEATURE                 Location/Qualifiers
source                  1..17
                        mol_type = protein
                        organism = synthetic construct
SEQUENCE: 115
YIYPRDDSPK YNENFKG                                                      17

SEQ ID NO: 116          moltype = AA   length = 11
FEATURE                 Location/Qualifiers
source                  1..11
                        mol_type = protein
                        organism = synthetic construct
SEQUENCE: 116
PDRSGYAWFI Y                                                            11

SEQ ID NO: 117          moltype = AA   length = 11
FEATURE                 Location/Qualifiers
source                  1..11
                        mol_type = protein
                        organism = synthetic construct
SEQUENCE: 117
KASRDVAIAV A                                                            11

SEQ ID NO: 118          moltype = AA   length = 7
FEATURE                 Location/Qualifiers
source                  1..7
                        mol_type = protein
                        organism = synthetic construct
SEQUENCE: 118
WASTRHT                                                                  7

SEQ ID NO: 119          moltype = AA   length = 9
FEATURE                 Location/Qualifiers
source                  1..9
                        mol_type = protein
                        organism = synthetic construct
SEQUENCE: 119
HQYSSYPFT                                                                9

SEQ ID NO: 120          moltype = AA   length = 117
FEATURE                 Location/Qualifiers
source                  1..117
                        mol_type = protein
                        organism = synthetic construct
SEQUENCE: 120
EVQLVQSGAE VKKPGESLKI SCKGSGYSFS NYWIGWVRQM PGKGLEWMGI IDPSNSYTRY        60
SPSFQGQVTI SADKSISTAY LQWSSLKASD TAMYYCARWY YKPFDVWGQG TLVTVSS          117

SEQ ID NO: 121          moltype = AA   length = 111
FEATURE                 Location/Qualifiers
source                  1..111
                        mol_type = protein
                        organism = synthetic construct
SEQUENCE: 121
QSVLTQPPSV SGAPGQRVTI SCTGSSSNIG SGYDVHWYQQ LPGTAPKLLI YGNSKRPSGV        60
PDRFSGSKSG TSASLAITGL QSEDEADYYC ASWTDGLSLV VFGGGTKLTV L                111

SEQ ID NO: 122          moltype = AA   length = 5
FEATURE                 Location/Qualifiers
source                  1..5
                        mol_type = protein
                        organism = synthetic construct
SEQUENCE: 122
NYWIG                                                                    5

SEQ ID NO: 123          moltype = AA   length = 17
FEATURE                 Location/Qualifiers
source                  1..17
                        mol_type = protein
                        organism = synthetic construct
SEQUENCE: 123
IIDPSNSYTR YSPSFQG                                                      17
```

```
SEQ ID NO: 124          moltype = AA   length = 8
FEATURE                 Location/Qualifiers
source                  1..8
                        mol_type = protein
                        organism = synthetic construct
SEQUENCE: 124
WYYKPFDV                                                                   8

SEQ ID NO: 125          moltype = AA   length = 14
FEATURE                 Location/Qualifiers
source                  1..14
                        mol_type = protein
                        organism = synthetic construct
SEQUENCE: 125
TGSSSNIGSG YDVH                                                           14

SEQ ID NO: 126          moltype = AA   length = 7
FEATURE                 Location/Qualifiers
source                  1..7
                        mol_type = protein
                        organism = synthetic construct
SEQUENCE: 126
GNSKRPS                                                                    7

SEQ ID NO: 127          moltype = AA   length = 11
FEATURE                 Location/Qualifiers
source                  1..11
                        mol_type = protein
                        organism = synthetic construct
SEQUENCE: 127
ASWTDGLSLV V                                                              11

SEQ ID NO: 128          moltype = AA   length = 450
FEATURE                 Location/Qualifiers
source                  1..450
                        mol_type = protein
                        organism = synthetic construct
SEQUENCE: 128
QVQLVQSGAE VKKPGSSVKV SCKASGYTFT AQTIHWMRQA PGQGLEWIGY IYPRDDTPKY          60
NPNFKGKVTI TADKSTSTAY MELSSLRSED TAVYYCAIPD RSGYAWFDYW GQGTLVTVSS         120
ASTKGPSVFP LAPSSKSTSG GTAALGCLVK DYFPEPVTVS WNSGALTSGV HTFPAVLQSS         180
GLYSLSSVVT VPSSSLGTQT YICNVNHKPS NTKVDKKVEP KSCDKTHTCP PCPAPEAAGG         240
PSVFLFPPKP KDTLYITREP EVTCVVVDVS HEDPEVKFNW YVDGVEVHNA KTKPREEQYN         300
STYRVVSVLT VLHQDWLNGK EYKCKVSNKA LPAPIEKTIS KAKGQPREPQ VYTLPPSRDE         360
LTKNQVSLTC LVKGFYPSDI AVEWESNGQP ENNYKTTPPV LDSDGSFFLY SKLTVDKSRW         420
QQGNVFSCSV MHEALHNHYT QKSLSLSPGK                                         450

SEQ ID NO: 129          moltype = AA   length = 131
FEATURE                 Location/Qualifiers
source                  1..131
                        mol_type = protein
                        organism = synthetic construct
SEQUENCE: 129
DIQMTQSPSS LSASVGDRVT ITCKASRDVA IAVAWYQQKP GKVPKLLIYW ASTRHTGVPS          60
RFSGSGSRTD FTLTISSLQP EDVADYFCHQ YSSYPFTFGS GTKLEIKRTV AAPSVFIFPP         120
SDEQLKSGTA S                                                             131

SEQ ID NO: 130          moltype = AA   length = 120
FEATURE                 Location/Qualifiers
source                  1..120
                        mol_type = protein
                        organism = synthetic construct
SEQUENCE: 130
QVQLVQSGAE VKKPGSSVKV SCKASGYTFT AQTIHWMRQA PGQGLEWIGY IYPRDDTPKY          60
NPNFKGKVTI TADKSTSTAY MELSSLRSED TAVYYCAIPD RSGYAWFDYW GQGTLVTVSS         120

SEQ ID NO: 131          moltype = AA   length = 5
FEATURE                 Location/Qualifiers
source                  1..5
                        mol_type = protein
                        organism = synthetic construct
SEQUENCE: 131
AQTIH                                                                      5

SEQ ID NO: 132          moltype = AA   length = 17
FEATURE                 Location/Qualifiers
source                  1..17
                        mol_type = protein
```

```
                              -continued
                    organism = synthetic construct
SEQUENCE: 132
YIYPRDDTPK YNPNFKG                                              17

SEQ ID NO: 133      moltype = AA   length = 11
FEATURE             Location/Qualifiers
source              1..11
                    mol_type = protein
                    organism = synthetic construct
SEQUENCE: 133
PDRSGYAWFD Y                                                    11

SEQ ID NO: 134      moltype = AA   length = 8
FEATURE             Location/Qualifiers
source              1..8
                    mol_type = protein
                    organism = synthetic construct
SEQUENCE: 134
GYTFTAQT                                                        8

SEQ ID NO: 135      moltype = AA   length = 8
FEATURE             Location/Qualifiers
source              1..8
                    mol_type = protein
                    organism = synthetic construct
SEQUENCE: 135
IYPRDDTP                                                        8

SEQ ID NO: 136      moltype = AA   length = 13
FEATURE             Location/Qualifiers
source              1..13
                    mol_type = protein
                    organism = synthetic construct
SEQUENCE: 136
AIPDRSGYAW FDY                                                  13

SEQ ID NO: 137      moltype = AA   length = 6
FEATURE             Location/Qualifiers
source              1..6
                    mol_type = protein
                    organism = synthetic construct
SEQUENCE: 137
RDVAIA                                                          6

SEQ ID NO: 138      moltype = AA   length = 7
FEATURE             Location/Qualifiers
source              1..7
                    mol_type = protein
                    organism = synthetic construct
SEQUENCE: 138
GYTFTAQ                                                         7

SEQ ID NO: 139      moltype = AA   length = 6
FEATURE             Location/Qualifiers
source              1..6
                    mol_type = protein
                    organism = synthetic construct
SEQUENCE: 139
YPRDDT                                                          6

SEQ ID NO: 140      moltype = AA   length = 9
FEATURE             Location/Qualifiers
source              1..9
                    mol_type = protein
                    organism = synthetic construct
SEQUENCE: 140
DRSGYAWFD                                                       9

SEQ ID NO: 141      moltype = AA   length = 7
FEATURE             Location/Qualifiers
source              1..7
                    mol_type = protein
                    organism = synthetic construct
SEQUENCE: 141
SRDVAIA                                                         7

SEQ ID NO: 142      moltype = AA   length = 6
FEATURE             Location/Qualifiers
source              1..6
```

```
                        mol_type = protein
                        organism = synthetic construct
SEQUENCE: 142
YSSYPF                                                                    6

SEQ ID NO: 143          moltype = AA  length = 450
FEATURE                 Location/Qualifiers
source                  1..450
                        mol_type = protein
                        organism = synthetic construct
SEQUENCE: 143
EVQLLESGGG LVQPGGSLRL SCAASGYTFT DQTIHWVRQA PGKGLEWIGY IYPRDDSPKY         60
NENFKGRATL SADKSKNTAY LQMNSLRAED TAVYYCAIPD RSGYAWFIYW GQGTTVTVSS        120
ASTKGPSVFP LAPSSKSTSG GTAALGCLVK DYFPEPVTVS WNSGALTSGV HTFPAVLQSS        180
GLYSLSSVVT VPSSSLGTQT YICNVNHKPS NTKVDKKVEP KSCDKTHTCP PCPAPEAAGG        240
PSVFLFPPKP KDTLYITREP EVTCVVVDVS HEDPEVKFNW YVDGVEVHNA KTKPREEQYN        300
STYRVVSVLT VLHQDWLNGK EYKCKVSNKA LPAPIEKTIS KAKGQPREPQ VYTLPPSRDE        360
LTKNQVSLTC LVKGFYPSDI AVEWESNGQP ENNYKTTPPV LDSDGSFFLY SKLTVDKSRW        420
QQGNVFSCSV MHEALHNHYT QKSLSLSPGK                                        450

SEQ ID NO: 144          moltype = AA  length = 214
FEATURE                 Location/Qualifiers
source                  1..214
                        mol_type = protein
                        organism = synthetic construct
SEQUENCE: 144
EIVMTQSPAT LSVSPGERAT LSCKASRDVA IAVAWYQQKP GQAPRLLLYW ASTRHTGIPA         60
RFSGSGSRTE FTLTISSLQS EDFAVYYCHQ YSSYPFTFGG GTKVEIKRTV AAPSVFIFPP        120
SDEQLKSGTA SVVCLLNNFY PREAKVQWKV DNALQSGNSQ ESVTEQDSKD STYSLSSTLT        180
LSKADYEKHK VYACEVTHQG LSSPVTKSFN RGEC                                   214

SEQ ID NO: 145          moltype = AA  length = 120
FEATURE                 Location/Qualifiers
source                  1..120
                        mol_type = protein
                        organism = synthetic construct
SEQUENCE: 145
EVQLLESGGG LVQPGGSLRL SCAASGYTFT DQTIHWVRQA PGKGLEWIGY IYPRDDSPKY         60
NENFKGRATL SADKSKNTAY LQMNSLRAED TAVYYCAIPD RSGYAWFIYW GQGTTVTVSS        120

SEQ ID NO: 146          moltype = AA  length = 107
FEATURE                 Location/Qualifiers
source                  1..107
                        mol_type = protein
                        organism = synthetic construct
SEQUENCE: 146
EIVMTQSPAT LSVSPGERAT LSCKASRDVA IAVAWYQQKP GQAPRLLLYW ASTRHTGIPA         60
RFSGSGSRTE FTLTISSLQS EDFAVYYCHQ YSSYPFTFGG GTKVEIK                     107

SEQ ID NO: 147          moltype = AA  length = 8
FEATURE                 Location/Qualifiers
source                  1..8
                        mol_type = protein
                        organism = synthetic construct
SEQUENCE: 147
GYTFTDQT                                                                  8

SEQ ID NO: 148          moltype = AA  length = 8
FEATURE                 Location/Qualifiers
source                  1..8
                        mol_type = protein
                        organism = synthetic construct
SEQUENCE: 148
IYPRDDSP                                                                  8

SEQ ID NO: 149          moltype = AA  length = 13
FEATURE                 Location/Qualifiers
source                  1..13
                        mol_type = protein
                        organism = synthetic construct
SEQUENCE: 149
AIPDRSGYAW FIY                                                           13

SEQ ID NO: 150          moltype = AA  length = 7
FEATURE                 Location/Qualifiers
source                  1..7
                        mol_type = protein
                        organism = synthetic construct
SEQUENCE: 150
```

```
GYTFTDQ                                                                               7

SEQ ID NO: 151          moltype = AA  length = 6
FEATURE                 Location/Qualifiers
source                  1..6
                        mol_type = protein
                        organism = synthetic construct
SEQUENCE: 151
YPRDDS                                                                                6

SEQ ID NO: 152          moltype = AA  length = 9
FEATURE                 Location/Qualifiers
source                  1..9
                        mol_type = protein
                        organism = synthetic construct
SEQUENCE: 152
DRSGYAWFI                                                                             9

SEQ ID NO: 153          moltype = AA  length = 214
FEATURE                 Location/Qualifiers
source                  1..214
                        mol_type = protein
                        organism = synthetic construct
SEQUENCE: 153
EIVMTQSPAT LSVSPGERAT LSCKASRDVA IAVAWYQQKP GQAPRLLLFW ASTRHTGIPA    60
RFSGSGSRTE FTLTISSLQS EDFAVYYCHQ YSSYPFTFGG GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 154          moltype = AA  length = 107
FEATURE                 Location/Qualifiers
source                  1..107
                        mol_type = protein
                        organism = synthetic construct
SEQUENCE: 154
EIVMTQSPAT LSVSPGERAT LSCKASRDVA IAVAWYQQKP GQAPRLLLFW ASTRHTGIPA    60
RFSGSGSRTE FTLTISSLQS EDFAVYYCHQ YSSYPFTFGG GTKVEIK                 107

SEQ ID NO: 155          moltype = AA  length = 449
FEATURE                 Location/Qualifiers
source                  1..449
                        mol_type = protein
                        organism = synthetic construct
SEQUENCE: 155
QVQLVQSGAE VKKPGSSVKV SCKASGYTFT DQTIHWMRQA PGQGLEWIGY IYPRDDSPKY    60
NENFKGKVTI TADKSTSTAY MELSSLRSED TAVYYCAIPD RSGYAWFIYW GQGTLVTVSS   120
ASTKGPSVFP LAPSSKSTSG GTAALGCLVK DYFPEPVTVS WNSGALTSGV HTFPAVLQSS   180
GLYSLSSVVT VPSSSLGTQT YICNVNHKPS NTKVDKRVEP KSCDKTHTCP PCPAPEAAGG   240
PSVFLFPPKP KDTLMISRTP EVTCVVVDVS HEDPEVKFNW YVDGVEVHNA KTKPREEQYN   300
STYRVVSVLT VLHQDWLNGK EYKCKVSNKA LPAPIEKTIS KAKGQPREPQ VYTLPPSREE   360
MTKNQVSLTC LVKGFYPSDI AVEWESNGQP ENNYKTTPPV LDSDGSFFLY SKLTVDKSRW   420
QQGNVFSCSV MHEALHNHYT QKSLSLSPG                                    449

SEQ ID NO: 156          moltype = AA  length = 214
FEATURE                 Location/Qualifiers
source                  1..214
                        mol_type = protein
                        organism = synthetic construct
SEQUENCE: 156
DIQMTQSPSS LSASVGDRVT ITCKASRDVA IAVAWYQQKP GKVPKLLIYW ASTRHTGVPS    60
RFSGSGSRTD FTLTISSLQP EDVADYFCHQ YSSYPFTFGS GTKLEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214
```

IL-23 ANTIBODY COMPOSITIONS AND METHODS OF USE

CROSS-REFERENCE TO RELATED APPLICATIONS

This application is a Continuation of International Application No. PCT/US2025/014561, filed on Feb. 5, 2025, which claims priority to, and the benefit to U.S. Provisional Application No. 63/698,552, filed Sep. 24, 2024, U.S. Provisional Application No. 63/550,224, filed Feb. 6, 2024, U.S. Provisional Application No. 63/550,178, filed Feb. 6, 2024 and U.S. Provisional Application No. 63/550,173, filed Feb. 6, 2024, the entire disclosures of which are hereby incorporated by reference in their entirety for all purposes.

SEQUENCE LISTING

The instant application contains a Sequence Listing which has been submitted electronically in XML file format and is hereby incorporated by reference in its entirety. Said XML copy, created on May 22, 2025, is named ORJ-021PCCN_Sequence-Listing.xml and is 171 KB in size.

BACKGROUND

Interleukin-23 (IL-23) is a key inflammatory cytokine that promotes the differentiation of T helper 17 cells, leading to production of other cytokines such as interleukin-17. IL-23 plays a role in inflammatory bowel disease. Levels of IL-23 are elevated in the intestine of individuals with Crohn's disease, and severity of disease in individuals with ulcerative colitis was correlated with increased levels of IL-23. Due to the importance of IL-23 in mediating pro-inflammatory responses, IL-23 represents a therapeutic target for inflammatory bowel diseases and indicates the need for development of development of inhibitors targeting IL-23.

SUMMARY

Described herein, in certain embodiments, are IL-23 binding proteins.

In one aspect, provided are IL-23 binding proteins comprising a heavy chain variable domain (VH) comprising complementarity-determining regions: CDR-H1 comprising the amino acid sequence of SEQ ID NO: 131; CDR-H2 comprising the amino acid sequence of SEQ ID NO:132; and CDR-H3 comprising the amino acid sequence of SEQ ID NO: 133.

In some embodiments, the VH comprises an amino acid sequence that is at least 85% identical to that of SEQ ID NO: 130.

In some embodiments, the IL-23 binding protein further comprises a light chain variable domain (VL) comprising complementarity-determining regions: (a) CDR-L1 comprising the amino acid sequence of SEQ ID NO: 117; CDR-L2 comprising the amino acid sequence of SEQ ID NO: 118; and CDR-L3 comprising the amino acid sequence of SEQ ID NO: 119.

In some embodiments, the VL comprises an amino acid sequence that is at least 85% identical to that of SEQ ID NO: 113.

In one aspect, provided are IL-23 binding proteins comprising (a) a heavy chain variable domain (VH) comprising complementarity-determining regions: CDR-H1 comprising the amino acid sequence of SEQ ID NO: 131; CDR-H2 comprising the amino acid sequence of SEQ ID NO: 132; and CDR-H3 comprising the amino acid sequence of SEQ ID NO: 133; and (b) a light chain variable domain (VL) comprising complementarity-determining regions: CDR-L1 comprising the amino acid sequence of SEQ ID NO: 117; CDR-L2 comprising the amino acid sequence of SEQ ID NO: 118; and CDR-L3 comprising the amino acid sequence of SEQ ID NO: 119.

In one aspect, provided are IL-23 binding proteins comprising an immunoglobulin heavy chain variable domain comprising the amino acid sequence of SEQ ID NO: 130 and an immunoglobulin light chain variable domain comprising the amino acid sequence of SEQ ID NO: 113.

In one aspect, provided are IL-23 binding proteins comprising an immunoglobulin heavy chain comprising the amino acid sequence of SEQ ID NO: 128 and an immunoglobulin light chain comprising the amino acid sequence of SEQ ID NO: 129.

In some embodiments, the IL-23 binding protein is capable of inhibiting activation of STAT3 at a relative IC50 of less than 0.90, less than 0.80, less than 0.70, less than 0.60, or less than 0.58.

In some embodiments, the IL-23 binding protein is capable of inhibiting phosphorylation of STAT3 at a relative IC50 of less than 0.90, less than 0.80, less than 0.70, less than 0.60, or less than 0.55.

In some embodiments, the IL-23 binding proteins is capable of inhibiting IL-23-induced release of IL-17 at a relative IC50 of (a) less than 1.00, less than 0.90, or less than 0.80 or (b) about 0.70.

In one aspect, provided are IL-23 binding proteins comprising (a) a heavy chain variable domain (VH) comprising (1) an amino acid sequence that is at least 85% identical to that of SEQ ID NO: 145 and (2) a lysine at position 74 of SEQ ID NO: 145; and (b) a light chain variable domain (VL) comprising: (1) an amino acid sequence that is at least 85% identical to that of SEQ ID NO: 146, and (2) a tyrosine at position 49 of SEQ ID NO: 146, wherein (i) the VH comprises complementarity-determining regions: CDR-H1 comprising the amino acid sequence of SEQ ID NO: 114; CDR-H2 comprising the amino acid sequence of SEQ ID NO: 115; and CDR-H3 comprising the amino acid sequence of SEQ ID NO: 116; and (ii) the VL comprises complementarity-determining regions: CDR-L1 comprising the amino acid sequence of SEQ ID NO: 117; CDR-L2 comprising the amino acid sequence of SEQ ID NO: 118; and CDR-L3 comprising the amino acid sequence of SEQ ID NO: 119.

In some embodiments, VH comprises an amino acid residue other than an asparagine residue at position 27 of SEQ ID NO: 145, for example, a tyrosine residue at position 27 of SEQ ID NO: 145.

In some embodiments, the VH comprises an amino acid sequence that is at least 90% identical to that of SEQ ID NO: 145, and the VL comprises an amino acid sequence that is at least 90% identical to that of SEQ ID NO: 146.

In some embodiments, the VH comprises an amino acid sequence that is at least 92.5% identical to that of SEQ ID NO: 145, and the VL comprises an amino acid sequence that is at least 92.5% identical to that of SEQ ID NO: 146.

In some embodiments, the VH comprises an amino acid sequence that is at least 95% identical to that of SEQ ID NO: 145, and the VL comprises an amino acid sequence that is at least 95% identical to that of SEQ ID NO: 146.

In some embodiments, the VH comprises an amino acid sequence that is at least 98% identical to that of SEQ ID NO: 145, and the VL comprises an amino acid sequence that is at least 98% identical to that of SEQ ID NO: 146.

In some embodiments, the VH comprises the amino acid sequence of SEQ ID NO: 145, and the VL comprises the amino acid sequence of SEQ ID NO: 146.

In one aspect, provided are IL-23 binding proteins comprising an immunoglobulin heavy chain variable domain comprising the amino acid sequence of SEQ ID NO: 145 and an immunoglobulin light chain variable domain comprising the amino acid sequence of SEQ ID NO: 146.

In one aspect, provided are IL-23 binding proteins comprising an immunoglobulin heavy chain comprising the amino acid sequence of SEQ ID NO: 143 and an immunoglobulin light chain comprising the amino acid sequence of SEQ ID NO: 144.

In some embodiments, the IL-23 binding protein is capable of inhibiting activation of STAT3 at a relative IC50 of less than 0.9 or less than 0.8.

In some embodiments, the IL-23 binding protein is capable of inhibiting IL-23-induced release of IL-17 at a relative IC50 of (a) less than 1.00, or less than 0.90 or (b) about 0.80.

In one aspect, provided are IL-23 binding proteins comprising (a) a heavy chain variable domain (VH) comprising (1) an amino acid sequence that is at least 85% identical to that of SEQ ID NO: 145 and (2) a lysine residue at position 74 of SEQ ID NO: 145; and (b) a light chain variable domain (VL) comprising: (1) an amino acid sequence that is at least 85% identical to that of SEQ ID NO: 154, and (2) a phenylalanine residue at position 49 of SEQ ID NO: 154, wherein (i) the VH comprises complementarity-determining regions: CDR-H1 comprising the amino acid sequence of SEQ ID NO: 114; CDR-H2 comprising the amino acid sequence of SEQ ID NO: 115; and CDR-H3 comprising the amino acid sequence of SEQ ID NO: 116; and (ii) the VL comprises complementarity-determining regions: CDR-L1 comprising the amino acid sequence of SEQ ID NO: 117; CDR-L2 comprising the amino acid sequence of SEQ ID NO: 118; and CDR-L3 comprising the amino acid sequence of SEQ ID NO: 119.

In some embodiments, the VH comprises an amino acid residue other than an asparagine residue at position 27 of SEQ ID NO: 145, for example, a tyrosine residue at position 27 of SEQ ID NO: 145.

In some embodiments, the VH comprises an amino acid sequence that is at least 90% identical to that of SEQ ID NO: 145, and the VL comprises an amino acid sequence that is at least 90% identical to that of SEQ ID NO: 154.

In some embodiments, the VH comprises an amino acid sequence that is at least 92.5% identical to that of SEQ ID NO: 145, and the VL comprises an amino acid sequence that is at least 92.5% identical to that of SEQ ID NO: 154.

In some embodiments, the VH comprises an amino acid sequence that is at least 95% identical to that of SEQ ID NO: 145, and the VL comprises an amino acid sequence that is at least 95% identical to that of SEQ ID NO: 154.

In some embodiments, the VH comprises an amino acid sequence that is at least 98% identical to that of SEQ ID NO: 145, and the VL comprises an amino acid sequence that is at least 98% identical to that of SEQ ID NO: 154.

In some embodiments, the VH comprises the amino acid sequence of SEQ ID NO: 145, and the VL comprises the amino acid sequence of SEQ ID NO: 154.

In one aspect, provided are IL-23 binding proteins comprising an immunoglobulin heavy chain variable domain comprising the amino acid sequence of SEQ ID NO: 145 and an immunoglobulin light chain variable domain comprising the amino acid sequence of SEQ ID NO: 154.

In one aspect, provided are IL-23 binding proteins comprising an immunoglobulin heavy chain comprising the amino acid sequence of SEQ ID NO: 143 and an immunoglobulin light chain comprising the amino acid sequence of SEQ ID NO: 153.

In some embodiments, the IL-23 binding protein is capable of inhibiting activation of STAT3 at a relative IC50 of less than 0.90, less than 0.80, or less than 0.70.

In some embodiments, the IL-23 binding protein is capable of inhibiting IL-23-induced release of IL-17 at a relative IC50 of (a) less than 1.00 or less than 0.90 or (2) about 0.80.

In some embodiments, the IL-23 binding protein is an antibody or antigen-binding fragment thereof.

In some embodiments, the IL-23 binding protein is a human or humanized antibody or antigen-binding fragment thereof.

In some embodiments, the antigen binding fragment is a Fab, a F(ab')2, a Fab', a single-chain Fv (scFv), an Fv fragment, a Fd fragment, or a diabody.

In some embodiments, the IL-23 binding protein comprises an Fc region, such as an IgG1, IgG2, or IgG4 Fc region, such as a human IgG1, IgG2, or IgG4 Fc region.

In some embodiments, the Fc region is a modified Fc region, such as a modified Fc region that comprises a half-life extending mutation or set of mutations. For example, in some embodiments, the modified Fc region comprises amino acid modifications M252Y, S254T, and T256E (YTE) and/or M428L and N434S (LS). In some embodiments, the modified Fc region comprises an Fc chain having the amino acid sequence of SEQ ID NO: 15.

In one aspect, provided are isolated nucleic acids encoding an IL-23 binding protein as disclosed herein.

In one aspect, provided are expression vectors comprising an isolated nucleic acid as disclosed herein.

In one aspect, provided are host cells comprising an isolated nucleic acid molecule or an expression vector disclosed herein.

In one aspect, provided are compositions comprising an IL-23 binding protein disclosed herein and a pharmaceutically acceptable carrier.

In one aspect, provided are methods of treating a disease or condition in a subject, comprising a step of administering to the subject an effective amount of the IL-23 binding protein or the composition disclosed herein.

Also provided, in one aspect, are methods of treating a disease or condition in a subject, comprising a step of co-administering to the subject (1) an IL-23 binding protein or composition as disclosed herein and (2) a second therapeutic agent in an amount that is therapeutically effective when co-administered.

In some embodiments, the disease or condition is inflammatory bowel disease.

In some embodiments, the disease or condition is an inflammatory condition, such as psoriasis, psoriatic arthritis, or hidradenitis suppurativa.

In some embodiments, the step of administration comprises subcutaneous administration or intravenous administration.

Also provided, in one aspect, are IL-23 binding proteins or compositions disclosed herein for use in the treatment of a disease or condition.

Also provided, in one aspect, are uses of the IL-23 binding proteins or compositions disclosed herein in a method of treating a disease or condition.

In one aspect, provided are uses of the IL-23 binding proteins or compositions disclosed herein for the manufacture of a medicament for treating a disease or condition.

In some embodiments, the disease or condition is inflammatory bowel disease.

In some embodiments, the disease or condition is an inflammatory condition, such as psoriasis, psoriatic arthritis, or hidradenitis suppurativa.

BRIEF DESCRIPTION OF THE DRAWING

The drawing depicts the percent inhibition of IL-17 release in human PBMCs for IL-23 antibody clones 107, 202, or 203 and for Reference Antibody 1. (See Example 6.)

DETAILED DESCRIPTION OF CERTAIN EMBODIMENTS

Definitions

As used herein, the terms "about," "approximately," and "comparable to," when used herein in reference to a value, refer to a value that is similar to the referenced value in the context of that referenced value. In general, those skilled in the art, familiar with the context, will appreciate the relevant degree of variance encompassed by "about," "approximately," and "comparable to" in that context. For example, in some embodiments, the terms "about," "approximately," and "comparable to" may encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or less of the referred value.

As used herein, the terms "antagonistic," "neutralizing" or "blocking," when used in reference to an antibody or antigen-binding fragment thereof, is intended to refer to an antibody or fragment thereof whose binding to its target results in inhibition of at least some of the biological activity of the target.

As used herein, "antibody" refers to a polypeptide whose amino acid sequence includes immunoglobulins and fragments thereof which specifically bind to a designated antigen, or fragments thereof. Antibodies in accordance with the present invention may be of any type (e.g., IgA, IgD, IgE, IgG, or IgM) or subtype (e.g., IgA1, IgA2, IgG1, IgG2, IgG3, or IgG4). Those of ordinary skill in the art will appreciate that a characteristic sequence or portion of an antibody may include amino acids found in one or more regions of an antibody (e.g., variable region, hypervariable region, constant region, heavy chain, light chain, and combinations thereof). Moreover, those of ordinary skill in the art will appreciate that a characteristic sequence or portion of an antibody may include one or more polypeptide chains, and may include sequence elements found in the same polypeptide chain or in different polypeptide chains.

"Antibody-dependent cell-mediated cytotoxicity" or "ADCC" refers to a form of cytotoxicity in which secreted Ig bound onto Fc receptors (FcRs) present on certain cytotoxic cells (e.g. Natural Killer (NK) cells, neutrophils, and macrophages) enable these cytotoxic effector cells to bind specifically to an antigen-bearing target cell and subsequently kill the target cell with cytotoxins. The antibodies "arm" the cytotoxic cells and are absolutely required for such killing. The primary cells for mediating ADCC, NK cells, express FcγRIII only, whereas monocytes express FcγRI, FcγRII and FcγRIII. FcR expression on hematopoietic cells is summarized in Table 3 on page 464 of Ravetch and Kinet, Annu. Rev. Immunol 9:457-92 (1991). To assess ADCC activity of a molecule of interest, an in vitro ADCC assay, such as that described in U.S. Pat. No. 5,500,362 or 5,821,337 may be performed. Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. PNAS (USA) 95:652-656 (1998).

An "antigen-binding fragment" of an antibody, or "antibody fragment" comprises a portion of an intact antibody, which portion is still capable of antigen binding. In some embodiments, the antibody has a function in addition to that of antigen-binding, and an antigen-binding fragment retains that function. Typically, an antigen-binding fragment comprises the variable region of the antibody. Papain digestion of antibodies produce two identical antigen-binding fragments, called "Fab" fragments, and a residual "Fc" fragment, a designation reflecting the ability to crystallize readily. The Fab fragment consists of an entire light chain along with the variable region domain of the heavy chain (VH), and the first constant domain of one heavy chain ($C_H1$). Each Fab fragment is monovalent with respect to antigen binding, i.e., it has a single antigen-binding site. Pepsin treatment of an antibody yields a single large $F(ab')_2$ fragment which roughly corresponds to two disulfide linked Fab fragments having different antigen-binding activity and that is still capable of cross-linking antigen. Fab' fragments differ from Fab fragments by having a few additional residues at the carboxy terminus of the $C_H1$ domain, including one or more cysteines from the antibody hinge region. Fab'-SH designates an Fab' in which the cysteine residue(s) of the constant domains bear a free thiol group. $F(ab')_2$ antibody fragments originally were produced as pairs of Fab' fragments having hinge cysteines between them. Other chemical couplings of antibody fragments are also known.

As used herein, the term "chimeric antibody" refers to an antibody that has a portion of its heavy and/or light chain identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass.

As used herein, the terms "co-administer," "administer in combination," "combined administration," and like terms means that two or more agents are administered to a subject at the same time or within an interval such that there may be an overlap of an effect of each agent on the patient. Thus, two or more agents that are administered in combination need not be administered together. In some embodiments, they are administered within 90 days (e.g., within 80, 70, 60, 50, 40, 30, 20, 10, 5, 4, 3, 2, or 1 day(s)), within 28 days (e.g., with 14, 7, 6, 5, 4, 3, 2, or 1 day(s), within 24 hours (e.g., 12, 6, 5, 4, 3, 2, or 1 hour(s), or within about 60, 30, 15, 10, 5, or 1 minute of one another. In some embodiments, the administrations of the agents are spaced sufficiently closely together such that a combinatorial effect is achieved.

A "complementarity determining region" (abbreviated "CDR") is a region of hypervariability interspersed within regions that are more conserved, termed "framework regions" (abbreviated "FR"). In some embodiments, the sequences of the framework regions are identical to the framework regions in human germline sequences. In some embodiments, the sequences of the framework regions are modified with respect to the human germline sequence.

As used herein, the phrase "complement dependent cytotoxicity" or "CDC" refers to the lysis of a target cell in the presence of complement. Activation of the classical complement pathway is initiated by the binding of the first component of the complement system (C1q) to antibodies (of the appropriate subclass) which are bound to their cognate antigen. To assess complement activation, a CDC assay, e.g., as described in Gazzano-Santoro et al., J. Immunol. Methods 202:163 (1996), may be performed.

As used herein, the expression "control sequences" refers to DNA sequences necessary or advantageous for the expression of an operably linked coding sequence in a particular host organism. Control sequences that are typically suitable for prokaryotes, for example, include a promoter, optionally an operator sequence, and a ribosome binding site. Eukaryotic cells are known to utilize promoters, polyadenylation signals, and enhancers.

As used herein, antibody "effector functions" refer to those biological activities attributable to the Fc region (a native sequence Fc region or amino acid sequence variant Fc region) of an antibody, and which typically vary with the antibody isotype. Examples of antibody effector functions include, but are not limited to, C1q binding and complement dependent cytotoxicity, Fc receptor binding; antibody-dependent cell-mediated cytotoxicity (ADCC); phagocytosis, down regulation of cell surface receptors (e.g. B cell receptor), and B cell activation.

As used herein, the term "epitope" is an antigenic determinant that interacts with a specific antigen binding site in the variable region of an antibody molecule, known as the paratope, and which is comprised of the six complementary-determining regions of the antibody. A single antigen may have more than one epitope. Epitopes may be conformational or linear. A conformational epitope is comprised of spatially juxtaposed amino acids from different segments of a linear polypeptide chain. A linear epitope is comprised of adjacent amino acid residues in a polypeptide chain.

An Fc fragment comprises the carboxy-terminal portions of both heavy chains held together by disulfides. The effector functions of antibodies are determined by sequences in the Fc region, the region which is also recognized by Fc receptors (FcR) found on certain types of cells.

As used herein, the term "humanized," when used in reference to an antibody, refers to a form of a non-human (e.g., murine) antibody that is chimeric. A "humanized antibody" contains minimal sequences derived from non-human immunoglobulin. Typically, humanized antibodies are human immunoglobulins (recipient or acceptor antibody) in which hypervariable region residues of the recipient are replaced by hypervariable region residues from a non-human species (donor antibody) such as mouse, rat, rabbit or nonhuman primate having a desired specificity, affinity, and capacity. In some instances, Fv framework region (FR) residues of the human immunoglobulin are replaced by corresponding non-human residues. Furthermore, humanized antibodies may comprise residues which are not found in the recipient antibody or in the donor antibody. These modifications are made to further refine antibody performance such as binding affinity. Generally, the humanized antibody will comprise substantially all of at least one, and typically two, variable domains, in which all or substantially all of the hypervariable loops correspond to those of a non-human immunoglobulin and all or substantially all of the framework regions are those of a human immunoglobulin sequence although the framework regions may include one or more amino acid substitutions that improve binding affinity. In some embodiments, no more than six amino acid substitutions in the heavy chain and no more than three amino acid substitutions are used in the light chain in the framework region. The humanized antibody optionally also will comprise at least a portion of an immunoglobulin constant region (Fc), typically that of a human immunoglobulin.

As used herein, an "isolated" nucleic acid molecule is a nucleic acid molecule that is identified and separated from at least one contaminant molecule with which it is ordinarily associated in the natural source of the antibody nucleic acid. An isolated nucleic acid molecule is other than in the form or setting in which it is found in nature. Isolated nucleic acid molecules therefore are distinguished from the nucleic acid molecule as they exists in natural cells.

As used herein, the term "monoclonal antibody" refers to an antibody obtained from a population of substantially homogeneous antibodies, e.g., the individual antibodies comprising the population are identical except for possible naturally occurring mutations that may be present in minor amounts. Monoclonal antibodies are highly specific, being directed against a single antigenic site. Furthermore, in contrast to conventional (polyclonal) antibody preparations which typically include different antibodies directed against different determinants (epitopes), each monoclonal antibody is directed against a single determinant on the antigen. The modifier "monoclonal" indicates the character of the antibody as being obtained from a substantially homogeneous population of antibodies, and is not to be construed as requiring production of the antibody by any particular method. For example, monoclonal antibodies may be made by a hybridoma method, such as that first described by Kohler et al., Nature 256:495 (1975), or may be made by recombinant DNA methods (see, e.g., U.S. Pat. No. 4,816, 567). "Monoclonal antibodies" may also be isolated from phage antibody libraries, e.g., using techniques described in Clackson et al., Nature 352:624-628 (1991) and Marks et al., J. Mol. Biol. 222:581-597 (1991).

As used herein, a nucleic acid is "operably linked" when it is placed into a functional relationship with another nucleic acid sequence. For example, DNA for a presequence or secretory leader is "operably linked" to DNA for a polypeptide if it is expressed as a preprotein that participates in the secretion of the polypeptide; a promoter or enhancer is "operably linked" to a coding sequence if it affects the transcription of the sequence; or a ribosome binding site is "operably linked" to a coding sequence if it is positioned so as to facilitate translation. Generally, "operably linked" means that the DNA sequences being linked are contiguous, and, in the case of a secretory leader, contiguous and in reading phase. However, enhancers do not have to be contiguous. Linking may be accomplished, e.g., by ligation at convenient restriction sites. If such sites do not exist, synthetic oligonucleotide adaptors or linkers may be used in accordance with conventional practice.

As used herein, "polypeptide," which may be used interchangeably with "protein," refers to a string of at least two amino acids attached to one another by a peptide bond. In some embodiments, a polypeptide may include at least 3-5 amino acids, each of which is attached to others by way of at least one peptide bond. Those of ordinary skill in the art will appreciate that polypeptides can include one or more "non-natural" amino acids or other entities that nonetheless are capable of integrating into a polypeptide chain. In some embodiments, a polypeptide may be glycosylated, e.g., a polypeptide may contain one or more covalently linked sugar moieties. In some embodiments, a single "polypeptide" (e.g., an antibody polypeptide) may comprise two or more individual polypeptide chains, which may in some cases be linked to one another, for example by one or more disulfide bonds or other means.

As used herein, the phrase "reference level" generally refers to a level considered "normal" for comparison purposes, e.g., a level of an appropriate control. For example, in the context of half-life (e.g. serum half-life) of a protein (e.g., a binding protein) a reference level may refer to the half-life of a "reference binding protein" which may be, e.g., an immunoglobulin of the same class (e.g., IgG1, IgG2, or IgG4) having a wild-type Fc region or an Fc region lacking a half-life extending mutation. In some embodiments, the reference binding protein comprises the same complementarity-determining regions as those of the binding protein of interest (e.g., an IL-23 binding protein as described herein). In some embodiments, the reference binding protein comprises the same variable regions (e.g., heavy chain and/or light chain variable region) as those of the binding protein of interest (e.g., an IL-23 binding protein as described herein.)

As used herein, the term "relative IC50" refers to an $IC_{50}$ value calculated relative to the $IC_{50}$ of a suitable reference antibody (with the reference antibody's $IC_{50}$ value being normalize to 1.00). An $IC_{50}$ of less than 1.00 indicates increased potency compared to the reference antibody. In some embodiments, the reference antibody is an IL-23 antibody which is capable of binding to an epitope on the p19 subunit of IL-23. In some embodiments, the reference antibody is an IL-23p19 antibody comprising a heavy chain variable domain and a light chain variable domain with amino acid sequences as shown in Table 3. In some embodiments, the reference antibody is an IL-23p19 antibody comprising a full heavy chain and a full light chain with amino acid sequences as shown in Table 3.

As used herein, the phrases "therapeutically effective amount" and "effective amount" are used interchangeably and refer to an amount effective, at dosages and for periods of time necessary, to achieve a desired therapeutic result. A therapeutically effective amount may vary according to factors such as the type of disease (e.g., disease state, age, sex, and/or weight of the individual, and the ability of an antibody (or pharmaceutical composition thereof) to elicit a desired response in the individual. An effective amount may also be an amount for which any toxic or detrimental effects of the antibody or pharmaceutical composition thereof are outweighed by therapeutically beneficial effects.

As used herein, to "treat" a condition or "treatment" of the condition (e.g., the conditions described herein) is an approach for obtaining beneficial or desired results, such as clinical results. Beneficial or desired results can include, but are not limited to, alleviation or amelioration of one or more symptoms or conditions; diminishment of extent of disease, disorder, or condition; stabilized (i.e., not worsening) state of disease, disorder, or condition; preventing spread of disease, disorder, or condition; delay or slowing the progress of the disease, disorder, or condition; amelioration or palliation of the disease, disorder, or condition; and remission (whether partial or total), whether detectable or undetectable. "Palliating" a disease, disorder, or condition means that the extent and/or undesirable clinical manifestations of the disease, disorder, or condition are lessened and/or time course of the progression is slowed or lengthened, as compared to the extent or time course in the absence of treatment.

IL-23 binding Proteins

In one aspect, provided are binding proteins that are capable of binding to IL-23 ("IL-23 binding proteins"). In some embodiments, provided binding proteins are capable of binding to an epitope of human IL-23, e.g., an epitope on the p19 subunit of IL-23 (IL-23A). In some embodiments, provided IL-23 binding proteins are capable of binding to human IL-23 (e.g., capable of binding human IL-23p19) with an affinity ($K_D$) of less than 10 pM, less than 9 pM, less than 8 pM, less than 7 pM, less than 6 pM, or less than 5 pM, less than 4 pM, or less than 3 pM. In some embodiments, provided IL-23 binding proteins are capable of binding to human IL-23 (e.g., capable of binding human IL-23p19) with an affinity ($K_D$) of about 6 pM, about 5 pM, about 4 pM, about 3 pM, about 2 pM, or about 1 pM.

In certain embodiments, provided are IL-23 binding proteins comprising a means for binding human IL-23 with higher affinity, ability to inhibit IL-17 activation and/or phosphorylation, and/or in vivo half-life than a reference antibody comprising a heavy chain variable domain having an amino acid sequence of SEQ ID NO: 112 and a light chain variable domain having an amino acid sequence of SEQ ID NO: 113. In certain embodiments, the means for binding human IL-23 comprises the (1) CDR, (2) variable region and/or (3) full heavy and light chain amino acid sequences disclosed herein.

In some embodiments, the binding proteins are antibodies or fragments thereof. In some embodiments, the antibodies or fragments thereof are monoclonal antibodies or fragments thereof. In some embodiments, the antibodies or fragments thereof are chimeric antibodies or fragments thereof. In some embodiments, the antibodies or fragments thereof are humanized antibodies or fragments thereof. In some embodiments, the antibodies or antigen-binding fragments are human antibodies.

Antigen-binding fragments may be, e.g., an scFv, an Fab, an scFab (single-chain Fab). As used herein, the term "scFv" is used in accordance with its common usage in the art to refer to a single chain in which the $V_H$ domain and the $V_L$ domain from an antibody are joined, typically via a linker. As used herein, the term "Fab fragment" is used in accordance with its common usage in the art. Fab fragments typically comprise an entire light chain ($V_L$ and $C_L1$ domains), the variable region domain of the heavy chain ($V_H$), and the first constant domain of one heavy chain ($C_H1$).

In some embodiments, provided IL-23 binding proteins comprise a heavy chain variable domain comprises complementarity determining regions CDR-H1, CDR-H2, and CDR-H3 with sequences as shown for a given clone in Table 1. In some embodiments, provided IL-23 binding proteins further comprise a light chain variable domain comprising complementarity determining regions CDR-L1, CDR-L2, and CDR-L3 with sequences as shown for the same clone in Table 1.

In some embodiments, provided IL-23 binding proteins comprise a heavy chain variable domain with heavy chain variable sequences for a given clone as shown in Table 1. In some embodiments, provided IL-23 binding proteins comprise a heavy chain variable domain which comprises a variant of a heavy chain variable sequence shown for a given clone in Table 1, in that the heavy chain variable domain has (1) CDR-H1, CDR-H2, and CDR-H3 with sequences as shown for that clone in Table 1 and (2) an amino acid sequence that is at least 85%, at least 87.5%, at least 90%, at least 91%, at least 92%, at least 93%, at least 94%, at least 95%, at least 96%, at least 97%, at least 98%, or at least 99% identical to the amino acid sequence of the heavy chain variable domain sequence shown for the same clone in Table 1.

In some embodiments, provided IL-23 binding proteins comprise a heavy chain variable domain as described herein and further comprise a light chain variable region which has (1) CDR-L1, CDR-L2, and CDR-L3 with sequences as shown for the same clone in Table 1 and (2) an amino acid sequence that is at least 85%, at least 87.5%, at least 90%, at least 91%, at least 92%, at least 93%, at least 94%, at least 95%, at least 96%, at least 97%, at least 98%, or at least 99% identical to the amino acid sequence of the light chain variable domain sequence shown for the same clone in Table 1.

In some embodiments, provided IL-23 binding proteins comprise (1) a full heavy chain (including constant domain) with an amino acid sequence shown for a given clone in Table 1 and (2) a full light chain (including constant domain) with an amino acid sequence as shown for the same clone in Table 1. In some embodiments, provided IL-23 binding proteins comprise (1) a full heavy chain (including constant domain) with an amino acid sequence having at least 85%, at least 90%, at least 92.5%, at least 95%, or at least 97.5% sequence identity to the full heavy chain sequence shown for a given clone in Table 1 and (2) a full light chain (including constant domain) with an amino acid sequence having at least 85% at least 90%, at least 92.5%, at least 95%, or at least 97.5% sequence identity to the full light chain sequence shown for the same clone in Table 1, wherein the provided IL-23 binding proteins have CDR-H1, CDR-H2, CDR-H3.CDR-L1, CDR-L2, and CDR-L3 sequences as shown for the same clone in Table 1.

In some embodiments, provided IL-23 binding proteins may also comprise one or more characteristic residues within a framework region of the heavy chain variable domain and/or light chain variable region, e.g., (1) an amino acid residue that is not an asparagine residue (e.g., a tyrosine residue) at position 27 of SEQ ID NO: 143, a lysine residue at position 74 of SEQ ID NO: 143, and a tyrosine residue at position 49 of SEQ ID NO: 144, and (2) a phenylalanine at position 49 of SEQ ID NO: 153.

TABLE 1

Exemplary characteristic sequences of IL-23 binding proteins

| IL-23 binding protein | Heavy chain variable domain | Light chain variable domain |
|---|---|---|
| Clone 107 | Full heavy chain including constant domain<br>QVQLVQSGAEVKKPGSSVKVSCKASG<br>YTFTAQTIHWMRQAPGQGLEWIGYIY<br>PRDDTPKYNPNFKGKVTITADKSTST<br>AYMELSSLRSEDTAVYYCAIPDRSGY<br>AWFDYWGQGTLVTVSSASTKGPSVFP<br>LAPSSKSTSGGTAALGCLVKDYFPEP<br>VTVSWNSGALTSGVHTFPAVLQSSGL<br>YSLSSVVTVPSSSLGTQTYICNVNHK<br>PSNTKVDKKVEPKSCDKTHTCPPCPA<br>PEAAGGPSVFLFPPKPKDTLYITREP<br>EVTCVVVDVSHEDPEVKFNWYVDGVE<br>VHNAKTKPREEQYNSTYRVVSVLTVL<br>HQDWLNGKEYKCKVSNKALPAPIEKT<br>ISKAKGQPREPQVYTLPPSRDELTKN<br>QVSLTCLVKGFYPSDIAVEWESNGQP<br>ENNYKTTPPVLDSDGSFFLYSKLTVD<br>KSRWQQGNVFSCSVMHEALHNHYTQK<br>SLSLSPGK<br>(SEQ ID NO: 128)<br>Heavy chain variable domain (VH)<br>QVQLVQSGAEVKKPGSSVKVSCKASG<br>YTFTAQTIHWMRQAPGQGLEWIGYIY<br>PRDDTPKYNPNFKGKVTITADKSTST<br>AYMELSSLRSEDTAVYYCAIPDRSGY<br>AWFDYWGQGTLVTVSS<br>(SEQ ID NO: 130)<br>Kabat CDRs<br>CDR-H1: AQTIH<br>(SEQ ID NO: 131)<br>CDR-H2: YIYPRDDTPKYNPNFKG<br>(SEQ ID NO: 132)<br>CDR-H3: PDRSGYAWFDY<br>(SEQ ID NO: 133)<br>IMGT CDRs<br>CDR-H1: GYTFTAQT<br>(SEQ ID NO: 134)<br>CDR-H2: IYPRDDTP<br>(SEQ ID NO: 135)<br>CDR-H3: AIPDRSGYAWFDY<br>(SEQ ID NO: 136)<br>Chothia CDRs<br>CDR-H1: GYTFTAQ<br>(SEQ ID NO: 138)<br>CDR-H2: YPRDDT<br>(SEQ ID NO: 139)<br>CDR-H3: DRSGYAWFD<br>(SEQ ID NO: 140) | Full light chain including constant domain<br>DIQMTQSPSSLSASVGDRVTITCKAS<br>RDVAIAVAWYQQKPGKVPKLLIYWAS<br>TRHTGVPSRFSGSGSRTDFTLTISSL<br>QPEDVADYFCHQYSSYPFTFGSGTKL<br>EIKRTVAAPSVFIFPPSDEQLKSGTA<br>S<br>(SEQ ID NO: 129)<br>Light chain variable domain (VL)<br>DIQMTQSPSSLSASVGDRVTITCKAS<br>RDVAIAVAWYQQKPGKVPKLLIYWAS<br>TRHTGVPSRFSGSGSRTDFTLTISSL<br>QPEDVADYFCHQYSSYPFTFGSGTKL<br>EIK<br>(SEQ ID NO: 113)<br>Kabat CDRs<br>CDR-L1: KASRDVAIAVA<br>(SEQ ID NO: 117)<br>CDR-L2: WASTRHT<br>(SEQ ID NO: 118)<br>CDR-L3: HQYSSYPFT<br>(SEQ ID NO: 119)<br>IMGT CDRs<br>CDR-L1: RDVAIA<br>(SEQ ID NO: 137)<br>CDR-L2: WAS<br>CDR-L3: HQYSSYPFT<br>(SEQ ID NO: 119)<br>Chothia CDRs<br>CDR-L1: SRDVAIA<br>(SEQ ID NO: 141)<br>CDR-L2: WAS<br>CDR-L3: YSSYPF<br>(SEQ ID NO: 142) |

TABLE 1-continued

Exemplary characteristic sequences of IL-23 binding proteins

| IL-23 binding protein | Heavy chain variable domain | Light chain variable domain |
|---|---|---|
| Clone 202 | Full heavy chain including constant domain<br>EVQLLESGGGLVQPGGSLRLSCAASG<br>YTFTDQTIHWVRQAPGKGLEWIGYIY<br>PRDDSPKYNENFKGRATLSADKSKNT<br>AYLQMNSLRAEDTAVYYCAIPDRSGY<br>AWFIYWGQGTTVTVSSASTKGPSVFP<br>LAPSSKSTSGGTAALGCLVKDYFPEP<br>VTVSWNSGALTSGVHTFPAVLQSSGL<br>YSLSSVVTVPSSSLGTQTYICNVNHK<br>PSNTKVDKKVEPKSCDKTHTCPPCPA<br>PEAAGGPSVFLFPPKPKDTLYITREP<br>EVTCVVVDVSHEDPEVKFNWYVDGVE<br>VHNAKTKPREEQYNSTYRVVSVLTVL<br>HQDWLNGKEYKCKVSNKALPAPIEKT<br>ISKAKGQPREPQVYTLPPSRDELTKN<br>QVSLTCLVKGFYPSDIAVEWESNGQP<br>ENNYKTTPPVLDSDGSFFLYSKLTVD<br>KSRWQQGNVFSCSVMHEALHNHYTQK<br>SLSLSPGK<br>(SEQ ID NO: 143)<br>Heavy chain variable domain (VH)<br>EVQLLESGGGLVQPGGSLRLSCAASG<br>YTFTDQTIHWVRQAPGKGLEWIGYIY<br>PRDDSPKYNENFKGRATLSADKSKNT<br>AYLQMNSLRAEDTAVYYCAIPDRSGY<br>AWFIYWGQGTTVTVSS<br>(SEQ ID NO: 145)<br>Kabat CDRs<br>CDR-H1: DQTIH<br>(SEQ ID NO: 114)<br>CDR-H2: YIYPRDDSPKYNENFKG<br>(SEQ ID NO: 115)<br>CDR-H3: PDRSGYAWFIY<br>(SEQ ID NO: 116)<br>IMGT CDRs<br>CDR-H1: GYTFTDQT<br>(SEQ ID NO: 147)<br>CDR-H2: IYPRDDSP<br>(SEQ ID NO: 148)<br>CDR-H3: AIPDRSGYAWFIY<br>(SEQ ID NO: 149)<br>Chothia CDRs<br>CDR-H1: GYTFTDQ<br>(SEQ ID NO: 150)<br>CDR-H2: YPRDDS<br>(SEQ ID NO: 151)<br>CDR-H3: DRSGYAWFI<br>(SEQ ID NO: 152) | Full light chain including constant domain<br>EIVMTQSPATLSVSPGERATLSCKAS<br>RDVAIAVAWYQQKPGQAPRLLLYWAS<br>TRHTGIPARFSGSGSRTEFTLTISSL<br>QSEDFAVYYCHQYSSYPFTFGGGTKV<br>EIKRTVAAPSVFIFPPSDEQLKSGTA<br>SVVCLLNNFYPREAKVQWKVDNALQS<br>GNSQESVTEQDSKDSTYSLSSTLTLS<br>KADYEKHKVYACEVTHQGLSSPVTKS<br>FNRGEC<br>(SEQ ID NO: 144)<br>Light chain variable domain (VL)<br>EIVMTQSPATLSVSPGERATLSCKAS<br>RDVAIAVAWYQQKPGQAPRLLLYWAS<br>TRHTGIPARFSGSGSRTEFTLTISSL<br>QSEDFAVYYCHQYSSYPFTFGGGTKV<br>EIK<br>(SEQ ID NO: 146)<br>Kabat CDRs<br>CDR-L1: KASRDVAIAVA<br>(SEQ ID NO: 117)<br>CDR-L2: WASTRHT<br>(SEQ ID NO: 118)<br>CDR-L3: HQYSSYPFT<br>(SEQ ID NO: 119)<br>IMGT CDRs<br>CDR-L1: RDVAIA<br>(SEQ ID NO: 137)<br>CDR-L2: WAS<br>CDR-L3: HQYSSYPFT<br>(SEQ ID NO: 119)<br>Chothia CDRs<br>CDR-L1: SRDVAIA<br>(SEQ ID NO: 141)<br>CDR-L2: WAS<br>CDR-L3: YSSYPF<br>(SEQ ID NO: 142) |
| Clone 203 | Full heavy chain including constant domain<br>EVQLLESGGGLVQPGGSLRLSCAASG<br>YTFTDQTIHWVRQAPGKGLEWIGYIY<br>PRDDSPKYNENFKGRATLSADKSKNT<br>AYLQMNSLRAEDTAVYYCAIPDRSGY<br>AWFIYWGQGTTVTVSSASTKGPSVFP<br>LAPSSKSTSGGTAALGCLVKDYFPEP<br>VTVSWNSGALTSGVHTFPAVLQSSGL<br>YSLSSVVTVPSSSLGTQTYICNVNHK<br>PSNTKVDKKVEPKSCDKTHTCPPCPA<br>PEAAGGPSVFLFPPKPKDTLYITREP<br>EVTCVVVDVSHEDPEVKFNWYVDGVE<br>VHNAKTKPREEQYNSTYRVVSVLTVL<br>HQDWLNGKEYKCKVSNKALPAPIEKT | Full light chain including constant domain<br>EIVMTQSPATLSVSPGERATLSCKAS<br>RDVAIAVAWYQQKPGQAPRLLLFWAS<br>TRHTGIPARFSGSGSRTEFTLTISSL<br>QSEDFAVYYCHQYSSYPFTFGGGTKV<br>EIKRTVAAPSVFIFPPSDEQLKSGTA<br>SVVCLLNNFYPREAKVQWKVDNALQS<br>GNSQESVTEQDSKDSTYSLSSTLTLS<br>KADYEKHKVYACEVTHQGLSSPVTKS<br>FNRGEC<br>(SEQ ID NO: 153)<br>Light chain variable domain (VL)<br>EIVMTQSPATLSVSPGERATLSCKAS<br>RDVAIAVAWYQQKPGQAPRLLLFWAS |

TABLE 1-continued

Exemplary characteristic sequences of IL-23 binding proteins

| IL-23 binding protein | Heavy chain variable domain | Light chain variable domain |
|---|---|---|
| | ISKAKGQPREPQVYTLPPSRDELTKN<br>QVSLTCLVKGFYPSDIAVEWESNGQP<br>ENNYKTTPPVLDSDGSFFLYSKLTVD<br>KSRWQQGNVFSCSVMHEALHNHYTQK<br>SLSLSPGK<br>(SEQ ID NO: 143)<br>Heavy chain variable domain (VH)<br>EVQLLESGGGLVQPGGSLRLSCAASG<br>YTFTDQTIHWVRQAPGKGLEWIGYIY<br>PRDDSPKYNENFKGRATLSADKSKNT<br>AYLQMNSLRAEDTAVYYCAIPDRSGY<br>AWFIYWGQGTTVTVSS<br>(SEQ ID NO: 145)<br>Kabat CDRs<br>CDR-H1: DQTIH<br>(SEQ ID NO: 114)<br>CDR-H2: YIYPRDDSPKYNENFKG<br>(SEQ ID NO: 115)<br>CDR-H3: PDRSGYAWFIY<br>(SEQ ID NO: 116)<br>IMGT CDRs<br>CDR-H1: GYTFTDQT<br>(SEQ ID NO: 147)<br>CDR-H2: IYPRDDSP<br>(SEQ ID NO: 148)<br>CDR-H3: AIPDRSGYAWFIY<br>(SEQ ID NO: 149)<br>Chothia CDRs<br>CDR-H1: GYTFTDQ<br>(SEQ ID NO: 150)<br>CDR-H2: YPRDDS<br>(SEQ ID NO: 151)<br>CDR-H3: DRSGYAWFI<br>(SEQ ID NO: 152) | TRHTGIPARFSGSGSRTEFTLTISSL<br>QSEDFAVYYCHQYSSYPFTFGGGTKV<br>EIK<br>(SEQ ID NO: 154)<br>Kabat CDRs<br>CDR-L1: KASRDVAIAVA<br>(SEQ ID NO: 117)<br>CDR-L2: WASTRHT<br>(SEQ ID NO: 118)<br>CDR-L3: HQYSSYPFT<br>(SEQ ID NO: 119)<br>IMGT CDRs<br>CDR-L1: RDVAIA<br>(SEQ ID NO: 137)<br>CDR-L2: WAS<br>CDR-L3: HQYSSYPFT<br>(SEQ ID NO: 119)<br>Chothia CDRs<br>CDR-L1: SRDVAIA<br>(SEQ ID NO: 141)<br>CDR-L2: WAS<br>CDR-L3: YSSYPF<br>(SEQ ID NO: 142) |

Fc Regions

In some embodiments, provided IL-23 binding proteins comprise an Fc region, which typically comprises one or more Fc chains. An IgG Fc chain typically contains two constant heavy domains (CH2 and CH3) and a hinge region connected to the CH2 domain. Typical Fc regions comprise two Fc chains which dimerize with one another; however, an Fc region may have a single chain or more than two Fc chains, e.g., as may be present in some antibody formats.

In some embodiments, provided IL-23 binding proteins comprise an IgG1 Fc region (e.g., human IgG1 Fc region), that is, except for having particular residue(s) at certain positions as noted herein, the Fc region has an amino acid sequence that is substantially similar to that of the Fc region within a wild type IgG1 Fc. In some embodiments, the wild type IgG1 Fc is a human IgG1 Fc, in which each Fc chain has an amino acid sequence of SEQ ID NO: 1. In some embodiments, provided IL-23 binding proteins comprise an Fc region, each Fc chain of which has an amino acid sequence that is at least 85%, at least 87.5%, at least 90%, at least 91%, at least 92%, at least 93%, at least 94%, at least 95%, at least 96%, at least 97%, at least 98%, or at least 99% identical to that of an Fc chain within a wild-type IgG1 Fc.

In some embodiments, provided IL-23 binding proteins comprise an IgG2 Fc region (e.g., human IgG2 Fc region), that is, except for having particular residue(s) at certain positions as noted herein, the Fc region has an amino acid sequence that is substantially similar to that of the Fc region within a wild type IgG2 Fc. In some embodiments, the wild type IgG1 Fc is a human IgG2 Fc, in which each Fc chain has an amino acid sequence of SEQ ID NO: 2. In some embodiments, provided IL-23 binding proteins comprise an Fc region, each Fc chain of which has an amino acid sequence that is at least 85%, at least 87.5%, at least 90%, at least 91%, at least 92%, at least 93%, at least 94%, at least 95%, at least 96%, at least 97%, at least 98%, or at least 99% identical to that of an Fc chain within a wild-type IgG2 Fc.

In some embodiments, provided IL-23 binding proteins comprise an IgG4 Fc region (e.g., human IgG4 Fc region), that is, except for having particular residue(s) at certain positions as noted herein, the Fc region has an amino acid sequence that is substantially similar to that of the Fc region within a wild type IgG4 Fc. In some embodiments, the wild type IgG1 Fc is a human IgG4 Fc, in which each Fc chain has an amino acid sequence of SEQ ID NO: 3. In some embodiments, provided IL-23 binding proteins comprise an Fc region, each Fc chain of which has an amino acid sequence that is at least 85%, at least 87.5%, at least 90%, at least 91%, at least 92%, at least 93%, at least 94%, at least 95%, at least 96%, at least 97%, at least 98%, or at least 99% identical to that of an Fc chain within a wild-type IgG4 Fc.

In some embodiments, the one or more modifications modify binding to Fc-gamma receptors, e.g., by promoting selective binding, reducing binding, or enhancing binding thereto.

Unless otherwise specified herein, numbering of amino acid residues in the Fc region or constant region is according to the EU numbering system, also called the EU index, as described in Kabat et al, Sequences of Proteins of Immunological Interest, 5th Ed. Public Health Service, National Institutes of Health, Bethesda, MD, 1991.

Amino acid sequences of exemplary Fc sequences are provided in Table 2.

TABLE 2

Exemplary Fc Sequences

| Name | SEQ ID NO | Fc chain sequence |
|---|---|---|
| hIgG1 | 1 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPG |
| IgG2 | 2 | ASTKGPSVFPLAPCSRSTSESTAALGCLVKDYFPEPVTVSWNSGALTSGVHTFPAVLQSSGLYSLSSVVTVPSSNFGTQTYTCNVDHKPSNTKVDKTVERKCCVECPPCPAPPVAGPSVFLFPPKPKDTLMISRTPEVTCVVVDVSHEDPEVQFNWYVDGVEVHNAKTKPREEQFNSTERVVSVLTVVHQDWLNGKEYKCKVSNKGLPAPIEKTISKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSP |
| hIgG4 | 3 | ASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPSCPAPEFLGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK |
| IgG4-SP (S228P) | 4 | ASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPPCPAPEFLGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK |
| IgG4-SPLE (S228P/ L235E) | 5 | ASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPPCPAPEELGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK |
| hIgG1-N297A | 6 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYASTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPG |
| hIgG1-D265A | 7 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVAVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPG |
| hIgG1-LALA (L234A/ L235A) | 8 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPEAAGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPG |

TABLE 2-continued

Exemplary Fc Sequences

| Name | SEQ ID NO | Fc chain sequence |
|---|---|---|
| hIgG1-LAGA (L235A/G237A) | 9 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELAGAPSVFLFPPKPKDTLM ISRTPEVTCVVVDVSHEDPEVKFNWYVDGVEVHNAKTKPREEQYN STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LALAGA (L234A/L235A/G237A) | 10 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGAPSVFLFPPKPKDTLM ISRTPEVTCVVVDVSHEDPEVKFNWYVDGVEVHNAKTKPREEQYN STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LALAPG (L234A/L235A/P329G) | 11 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRTPEVTCVVVDVSHEDPEVKFNWYVDGVEVHNAKTKPREEQYN STYRVVSVLTVLHQDWLNGKEYKCKVSNKALGAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-YTE (M252Y/S254T/T256E) | 12 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLY ITREPEVTCVVVDVSHEDPEVKFNWYVDGVEVHNAKTKPREEQYN STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-N297A/YTE | 13 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLY ITREPEVTCVVVDVSHEDPEVKFNWYVDGVEVHNAKTKPREEQYA STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-D265A/YTE | 14 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLY ITREPEVTCVVVAVSHEDPEVKFNWYVDGVEVHNAKTKPREEQYN STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LALA/YTE | 15 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLY ITREPEVTCVVVDVSHEDPEVKFNWYVDGVEVHNAKTKPREEQYN STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFESCSVMHEAL HNHYTQKSLSLSPG |
| hIgG1-LAGA/YTE | 16 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELAGAPSVELFPPKPKDTLY ITREPEVTCVVVDVSHEDPEVKFNWYVDGVEVHNAKTKPREEQYN STYRVVSVLTVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |

TABLE 2-continued

Exemplary Fc Sequences

| Name | SEQ ID NO | Fc chain sequence |
|---|---|---|
| hIgG1-LALAGA/YTE | 17 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLY<br>ITREPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALAPG/YTE | 18 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLY<br>ITREPEVTCVVVDVSHEDPEVKFNWYVDGVEVHNAKTKPREEQYN<br>STYRVVSVLTVLHQDWLNGKEYKCKVSNKALGAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LS (M428L/N434S) | 19 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HSHYTQKSLSLSPG |
| hIgG1-N297A/LS | 20 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYA<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HSHYTQKSLSLSPG |
| hIgG1-D265A/LS | 21 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVAVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HSHYTQKSLSLSPG |
| hIgG1-LALA/LS | 22 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HSHYTQKSLSLSPG |
| hIgG1-LAGA/LS | 23 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HSHYTQKSLSLSPG |
| hIgG1-LALAGA/LS | 24 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HSHYTQKSLSLSPG |

TABLE 2-continued

Exemplary Fc Sequences

| Name | SEQ ID NO | Fc chain sequence |
|---|---|---|
| hIgG1-LALAPG/LS | 25 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRTPEVTCVVVDVSHEDPEVKFNWYVDGVEVHNAKTKPREEQYN STYRVVSVLTVLHQDWLNGKEYKCKVSNKALGAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVLHEAL HSHYTQKSLSLSPG |
| hIgG1-DHS (L309D/ Q311H/ N434S) | 26 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRTPEVTCVVVDVSHEDPEVKFNWYVDGVEVHNAKTKPREEQYN STYRVVSVLTVDHHDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HSHYTQKSLSLSPG |
| hIgG1-N297A/DHS | 27 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRTPEVTCVVVDVSHEDPEVKFNWYVDGVEVHNAKTKPREEQYA STYRVVSVLTVDHHDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HSHYTQKSLSLSPG |
| hIgG1-D265A/DHS | 28 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRTPEVTCVVVAVSHEDPEVKFNWYVDGVEVHNAKTKPREEQYN STYRVVSVLTVDHHDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HSHYTQKSLSLSPG |
| hIgG1-LALA/DHS | 29 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRTPEVTCVVVDVSHEDPEVKFNWYVDGVEVHNAKTKPREEQYN STYRVVSVLTVDHHDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HSHYTQKSLSLSPG |
| hIgG1-LAGA/DHS | 30 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELAGAPSVFLFPPKPKDTLM ISRTPEVTCVVVDVSHEDPEVKFNWYVDGVEVHNAKTKPREEQYN STYRVVSVLTVDHHDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVESCSVMHEAL HSHYTQKSLSLSPG |
| hIgG1-LALAGA/DHS | 31 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGAPSVFLFPPKPKDTLM ISRTPEVTCVVVDVSHEDPEVKFNWYVDGVEVHNAKTKPREEQYN STYRVVSVLTVDHHDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HSHYTQKSLSLSPG |
| hIgG1-LALAPG/DHS | 32 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRTPEVTCVVVDVSHEDPEVKFNWYVDGVEVHNAKTKPREEQYN STYRVVSVLTVDHHDWLNGKALGAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HSHYTQKSLSLSPG |

TABLE 2-continued

Exemplary Fc Sequences

| Name | SEQ ID NO | Fc chain sequence |
|---|---|---|
| hIgG4-YTE | 33 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPSCPAPEFLGGPSVFLFPPKPKDTLYITR<br>EPEVTCVVVDVSQEDPEVQFNWYVDGVEVHNAKTKPREEQFNSTY<br>RVVSVLTVLHQDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVMHEALHNH<br>YTQKSLSLSLGK |
| hIgG4-SP/YTE | 34 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPPCPAPEFLGGPSVFLFPPKPKDTLYITR<br>EPEVTCVVVDVSQEDPEVQFNWYVDGVEVHNAKTKPREEQFNSTY<br>RVVSVLTVLHQDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVMHEALHNH<br>YTQKSLSLSLGK |
| hIgG4-SPLE/YTE | 35 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPPCPAPEELGGPSVFLFPPKPKDTLYITR<br>EPEVTCVVVDVSQEDPEVQFNWYVDGVEVHNAKTKPREEQENSTY<br>RVVSVLTVLHQDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVMHEALHNH<br>YTQKSLSLSLGK |
| hIgG4-LS | 36 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPSCPAPEFLGGPSVFLFPPKPKDTLMISR<br>TPEVTCVVVDVSQEDPEVQFNWYVDGVEVHNAKTKPREEQFNSTY<br>RVVSVLTVLHQDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVLHEALHSH<br>YTQKSLSLSLGK |
| hIgG4-SP/LS | 37 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPPCPAPEFLGGPSVFLFPPKPKDTLMISR<br>TPEVTCVVVDVSQEDPEVQFNWYVDGVEVHNAKTKPREEQFNSTY<br>RVVSVLTVLHQDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVLHEALHSH<br>YTQKSLSLSLGK |
| hIgG4-SPLE/LS | 38 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPPCPAPEELGGPSVFLFPPKPKDTLMISR<br>TPEVTCVVVDVSQEDPEVQFNWYVDGVEVHNAKTKPREEQFNSTY<br>RVVSVLTVLHQDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVLHEALHSH<br>YTQKSLSLSLGK |
| hIgG4-DHS | 39 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPSCPAPEFLGGPSVFLFPPKPKDTLMISR<br>TPEVTCVVVDVSQEDPEVQFNWYVDGVEVHNAKTKPREEQFNSTY<br>RVVSVLTVDHHDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVMHEALHSH<br>YTQKSLSLSLGK |
| hIgG4-SP/DHS | 40 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPPCPAPEFLGGPSVFLFPPKPKDTLMISR<br>TPEVTCVVVDVSQEDPEVQFNWYVDGVEVHNAKTKPREEQFNSTY<br>RVVSVLTVDHHDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVMHEALHSH<br>YTQKSLSLSLGK |

TABLE 2-continued

Exemplary Fc Sequences

| Name | SEQ ID NO | Fc chain sequence |
|---|---|---|
| hIgG4-SPLE/DHS | 41 | ASTKGPSVFPLAPCSRSTSESTAALGCLVKDYFPEPVTVSWNSGA<br>LTSGVHTFPAVLQSSGLYSLSSVVTVPSSSLGTKTYTCNVDHKPS<br>NTKVDKRVESKYGPPCPPCPAPEELGGPSVFLFPPKPKDTLMISR<br>TPEVTCVVVDVSQEDPEVQFNWYVDGVEVHNAKTKPREEQFNSTY<br>RVVSVLTVDHHDWLNGKEYKCKVSNKGLPSSIEKTISKAKGQPRE<br>PQVYTLPPSQEEMTKNQVSLTCLVKGFYPSDIAVEWESNGQPENN<br>YKTTPPVLDSDGSFFLYSRLTVDKSRWQEGNVFSCSVMHEALHSH<br>YTQKSLSLSLGK |
| hIgG2-YTE | 42 | ASTKGPSVFPLAPCSRSTSESTAALGCLVKDYFPEPVTVSWNSGA<br>LTSGVHTFPAVLQSSGLYSLSSVVTVPSSNFGTQTYTCNVDHKPS<br>NTKVDKTVERKCCVECPPCPAPPVAGPSVFLFPPKPKDTLYITRE<br>PEVTCVVVDVSHEDPEVQFNWYVDGVEVHNAKTKPREEQFNSTFR<br>VVSVLTVVHQDWLNGKEYKCKVSNKGLPAPIEKTISKTKGQPREP<br>QVYTLPPSREEMTKNQVSLTCLVKGFYPSDIAVEWESNGQPENNY<br>KTTPPMLDSDGSFFLYSKLTVDKSRWQQGNVFSCSVLHEALHSHY<br>TQKSLSLSP |
| hIgG2-LS | 43 | ASTKGPSVFPLAPCSRSTSESTAALGCLVKDYFPEPVTVSWNSGA<br>LTSGVHTFPAVLQSSGLYSLSSVVTVPSSNFGTQTYTCNVDHKPS<br>NTKVDKTVERKCCVECPPCPAPPVAGPSVFLFPPKPKDTLMISRT<br>PEVTCVVVDVSHEDPEVQFNWYVDGVEVHNAKTKPREEQFNSTFR<br>VVSVLTVVHQDWLNGKEYKCKVSNKGLPAPIEKTISKTKGQPREP<br>QVYTLPPSREEMTKNQVSLTCLVKGFYPSDIAVEWESNGQPENNY<br>KTTPPMLDSDGSFFLYSKLTVDKSRWQQGNVFSCSVLHEALHSHY<br>TQKSLSLSP |
| hIgG2-DHS | 44 | ASTKGPSVFPLAPCSRSTSESTAALGCLVKDYFPEPVTVSWNSGA<br>LTSGVHTFPAVLQSSGLYSLSSVVTVPSSNFGTQTYTCNVDHKPS<br>NTKVDKTVERKCCVECPPCPAPPVAGPSVFLFPPKPKDTLMISRT<br>PEVTCVVVDVSHEDPEVQFNWYVDGVEVHNAKTKPREEQFNSTER<br>VVSVLTVDHHDWLNGKEYKCKVSNKGLPAPIEKTISKTKGQPREP<br>QVYTLPPSREEMTKNQVSLTCLVKGFYPSDIAVEWESNGQPENNY<br>KTTPPMLDSDGSFFLYSKLTVDKSRWQQGNVFSCSVMHEALHSHY<br>TQKSLSLSP |
| hIgG1-LA | 45 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |
| hIgG1-N297A/LA | 46 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYA<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |
| hIgG1-D265A/LA | 47 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVAVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |
| hIgG1-LALA/LA | 48 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |

TABLE 2-continued

Exemplary Fc Sequences

| Name | SEQ ID NO | Fc chain sequence |
|---|---|---|
| hIgG1-LAGA/LA | 49 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |
| hIgG1-LALAGA/LA | 50 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |
| hIgG1-LALAPG/LA | 51 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALGAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVLHEAL<br>HAHYTQKSLSLSPG |
| hIgG1-N434A | 52 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |
| hIgG1-N297A/N434A | 53 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYA<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |
| hIgG1-D265A/N434A | 54 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVAVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |
| hIgG1-LALA/N434A | 55 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |
| hIgG1-LAGA/N434A | 56 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |

TABLE 2-continued

Exemplary Fc Sequences

| Name | SEQ ID NO | Fc chain sequence |
|---|---|---|
| hIgG1-LALAGA/N434A | 57 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |
| hIgG1-LALAPG/N434A | 58 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALGAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HAHYTQKSLSLSPG |
| hIgG1-N434W | 59 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HWHYTQKSLSLSPG |
| hIgG1-N297A/N434W | 60 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYA<br>STYRVVSVLIVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HWHYTQKSLSLSPG |
| hIgG1-D265A/N434W | 61 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVAVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVESCSVMHEAL<br>HWHYTQKSLSLSPG |
| hIgG1-LALA/N434W | 62 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HWHYTQKSLSLSPG |
| hIgG1-LAGA/N434W | 63 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HWHYTQKSLSLSPG |
| hIgG1-LALAGA/N434W | 64 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HWHYTQKSLSLSPG |

TABLE 2-continued

Exemplary Fc Sequences

| Name | SEQ ID NO | Fc chain sequence |
|---|---|---|
| hIgG1-LALAPG/N434W | 65 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRTPEVTCVVVDVSHEDPEVKFNWYVDGVEVHNAKTKPREEQYN<br>STYRVVSVLTVLHQDWLNGKEYKCKVSNKALGAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HWHYTQKSLSLSPG |
| hIgG1/DQ (T256D/T307Q) | 66 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRDPEVTCVVVDVSHEDPEVKFNWYVDGVEVHNAKTKPREEQYN<br>STYRVVSVLQVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-N297A/DQ | 67 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRDPEVTCVVVDVSHEDPEVKFNWYVDGVEVHNAKTKPREEQYA<br>STYRVVSVLQVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-D265A/DQ | 68 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRDPEVTCVVVAVSHEDPEVKFNWYVDGVEVHNAKTKPREEQYN<br>STYRVVSVLQVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALA/DQ | 69 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRDPEVTCVVVDVSHEDPEVKFNWYVDGVEVHNAKTKPREEQYN<br>STYRVVSVLQVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LAGA/DQ | 70 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELAGAPSVFLFPPKPKDTLM<br>ISRDPEVTCVVVDVSHEDPEVKFNWYVDGVEVHNAKTKPREEQYN<br>STYRVVSVLQVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALAGA/DQ | 71 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLM<br>ISRDPEVTCVVVDVSHEDPEVKFNWYVDGVEVHNAKTKPREEQYN<br>STYRVVSVLQVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALAPG/DQ | 72 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLM<br>ISRDPEVTCVVVDVSHEDPEVKFNWYVDGVEVHNAKTKPREEQYN<br>STYRVVSVLQVLHQDWLNGKEYKCKVSNKALGAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |

TABLE 2-continued

Exemplary Fc Sequences

| Name | SEQ ID NO | Fc chain sequence |
|---|---|---|
| hIgG1/DW (T256D/ T307W) | 73 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRDPEVTCVVVDVSHEDPEVKFNWYVDGVEVHNAKTKPREEQYN STYRVVSVLWVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-N297A/DW | 74 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRDPEVTCVVVDVSHEDPEVKFNWYVDGVEVHNAKTKPREEQYA STYRVVSVLWVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-D265A/DW | 75 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRDPEVTCVVVAVSHEDPEVKFNWYVDGVEVHNAKTKPREEQYN STYRVVSVLWVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LALA/DW | 76 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRDPEVTCVVVDVSHEDPEVKFNWYVDGVEVHNAKTKPREEQYN STYRVVSVLWVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LAGA/DW | 77 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELAGAPSVFLFPPKPKDTLM ISRDPEVTCVVVDVSHEDPEVKFNWYVDGVEVHNAKTKPREEQYN STYRVVSVLWVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LALAGA/DW | 78 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGAPSVFLFPPKPKDTLM ISRDPEVTCVVVDVSHEDPEVKFNWYVDGVEVHNAKTKPREEQYN STYRVVSVLWVLHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1-LALAPG/DW | 79 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRDPEVTCVVVDVSHEDPEVKFNWYVDGVEVHNAKTKPREEQYN STYRVVSVLWVLHQDWLNGKEYKCKVSNKALGAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |
| hIgG1/YD (M252Y/ T256D) | 80 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLY ISRDPEVTCVVVDVSHEDPEVKFNWYVDGVEVHNAKTKPREEQYN STYRVVSVLTVHQDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVMHEAL HNHYTQKSLSLSPG |

TABLE 2-continued

Exemplary Fc Sequences

| Name | SEQ ID NO | Fc chain sequence |
|---|---|---|
| hIgG1-N297A/YD | 81 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLY<br>ISRDPEVTCVVVDVSHEDPEVKFNWYVDGVEVHNAKTKPREEQYA<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-D265A/YD | 82 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLY<br>ISRDPEVTCVVVAVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALA/YD | 83 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLY<br>ISRDPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LAGA/YD | 84 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELAGAPSVFLFPPKPKDTLY<br>ISRDPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALAGA/YD | 85 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGAPSVFLFPPKPKDTLY<br>ISRDPEVTCVVVDVSHEDPEVKFNWYVDGVEVHNAKTKPREEQYN<br>STYRVVSVLTVLHQDWLNGKEYKCKVSNKALPAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1-LALAPG/YD | 86 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPEAAGGPSVFLFPPKPKDTLY<br>ISRDPEVTCVVVDVSHEDPEVKFNWYVDGVEVHNAKTKPREEQYN<br>STYRVVSVLTVLHQDWLNGKEYKCKVSNKALGAPIEKTISKAKGQ<br>PREPQVYTLPPSRDELTKNQVSLTCLVKGFYPSDIAVEWESNGQP<br>ENNYKTTPPVLDSDGSFFLYSKLTVDKSRWQQGNVFSCSVMHEAL<br>HNHYTQKSLSLSPG |
| hIgG1/QVV (T307Q/ Q311V/ A378V) | 87 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYN<br>STYRVVSVLQVLHQDWLNGKEYKCKVSNKALPAPIEKTISKAKGQ<br>PREPQVYTLPPSRDELTKNQVSLTCLVKGFYPSDIVVEWESNGQP<br>ENNYKTTPPVLDSDGSFFLYSKLTVDKSRWQQGNVFSCSVMHEAL<br>HNHYTQKSLSLSPG |
| hIgG1-N297A/QVV | 88 | ASTKGPSVFPLAPSSKSTSGGTAALGCLVKDYFPEPVTVSWNSGA<br>LTSGVHTFPAVLQSSGLYSLSSVVTVPSSSLGTQTYICNVNHKPS<br>NTKVDKKVEPKSCDKTHTCPPCPAPELLGGPSVFLFPPKPKDTLM<br>ISRTPEVTCVVVDVSHEDPEVKFNWYVDGVEVHNAKTKPREEQYA<br>STYRVVSVLQVLHVDWLNGKEYKCKVSNKALPAPIEKTISKAKGQ<br>PREPQVYTLPPSRDELTKNQVSLTCLVKGFYPSDIVVEWESNGQP<br>ENNYKTTPPVLDSDGSFFLYSKLTVDKSRWQQGNVFSCSVMHEAL<br>HNHYTQKSLSLSPG |

TABLE 2-continued

Exemplary Fc Sequences

| Name | SEQ ID NO | Fc chain sequence |
|---|---|---|
| hIgG1-D265A/QVV | 89 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRTPEVTCVVVAVSHEDPEVKFNWYVDGVEVHNAKTKPREEQYN STYRVVSVLQVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LALA/QVV | 90 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRTPEVTCVVVDVSHEDPEVKFNWYVDGVEVHNAKTKPREEQYN STYRVVSVLQVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LAGA/QVV | 91 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELAGAPSVFLFPPKPKDTLM ISRTPEVTCVVVDVSHEDPEVKFNWYVDGVEVHNAKTKPREEQYN STYRVVSVLQVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LALAGA/QVV | 92 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGAPSVFLFPPKPKDTLM ISRTPEVTCVVVDVSHEDPEVKFNWYVDGVEVHNAKTKPREEQYN STYRVVSVLQVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LALAPG/QVV | 93 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRTPEVTCVVVDVSHEDPEVKFNWYVDGVEVHNAKTKPREEQYN STYRVVSVLQVLHVDWLNGKEYKCKVSNKALGAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1/DDRVV (T256D/N286D/T307R/Q311V/A378V) | 94 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRDPEVTCVVVDVSHEDPEVKFNWYVDGVEVDNAKTKPREEQYN STYRVVSVLRVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-N297A/DDRVV | 95 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRDPEVTCVVVDVSHEDPEVKFNWYVDGVEVDNAKTKPREEQYA STYRVVSVLRVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-D265A/DDRVV | 96 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRDPEVTCVVVAVSHEDPEVKFNWYVDGVEVDNAKTKPREEQYN STYRVVSVLRVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |

TABLE 2-continued

Exemplary Fc Sequences

| Name | SEQ ID NO | Fc chain sequence |
|---|---|---|
| hIgG1-LALA/DDRVV | 97 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRDPEVTCVVVDVSHEDPEVKFNWYVDGVEVDNAKTKPREEQYN STYRVVSVLRVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LAGA/DDRVV | 98 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELAGAPSVFLFPPKPKDTLM ISRDPEVTCVVVDVSHEDPEVKFNWYVDGVEVDNAKTKPREEQYN STYRVVSVLRVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LALAGA/DDRVV | 99 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGAPSVFLFPPKPKDTLM ISRDPEVTCVVVDVSHEDPEVKFNWYVDGVEVDNAKTKPREEQYN STYRVVSVLRVLHVDWLNGKEYKCKVSNKALPAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-LALAPG/DDRVV | 100 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPEAAGGPSVFLFPPKPKDTLM ISRDPEVTCVVVDVSHEDPEVKFNWYVDGVEVDNAKTKPREEQYN STYRVVSVLRVLHVDWLNGKEYKCKVSNKALGAPIEKTISKAKGQ PREPQVYTLPPSRDELTKNQVSLTCLVKGFYPSDIVVEWESNGQP ENNYKTTPPVLDSDGSFFLYSKLTVDKSRWQQGNVFSCSVMHEAL HNHYTQKSLSLSPG |
| hIgG1-Q311R/M428L | 101 | ASTKGPSVFPLAPSSKSTSGGTAALGCLVKDYFPEPVTVSWNSGA LTSGVHTFPAVLQSSGLYSLSSVVTVPSSSLGTQTYICNVNHKPS NTKVDKKVEPKSCDKTHTCPPCPAPELLGGPSVFLFPPKPKDTLM ISRTPEVTCVVVDVSHEDPEVKFNWYVDGVEVHNAKTKPREEQYN STYRVVSVLTVLHRDWLNGKEYKCKVSNKALPAPIEKTISKAKGQ PREPQVYTLPPSRDELTKNQVSLTCLVKGFYPSDIAVEWESNGQP ENNYKTTPPVLDSDGSFFLYSKLTVDKSRWQQGNVFSCSVLHEAL HNHYTQKSLSLSPG |
| hIgG4-Q311R/M428L | 102 | ASTKGPSVFPLAPCSRSTSESTAALGCLVKDYFPEPVTVSWNSGA LTSGVHTFPAVLQSSGLYSLSSVVTVPSSSLGTKTYTCNVDHKPS NTKVDKRVESKYGPPCPSCPAPEFLGGPSVFLFPPKPKDTLMISR TPEVTCVVVDVSQEDPEVQFNWYVDGVEVHNAKTKPREEQFNSTY RVVSVLTVLHRDWLNGKEYKCKVSNKGLPSSIEKTISKAKGQPRE PQVYTLPPSQEEMTKNQVSLTCLVKGFYPSDIAVEWESNGQPENN YKTTPPVLDSDGSFFLYSRLTVDKSRWQEGNVFSCSVLHEALHNH YTQKSLSLSLGK |
| IgG4-SP/Q311R/M428L | 103 | ASTKGPSVFPLAPCSRSTSESTAALGCLVKDYFPEPVTVSWNSGA LTSGVHTFPAVLQSSGLYSLSSVVTVPSSSLGTKTYTCNVDHKPS NTKVDKRVESKYGPPCPPCPAPEFLGGPSVFLFPPKPKDTLMISR TPEVTCVVVDVSQEDPEVQFNWYVDGVEVHNAKTKPREEQFNSTY RVVSVLTVLHRDWLNGKEYKCKVSNKGLPSSIEKTISKAKGQPRE PQVYTLPPSQEEMTKNQVSLTCLVKGFYPSDIAVEWESNGQPENN YKTTPPVLDSDGSFFLYSRLTVDKSRWQEGNVFSCSVLHEALHNH YTQKSLSLSLGK |
| IgG4-SPLE/Q311R/M428L | 104 | ASTKGPSVFPLAPCSRSTSESTAALGCLVKDYFPEPVTVSWNSGA LTSGVHTFPAVLQSSGLYSLSSVVTVPSSSLGTKTYTCNVDHKPS NTKVDKRVESKYGPPCPPCPAPEELGGPSVFLFPPKPKDTLMISR TPEVTCVVVDVSQEDPEVQFNWYVDGVEVHNAKTKPREEQFNSTY RVVSVLTVLHRDWLNGKEYKCKVSNKGLPSSIEKTISKAKGQPRE PQVYTLPPSQEEMTKNQVSLTCLVKGFYPSDIAVEWESNGQPENN YKTTPPVLDSDGSFFLYSRLTVDKSRWQEGNVESCSVLHEALHNH YTQKSLSLSLGK |

TABLE 2-continued

Exemplary Fc Sequences

| Name | SEQ ID NO | Fc chain sequence |
|---|---|---|
| IgG2-Q311R/M428L | 105 | ASTKGPSVFPLAPCSRSTSESTAALGCLVKDYFPEPVTVSWNSGALTSGVHTFPAVLQSSGLYSLSSVVTVPSSNFGTQTYTCNVDHKPSNTKVDKTVERKCCVECPPCPAPPVAGPSVFLFPPKPKDTLMISRTPEVTCVVVDVSHEDPEVQFNWYVDGVEVHNAKTKPREEQFNSTERVVSVLTVVHRDWLNGKEYKCKVSNKGLPAPIEKTISKTKGQPREPQVYTLPPSREEMTKNQVSLTCLVKGFYPSDIAVEWESNGQPENNYKTTPPMLDSDGSFFLYSKLTVDKSRWQQGNVFSCSVLHEALHNHYTQKSLSLSP |
| hIgG1-N297A/Q311R/M428L | 106 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVDVSHEDPEVKFNWYVDGVEVHNAKTKPREEQYASTYRVVSVLTVLHRDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVLHEALHNHYTQKSLSLSPG |
| hIgG1-D265A/Q311R/M428L | 107 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPSVFLFPPKPKDTLMISRTPEVTCVVVAVSHEDPEVKFNWYVDGVEVHNAKTKPREEQYNSTYRVVSVLTVLHRDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVLHEALHNHYTQKSLSLSPG |
| hIgG1-LALA/Q311R/M428L | 108 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPEAAGGPSVFLFPPKPKDTLMISRTPEVTCVVVDVSHEDPEVKFNWYVDGVEVHNAKTKPREEQYNSTYRVVSVLTVLHRDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVLHEALHNHYTQKSLSLSPG |
| hIgG1-LAGA/Q311R/M428L | 109 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELAGAPSVFLFPPKPKDTLMISRTPEVTCVVVDVSHEDPEVKFNWYVDGVEVHNAKTKPREEQYNSTYRVVSVLTVLHRDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVLHEALHNHYTQKSLSLSPG |
| hIgG1-LALAGA/Q311R/M428L | 110 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPEAAGAPSVFLFPPKPKDTLMISRTPEVTCVVVDVSHEDPEVKFNWYVDGVEVHNAKTKPREEQYNSTYRVVSVLTVLHRDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVLHEALHNHYTQKSLSLSPG |
| hIgG1-LALAPG/Q311R/M428L | 111 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPEAAGGPSVFLFPPKPKDTLMISRTPEVTCVVVDVSHEDPEVKFNWYVDGVEVHNAKTKPREEQYNSTYRVVSVLTVLHRDWLNGKEYKCKVSNKALGAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVLHEALHNHYTQKSLSLSPG |

In some embodiments, the IL-23 binding protein comprises an Fc region comprising one or more modifications in SEQ ID NO: 1 (hIgG1). In some embodiments, the IL-23 binding protein comprises an Fc region comprising one or more modifications in SEQ ID NO: 2 (hIgG2). In some embodiments, the IL-23 binding protein comprises an Fc region comprising one or more modifications in SEQ ID NO: 3 (hIgG4). In some embodiments, the Fc region comprises an Fc chain whose amino acid sequence has at least 80%, at least 85%, at least 90%, at least 95%, at least 96%, at least 97%, at least 98%, or at least 99% sequence identity with the amino acid sequence according to any one of SEQ ID NOs: 1-3. In some embodiments, the Fc region comprises an amino acid sequence according to any one of SEQ ID NOs: 1-3.

In certain embodiments, provided IL-23 binding proteins comprise an Fc region ("modified Fc region") with at least one amino acid modification relative to a wild type Fc region. IL-23 binding proteins with a modified Fc region may comprise mutations in one Fc chain, or in multiple Fc chains (e.g., when two or more Fc chains are present). Within an IL-23 binding protein with modifications in multiple Fc chains, the modifications on each Fc chain may be the same or different. In some embodiments the modified Fc region comprises a half-life extending mutation or set of mutations, e.g., M252Y, S254T, and T256E (YTE) and/or M428L and N434S (LS).

In some embodiments, the modified Fc region comprises a modification selected from the group consisting of: S298A, E333A, K334A, K326A, F243L, R292P, Y300L, V305I, P396L, F243L, R292P, Y300L, L235V, P396L, F243L, S239D, I332E, A330L, S267E, L328F, D265S, S239E, K326A, A327H, G237F, K326E, G236A, D270L, H268D, S324T, L234F, N325L, V266L, S267D, and combinations thereof. In some embodiments, the modified Fc region comprises a modification selected from the group consisting of S228P, M252Y, S254T, T256E, T256D, T250Q, H285D, T307A, T307Q, T307R, T307W, L309D, Q411H, Q311V, A378V, E380A, M428L, N434A, N434S, N297A, D265A, L234A, L235A, N434W, and combinations thereof.

In some embodiments, the modified Fc region comprises a specific combination of amino acid substitutions selected from the group consisting of: L234A/L235A; V234A/G237A; L235A/G237A/E318A; S228P/L236E; H268Q/V309L/A330S/A331S; C220S/C226S/C229S/P238S; C226S/C229S/E3233P/L235V/L235A; L234F/L235E/P331S; C226S/P230S; L234A/G237A; L234A/L235A/G237A; Q311R/M428L; L234A/L235A/P329G; and combinations thereof.

In some embodiments, the modified Fc region comprises a specific combination of amino acid substitutions selected from the group consisting of M428L/N434S (LS); M252Y/S254T/T256E (YTE); T250Q/M428L; T307A/E380A/N434A; T256D/T307Q (DQ); T256D/T307W (DW); M252Y/T256D (YD); T307Q/Q311V/A378V (QVV); T256D/H285D/T307R/Q311V/A378V (DDRVV); L309D/Q311H/N434S (DHS); S228P/L235E (SPLE); L234A/L235A (LALA); M428L/N434A (LA); L234A/G237A (LAGA); L234A/L235A/G237A (LALAGA); L234A/L235A/P329G (LALAPG); N297A/YTE; D265A/YTE; LALA/YTE; LAGA/YTE; LALAGA/YTE; LALAPG/YTE; N297A/LS; D265A/LS; LALA/LS; LAGA/LS; LALAGA/LS; LALAPG/LS; N297A/DHS; D265A/DHS; LALA/DHS; LAGA/DHS; LALAGA/DHS; LALAPG/DHS; SP/YTE; SPLE/YTE; SP/LS; SPLE/LS; SP/DHS; SPLE/DHS; N297A/LA; D265A/LA; LALA/LA; LAGA/LA; LALAGA/LA; LALAPG/LA; N297A/N434A; D265A/N434A; LALA/N434A; LAGA/N434A; LALAGA/N434A; LALAPG/N434A; N297A/N434W; D265A/N434W; LALA/N434W; LAGA/N434W; LALAGA/N434W; LALAPG/N434W; N297A/DQ; D265A/DQ; LALA/DQ; LAGA/DQ; LALAGA/DQ; LALAPG/DQ; N297A/DW; D265A/DW; LALA/DW; LAGA/DW; LALAGA/DW; LALAPG/DW; N297A/YD; D265A/YD; LALA/YD; LAGA/YD; LALAGA/YD; LALAPG/YD; N297A/QVV; D265A/QVV; LALA/QVV; LAGA/QVV; LALAGA/QVV; LALAPG/QVV; N297A/DDRVV; D265A/DDRVV; LALA/DDRVV; LAGA/DDRVV; LALAGA/DDRVV; LALAPG/DDRVV; SP/Q311R/M428L; SPLE/Q311R/M428L; N297A/Q311R/M428L; D265A/Q311R/M428L; LALA/Q311R/M428L; LAGA/Q311R/M428L; LALAGA/Q311R/M428L; LALAPG/Q311R/M428L; and combinations thereof. In some embodiments, the modified Fc region comprises a specific combination of amino acid substitutions selected from the group consisting of M428L/N434S (LS) and M252Y/S254T/T256E (YTE). In some embodiments, the modified Fc region comprises M428L/N434S (LS) (e.g., SEQ ID NO: 19, SEQ ID NO: 36, SEQ ID NO: 43) modifications. In some embodiments, the modified Fc region comprises M252Y/S254T/T256E (YTE) (e.g., SEQ ID NO: 12, SEQ ID NO: 33, SEQ ID NO: 42) modifications.

In some embodiments, provided IL-23 binding proteins described herein include modifications to improve their ability to mediate effector function. Such modifications are known in the art and include afucosylation, or engineering of the affinity of the Fc region towards an activating receptor, mainly FCGR3a for antibody-dependent cellular cytotoxicity (ADCC), and towards C1q for complement-dependent cytotoxicity (CDC).

In some aspects, an antibody provided herein comprises an Fc region (e.g., an IgG1 Fc region) with reduced fucose content at position Asn 297 (EU numbering) compared to a naturally occurring Fc region. Such Fc regions are known to confer improved ADCC activity to the binding proteins which comprise them. In some aspects, such binding proteins do not comprise any fucose at position Asn 297.

In some embodiments, IL-23 binding proteins described herein comprise an Fc region with one or more amino acid substitutions which improve ADCC, such as a substitution at one or more of positions 298, 333, and 334 of an Fc chain. In some embodiments, an antibody provided herein comprises an Fc region with one or more amino acid substitutions at positions 239, 332, and 330.

In some embodiments, the Fc region comprises an Fc chain whose amino acid sequence has at least 80%, at least 85%, at least 90%, at least 95%, at least 96%, at least 97%, at least 98%, or at least 99% sequence identity with the amino acid sequence according to any one of SEQ ID NOs: 1-111.

In some embodiments, IL-23 binding proteins described herein comprise an Fc region with at least one galactose residue in the oligosaccharide attached to the Fc region. Such antibody variants may have improved CDC function.

In some embodiments, IL-23 binding proteins described herein comprise one or more alterations that improve or diminish C1q binding and/or CDC.

In certain embodiments, provided IL-23 binding proteins comprise an Fc region with one or more amino acid substitutions, wherein the one or more substitutions result in an increase in one or more of antibody half-life, ADCC activity, ADCP activity, or CDC activity compared with a comparable IL-23 binding protein whose Fc region lacks the one or more substitutions. In certain embodiments, the one or more amino acid substitutions results in increased binding protein half-life at pH 6.0 compared to binding protein comprising a wild-type Fc region. In certain embodiments, the antibody has an increased half-life that is about 10,000-fold, 1,000-fold, 500-fold, 100-fold, 50-fold, 20-fold, 10-fold, 9-fold, 8-fold, 7-fold, 6-fold, 5-fold, 4.5-fold, 4-fold, 3.5-fold, 3-fold, 2.5-fold, 2-fold, 1.95-fold, 1.9-fold, 1.85-fold, 1.8-fold, 1.75-fold, 1.7-fold, 1.65-fold, 1.6-fold, 1.55-fold, 1.50-fold, 1.45-fold, 1.4-fold, 1.35-fold, 1.3-fold, 1.25-fold, 1.2-fold, 1.15-fold, 1.1-fold, or 1.05-fold longer compared to an antibody comprising a wild-type Fc region.

In certain embodiments, provided IL-23 binding proteins comprise an Fc region which comprise one or more amino acid substitutions, wherein the one or more substitutions result in a decrease in one or more of ADCC activity, ADCP activity, or CDC activity compared comparable IL-23 binding protein whose Fc region lacks the one or more substitutions.

In certain embodiments, the Fc region binds an Fcγ Receptor selected from the group consisting of: FcγRI, FcγRIIa, FcγRIIb, FcγRIIc, FcγRIIIa, and FcγRIIIb. In certain embodiments, the Fc region binds an Fcγ Receptor with higher affinity at pH 6.0 compared to an antibody comprising a wild-type Fc region.

In some embodiments, IL-23 binding proteins described herein have an extended half-life (i.e., serum half-life) relative to the half-life of a reference binding protein. In some embodiments, IL-23 binding proteins described herein have a half-life of at least about 14, 28, 42, 56, 70, 84, 96, or more than 96 weeks. In some embodiments, IL-23 binding proteins described herein have a half-life in a range of about 14 days to about 96 days, about 14 days to about 84 days, about 14 days to about 70 days, about 14 days to about 56 days, about 14 days to about 42 days, about 14 days to about 28 days, of about 28 days to about 96 days, about 28 days to about 84 days, about 28 days to about 70 days, about 28 days to about 56 days, about 28 days to about 42 days, of about 42 days to about 96 days, about 42 days to about 84 days, about 42 days to about 70 days, or about 42 days to about 56 days. In some embodiments, IL-23 binding proteins described herein have a half-life in a range of about 42 days to about 56 days. In some embodiments, IL-23 binding proteins described herein have a half-life of at least about 50 days. In some embodiments, the IL-23 binding proteins described herein have a half-life of about 50 days. Methods of measuring half-life are known in the art. In some embodiments, the half-life is measured in a non-human primate. In some embodiments, the half-life is measured in a human. In some embodiments, the half-life is measured following intravenous administration. In some embodiments, the half-life is measured following subcutaneous administration.

In some embodiments, IL-23 binding proteins described herein have a half-life that is at least 20% longer than a reference binding protein. In some embodiments, the half-life of IL-23 binding proteins described herein is at least 30%, at least 40%, at least 50%, at least 60%, at least 70%, at least 80%, or at least 90% longer than the half-life of the reference binding protein. In some embodiments, the half-life of the IL-23 binding proteins described herein is longer than the half-life of the reference binding protein by at least 2 fold, at least 3 fold, at least 4 fold, at least 5 fold, at least 6 fold, at least 7 fold, at least 8 fold, at least 9 fold, or at least 10 fold.

Antibody Fragments

In certain embodiments, provided are antibody fragments, rather than whole antibodies.

Various techniques have been developed for the production of antibody fragments. Traditionally, these fragments were derived via proteolytic digestion of intact antibodies (see, e.g., Morimoto et al., Journal of Biochemical and Biophysical Methods 24:107-117 (1992); and Brennan et al., Science, 229:81 (1985)). However, these fragments can now be produced directly by recombinant host cells. Fab, Fv and ScFv antibody fragments can all be expressed in and secreted from *E. coli*, thus allowing the production of large amounts of these fragments. Antibody fragments can be isolated from, e.g., antibody phage libraries. Alternatively or additionally, Fab'-SH fragments can be directly recovered from *E. coli* and chemically coupled to form F(ab')2 fragments (Carter et al., Bio/Technology 10:163-167 (1992)). According to another approach, F(ab')2 fragments can be isolated directly from recombinant host cell culture. Fab and F(ab')2 fragment with increased in vivo half-life comprising a salvage receptor binding epitope residues are described, e.g., in U.S. Pat. No. 5,869,046. Other techniques for the production of antibody fragments will be apparent to the skilled practitioner.

In some embodiments, the antigen-binding fragment is a single chain Fv fragment (scFv). See, e.g., WO 93/16185; U.S. Pat. Nos. 5,571,894; and 5,587,458. Fv and scFv are species with intact combining sites that are devoid of constant regions; thus, these fragments may be suitable for reduced nonspecific binding during in vivo use. scFv fusion proteins may be constructed to yield fusion of an effector protein at either the amino or the carboxy terminus of an scFv. See, e.g., Antibody Engineering, ed. Borrebaeck. An antigen-binding antibody fragment may also be a "linear antibody", e.g., as described in U.S. Pat. No. 5,641,870.

Vectors, Host Cells and Recombinant Methods

Also provided are isolated nucleic acids encoding IL-23 binding proteins (e.g., antibodies and antigen-binding fragments), vectors and host cells comprising the nucleic acid, and recombinant techniques for the production of the antibody.

For recombinant production of the antibody or antigen-binding fragment, a nucleic acid encoding the antibody or antigen-binding fragment may be isolated and inserted into a replicable vector for further cloning (amplification of the DNA) or for expression. DNA encoding the monoclonal antibody can be readily isolated and sequenced using conventional procedures (e.g., by using oligonucleotide probes that are capable of binding specifically to genes encoding the heavy and light chains of the antibody). Many vectors are available. The vector components generally include, but are not limited to, one or more of the following: a signal sequence, an origin of replication, one or more marker genes, an enhancer element, a promoter, and a transcription termination sequence.

Pharmaceutical Compositions

In certain embodiments, provided antibodies are incorporated together with one or more pharmaceutically acceptable carriers into a pharmaceutical composition suitable for administration to a subject. As used herein, "pharmaceutically acceptable carrier" refers to any of a variety of solvents, dispersion media, coatings, antibacterial and antifungal agents, isotonic and absorption delaying agents, and the like that are physiologically compatible. Examples of pharmaceutically acceptable carriers include, but are not limited to, water, saline, phosphate buffered saline, dextrose, glycerol, ethanol and the like, as well as combinations thereof.

In some embodiments, pharmaceutical compositions comprise one or more tonicity agents or stabilizers. Non-limiting examples of such tonicity agents or stabilizers include sugars (e.g., sucrose), polyalcohols (e.g., mannitol or sorbitol), and sodium chloride.

In some embodiments, pharmaceutical compositions comprise one or more bulking agents and/or lyoprotectants (e.g., mannitol or glycine), buffers (e.g., phosphate, acetate, or histidine buffers), surfactants (e.g., polysorbates), antioxidants (e.g., methionine), and/or metal ions or chelating agents (e.g., ethylenediaminetetraacetic acid (EDTA)).

In some embodiments, pharmaceutical compositions comprise one or more auxiliary substances such as wetting or emulsifying agents, preservatives (e.g., benzyl alcohol) or buffers, which may enhance the shelf life and/or effectiveness of antibodies disclosed herein.

Pharmaceutical compositions may be provided in any of a variety of forms. These include, for example, liquid, semi-solid and solid dosage forms, such as liquid solutions (e.g., injectable and infusible solutions), dispersions or suspensions, tablets, pills, powders, liposomes and suppositories. Suitability of certain forms may depend on the intended mode of administration and therapeutic application.

In some embodiments, pharmaceutical compositions are in the form of injectable or infusible solutions.

Pharmaceutical compositions are typically sterile and stable under conditions of manufacture, transport, and storage. Pharmaceutical compositions may be formulated as, for example, a solution, microemulsion, dispersion, liposome, or other ordered structure. In some embodiments, a pharmaceutical composition is formulated as a structure particularly suitable for high drug concentration. For example, sterile injectable solutions can be prepared by incorporating a therapeutic agent (e.g., antibody) in a desired amount in an appropriate solvent with one or a combination of ingredients enumerated herein, optionally followed by sterilization (e.g., filter sterilization). Generally, dispersions may be prepared by incorporating an antibody into a sterile vehicle that contains a basic dispersion medium and other ingredient(s) such as those additional ingredients mentioned herein. In the case of sterile powders for the preparation of sterile injectable solutions, examples of preparation methods include vacuum drying and freeze-drying to yield a powder of the antibody and any additional desired ingredient(s), e.g., from a previously sterile-filtered solution thereof.

Proper fluidity of a solution can be maintained, for example, by the use of a coating such as lecithin, by maintaining certain particle sizes (e.g., in the case of dispersions), and/or by using surfactants. Prolonged absorption of injectable compositions can be brought about, e.g., by including in the composition an agent that delays absorption (for example, monostearate salts and/or gelatin).

Methods of Treatment

Methods of treatment disclosed herein generally comprise a step of administering a therapeutically effective amount of an IL-23 binding protein (or pharmaceutical composition thereof) of the present disclosure to a mammalian subject (e.g., a human subject) in need thereof. In one aspect, provided are methods of treatment comprising a step of co-administering (1) an IL-23 binding protein (or pharmaceutical composition thereof) as disclosed herein and (2) a second therapeutic agent to a mammalian (e.g., human) subject in an amount that is therapeutically effective when co-administered.

In some embodiments, the subject has or is at risk of having an inflammatory bowel disease. In some embodiments, the inflammatory bowel disease is Crohn's disease or ulcerative colitis. In some embodiments, the inflammatory bowel disease is ulcerative colitis. In some embodiments, the inflammatory bowel disease is Crohn's disease.

In some embodiments, the subject has or is at risk of having an inflammatory disease or condition. In some embodiments, the inflammatory disease is psoriasis. In some embodiments, the inflammatory disease is psoriatic arthritis. In some embodiments, the inflammatory disease is hidradenitis suppurativa.

Therapeutically effective amounts may be administered via a single dose or via multiple doses (e.g., at least two, at least three, at least four, at least five, at least six, at least seven, at least eight, at least nine, or at least ten doses). When administered via multiple doses, any of a variety of suitable therapeutic regimens may be used, including administration at regular intervals (e.g., once every other day, once every three days, once every four days, once every five days, thrice weekly, twice weekly, once a week, once every two weeks, once every three weeks, etc.).

The dosage regimen (e.g., amounts of each therapeutic, relative timing of therapies, etc.) that is effective in methods of treatment may depend on the severity of the disease or condition and the weight and general state of the subject. For example, the therapeutically effective amount of a particular composition comprising a therapeutic agent (e.g., an IL-23 binding protein of the present disclosure) applied to mammals (e.g., humans) can be determined by the ordinarily-skilled artisan with consideration of individual differences in age, weight, and the condition of the mammal.

Therapeutically effective and/or optimal amounts can also be determined empirically by those of skill in the art. In some embodiments, subjects are administered a dose of about 75 mg to about 800 mg, about 250 mg to about 750 mg, about 300 mg to about 700 mg, about 300 mg to about 600 mg, about 300 mg to about 500 mg, or about 300 mg to about 400 mg. In some embodiments, subjects are administered a dose of about 75 mg to about 150 mg, about 400 mg to about 700 mg, about 400 mg to about 600 mg, about 300 mg to about 500 mg, about 500 mg to about 700 mg, about 500 mg to about 600 mg, or about 600 mg to about 700 mg. In some embodiments, subject as administered a dose of about 75 mg, about 100 mg, about 125 mg, about 150 mg, about 175 mg, about 200 mg, about 225 mg, about 250 mg, about 275 mg, about 300 mg, about 350 mg, about 400 mg, about 450 mg, about 500 mg, about 550 mg, about 600 mg, about 650 mg, or about 700 mg.

IL-23 binding proteins or pharmaceutical compositions thereof may be administered by any of a variety of suitable routes, including, but not limited to, systemic routes such as parenteral (e.g., intravenous or subcutaneous) or enteral routes. For example, methods may comprise intravenous, intratumoral, intramuscular, subcutaneous, intralesional, intraintestinal, intracolonic, intrarectal, intrapouch, intraperitoneal administration, or a combination thereof. In some embodiments, provided methods administration through a parenteral route such as intravenous, intramuscular, subcutaneous, intraarterial, intraperitoneal administration, or a combination thereof.

In some embodiments, methods comprise subcutaneous administration. In some embodiments, methods comprise intravenous administration.

Administration of an IL-23 binding protein or pharmaceutical composition thereof can occur at various intervals. In some embodiments, the subject is administered at least once at an interval more than 8 weeks. In some embodiments, the interval is about 12 to about 26 weeks, about 12 to about 22 weeks, about 12 to about 18 weeks, about 12 to about 14 weeks, about 16 to about 26 weeks, about 16 to about 22 weeks, about 16 to about 18 weeks, about 20 to about 26 weeks, or about 20 to about 22 weeks. In some embodiments, the interval is about 12 weeks. In some embodiments, the interval is about 16 weeks. In some embodiments, the interval is about 26 weeks.

In some embodiments, administration results in a measurable improvement in the subject. For example, this improvement may include an improvement in a clinical score associated with the condition or disease for which the subject is being treated.

Methods of Preparation

The IL-23 binding proteins described herein can be made using recombinant DNA technology well known to a skilled person in the art. For example, one or more isolated polynucleotides encoding the IL-23 binding protein can be ligated to other appropriate nucleotide sequences, including, for example, constant region coding sequences, and expression control sequences, to produce conventional gene expression constructs (i.e., expression vectors) encoding the desired IL-23 binding proteins. Production of defined gene constructs is within routine skill in the art.

Nucleic acids encoding desired IL-23 binding proteins can be incorporated (ligated) into expression vectors, which can be introduced into host cells through conventional transfection or transformation techniques. Exemplary host cells are E. coli cells, Chinese hamster ovary (CHO) cells, human embryonic kidney 293 (HEK 293) cells, HeLa cells, baby hamster kidney (BHK) cells, monkey kidney cells (COS), human hepatocellular carcinoma cells (e.g., Hep G2), and myeloma cells that do not otherwise produce IgG protein. Transformed host cells can be grown under conditions that permit the host cells to express the genes that encode IL-23 binding proteins.

Specific expression and purification conditions will vary depending upon the expression system employed. For example, if a gene is to be expressed in E. coli, it is first cloned into an expression vector by positioning the engineered gene downstream from a suitable bacterial promoter, e.g., Trp or Tac, and a prokaryotic signal sequence. The expressed protein may be secreted. The expressed protein may accumulate in refractile or inclusion bodies, which can be harvested after disruption of the cells by French press or sonication. The refractile bodies can then be solubilized, and the protein may be refolded and/or cleaved by methods known in the art.

If the engineered gene is to be expressed in eukaryotic host cells, e.g., CHO cells, it is first inserted into an expression vector containing a suitable eukaryotic promoter, a secretion signal, a poly A sequence, and a stop codon. Optionally, the vector or gene construct may contain enhancers and introns. In embodiments involving fusion proteins comprising an IL-23 binding protein or portion thereof, the expression vector optionally contains sequences encoding all or part of a constant region, enabling an entire, or a part of, a heavy or light chain to be expressed. The gene construct can be introduced into eukaryotic host cells using conventional techniques.

In some embodiments, in order to express an IL-23 binding protein, an N-terminal signal sequence is included in the protein construct. Exemplary N-terminal signal sequences include signal sequences from interleukin-2, CD-5, IgG kappa light chain, trypsinogen, serum albumin, and prolactin.

After transfection, single clones can be isolated for cell bank generation using methods known in the art, such as limited dilution, ELISA, FACS, microscopy, or Clonepix. Clones can be cultured under conditions suitable for bioreactor scale-up and maintained expression of the IL-23 binding proteins.

The IL-23 binding proteins can be isolated and purified using methods known in the art including centrifugation, depth filtration, cell lysis, homogenization, freeze-thawing, affinity purification, gel filtration, ion exchange chromatography, hydrophobic interaction exchange chromatography, and mixed-mode chromatography.

EXAMPLES

Example 1. Affinity Maturation of Anti-IL-23p19 Antibody

This Example describes the generation of IL-23 antibody clone 107. (See Table 1.)

An anti-human IL-23p19 antibody whose sequences are shown in Table 3 below ("Reference Antibody 1") was used as a parental antibody for further CDR diversification to identify clones with improvements in potency, manufacturability, and pharmacokinetics.

TABLE 3

Characteristic sequences of Reference Antibody 1
CDR sequences shown are according to Kabat.

| Heavy chain | Light chain |
|---|---|
| Full sequence | Full sequence |
| QVQLVQSGAEVKKPGSSVKVSCKASGYTFTDQ | DIQMTQSPSSLSASVGDRVTITCKASRDVAIAV |
| TIHWMRQAPGQGLEWIGYIYPRDDSPKYNENF | AWYQQKPGKVPKLLIYWASTRHTGVPSRFSGSG |
| KGKVTITADKSTSTAYMELSSLRSEDTAVYYC | SRTDFTLTISSLQPEDVADYFCHQYSSYPFTFG |
| AIPDRSGYAWFIYWGQGTLVTVSSASTKGPSV | SGTKLEIKRTVAAPSVFIFPPSDEQLKSGTASV |
| FPLAPSSKSTSGGTAALGCLVKDYFPEPVTVS | VCLLNNFYPREAKVQWKVDNALQSGNSQESVTE |
| WNSGALTSGVHTFPAVLQSSGLYSLSSVVTVP | QDSKDSTYSLSSTLTLSKADYEKHKVYACEVTH |
| SSSLGTQTYICNVNHKPSNTKVDKRVEPKSCD | QGLSSPVTKSFNRGEC |
| KTHTCPPCPAPEAAGGPSVFLFPPKPKDTLMI | (SEQ ID NO: 156) |
| SRTPEVTCVVVDVSHEDPEVKFNWYVDGVEVH | Variable domain (VL) |
| NAKTKPREEQYNSTYRVVSVLTVLHQDWLNGK | DIQMTQSPSSLSASVGDRVTITCKASRDVAIAV |
| EYKCKVSNKALPAPIEKTISKAKGQPREPQVY | AWYQQKPGKVPKLLIYWASTRHTGVPSRFSGSG |
| TLPPSREEMTKNQVSLTCLVKGFYPSDIAVEW | SRTDFTLTISSLQPEDVADYFCHQYSSYPFTFG |
| ESNGQPENNYKTTPPVLDSDGSFFLYSKLTVD | SGTKLEIK |
| KSRWQQGNVFSCSVMHEALHNHYTQKSLSLSP | (SEQ ID NO: 113) |
| G | CDR-L1: |
| (SEQ ID NO: 155) | KASRDVAIAVA |
| Variable domain (VH) | (SEQ ID NO: 117) |
| QVQLVQSGAEVKKPGSSVKVSCKASGYTFTDQ | CDR-L2: |
| TIHWMRQAPGQGLEWIGYIYPRDDSPKYNENF | WASTRHT |
| KGKVTITADKSTSTAYMELSSLRSEDTAVYYC | (SEQ ID NO: 118) |
| AIPDRSGYAWFIYWGQGTLVTVSS | CDR-L3: |
| (SEQ ID NO: 112) | HQYSSYPFT |
| CDR-H1: | (SEQ ID NO: 119) |
| DQTIH | |
| (SEQ ID NO: 114) | |

TABLE 3-continued

Characteristic sequences of Reference Antibody 1
CDR sequences shown are according to Kabat.

| Heavy chain | Light chain |
|---|---|
| CDR-H2:<br>YIYPRDDSPKYNENFKG<br>(SEQ ID NO: 115)<br>CDR-H3:<br>PDRSGYAWFIY<br>(SEQ ID NO: 116) | |

Site-directed PCR mutagenesis was employed to generate distinct libraries for heavy chain CDR1/2 and heavy chain CDR3. Additionally, an additional library consisting of naïve human kappa light chain CDRs was prepared. This approach resulted in 3 unique libraries. Individual mutants were displayed as Fabs in a phage display system and within each library, mutants were panned through two or three rounds of selection.

For the heavy chain mutant libraries, the first round of selection consisted of 0.01 nM biotinylated human IL-23 (hIL-23) while also being washed for 2 hours at room temperature in buffer containing 1 nM unlabeled hIL-23. The output of that round was subsequently split into four distinct secondary rounds of parallel selection consisting of A) 0.01 nM biotinylated hIL-23 while also being washed for 20 hours at room temperature in buffer containing 10 nM of unlabeled hIL-23, B) 0.001 nM biotinylated hIL-23 while also being washed for 20 hours at room temperature in buffer containing 1 nM of unlabeled hIL-23, C) 0.01 nM biotinylated cynomolgus monkey IL-23 (cyIL-23) while also being washed for 20 hours at room temperature in buffer containing 10 nM of unlabeled cyIL-23, and D) 0.001 nM biotinylated cyIL-23 while also being washed for 20 hours at room temperature in buffer containing 1 nM of unlabeled cyIL-23.

For the light chain mutant libraries, the first round of selection consisted of 10 nM biotinylated hIL-23 while also being washed for 2 hours at room temperature in buffer containing 1000 nM unlabeled hIL-23. The output of that round was subsequently split into two distinct secondary rounds of parallel selection consisting of A) 1 nM biotinylated hIL-23 while also being washed for 16 hours at room temperature in buffer containing 100 nM of unlabeled hIL-23, B) 0.1 nM biotinylated hIL-23 while also being washed for 16 hours at room temperature in buffer containing 10 nM of unlabeled hIL-23. These outputs were then subsequently split into two additional tertiary rounds of parallel selection consisting of A) 0.1 nM biotinylated cyIL-23 while also being washed for 20 hours at room temperature in buffer containing 100 nM of unlabeled cyIL-23 and B) 0.01 nM biotinylated cyIL-23 while also being washed for 20 hours at room temperature in buffer containing 10 nM of unlabeled cyIL-23.

Mutant clones from the output of each arm of secondary and tertiary selection were analyzed for off rate (kd) as a proxy for binding affinity by using periplasmic extracts of each mutant clone through surface plasmon resonance (SPR) using a BIACORE™ 8K+ SPR system (Cytiva). Sensor chips (Series S Sensor Chip CM5-Cytiva) were prepared by immobilizing hIL-23 (Acro Biosciences) and interaction with periplasmic extracts was analyzed in order to determine the kd. Bioinformatic analyses of sequences to identify patterns of enrichment were also employed to characterize mutant clones. Mutants that exhibited no loss or improved binding relative to the reference antibody as well as population enrichment throughout the selection were combined into a single library comprising all mutants in both the heavy and light chain.

Clones containing a random combinatorial mix of these individual CDR mutants were again screened in a phage display system, with multiple combinations of selection strategies outlined in Table 4. Mutant clones from the output of each arm of secondary selection were once again analyzed for kd as described.

TABLE 4

| Strategy | Round 1 Selection | Round 2 Selection |
|---|---|---|
| Strategy 1 | Antigen: 0.01 nM biotinylated hIL-23<br>Wash: 16 hr R.T w/1 nM unlabeled hIL- | Antigen: 0.01 nM biotinylated hIL-23<br>Wash: 48 hr R.T. w/1 nM unlabeled hIL-23 |
| Strategy 2 | Antigen: 0.01 nM biotinylated hIL-23<br>Wash: 16 hr R.T w/1 nM unlabeled hIL-23 | Antigen: 0.001 nM biotinylated hIL-23<br>Wash: 24 hr R.T. w/1 nM unlabeled hIL-23 |
| Strategy 3 | Antigen: 0.01 nM biotinylated hIL-23<br>Wash: 16 hr R.T w/1 nM unlabeled hIL-23 | Antigen: 0.0001 nM biotinylated hIL-23<br>Wash: 24 hr R.T. w/0.1 nM unlabeled hIL-23 |
| Strategy 4 | Antigen: 0.01 nM biotinylated hIL-23<br>Wash: 16 hr R.T w/1 nM unlabeled hIL-23 | Antigen: 0.001 nM biotinylated cyIL-23<br>Wash: 24 hr R.T. w/1 nM unlabeled cyIL-23 |
| Strategy 5 | Antigen: 0.01 nM biotinylated hIL-23<br>Wash: 16 hr R.T w/1 nM unlabeled hIL-23 | Antigen: 0.0001 nM biotinylated cyIL-23<br>Wash: 24 hr R.T. w/0.1 nM unlabeled cyIL-23 |

Mutant clones of interest were then reformatted to full antibody format. Briefly, the coding sequences for the heavy chain and light chain of the antibody were generated by DNA synthesis and PCR, then subsequently subcloned into plasmids for protein expression in a mammalian cell system. The gene sequences in the expression vectors were confirmed by DNA sequencing. Antibodies were then purified by a two-step affinity chromatography (Protein A) and size-exclusion chromatography process.

Example 2. Humanization of an Anti-IL-23p19 Antibody

This example describes the generation of IL-23 antibody clones 202 and 203. (See Table 1.)

Complementarity-determining region (CDR) grafting technology was used to humanize the parental mouse hybridoma sequence Reference Antibody 1. (See Table 3 above.)

The parental mAb light chain sequence of the mouse hybridoma sequence was compared to a group of human variable region light chain (VK) germline amino acid sequences (Lefranc, M.-P. IMGT, the international ImMunoGeneTics database; Nucleic Acids Res., 29, D207-209 (2001). DOI: 10.1093/nar/29.1.207. PMID: 11125093). Human germline IGKV3-15 and human germline IGKJ4 were selected.

The parental mAb heavy chain sequence of the mouse hybridoma sequence was compared to a group of human variable region heavy chain (VH) germline amino acid sequences (Lefranc, M.-P. IMGT, the international ImMunoGeneTics database; Nucleic Acids Res., 29, D207-209 (2001). DOI: 10.1093/nar/29.1.207. PMID: 11125093). Human germline IGKV3-23 and human germline IGHJ6 were selected.

The resulting humanized VL and VH were then combined and reformatted to full antibody format, generating antibody clones 202 and 203. Briefly, the coding sequences for the heavy chain and light chain of the antibody were generated by DNA synthesis and PCR, then subsequently subcloned into plasmids for protein expression in a mammalian cell system. The gene sequences in the expression vectors were confirmed by DNA sequencing. Antibodies were then purified by a two-step affinity chromatography (Protein A) and size-exclusion chromatography process.

Example 3: Determination of Antibody Affinity to IL-23

Binding affinity ($K_D$) of antibodies to human IL-23 (clones 107, 202, and 203) was determined through surface plasmon resonance (SPR) using a BIACORE™ 8K SPR system (Cytiva). Reference Antibody 1 was used as a comparator. Series S Sensor Chip CM5 (Cytiva) sensor chips were prepared by immobilizing goat anti-human IgG (Jackson ImmunoResearch) and ultimately used to determine the binding kinetic rate and affinity constants at 25° C. and in a running buffer of HBS-P+ (10 mM HEPES pH 7.4, 150 mM NaCl, 0.05% Surfactant P20). Anti-IL23 mAb constructs (diluted to 2 μg/mL) were captured onto flow cell 2 (active) for 60 sec at a flow rate of 10 μL/min. Recombinant Human IL-23 was prepared at concentrations of 0, 1.23, 3.7, 11.11, 33.33, 100 nM and injected over flow cell 1 (reference) and flow cell 2 (active) for 180 sec at a flow rate of 50 μL/min. Samples were injected in a multi-cycle manner over freshly captured mAb, by regenerating the capture surfaces with injection of 10 mM glycine, pH 1.5 for 30 sec at a flow rate of 30 μL/min. A 1:1 kinetic binding model was utilized to determine the apparent association ($k_a$) and dissociation ($k_d$) rate constants. Their ratio provides the apparent equilibrium dissociation constant or affinity constant ($K_D=k_d/k_a$). Results for the clone of interest are shown in Table 4.

Under the conditions tested, the tested antibodies (clones 107, 202, and 203) had dissociation rate constants below the limit of detection of BIACORE™ 8K SPR (which is $1\times10^{-6}$ 1/s). Therefore, an exact $k_d$ (and therefore $K_D$ value) could not be determined. However, based on the $k_a$ values shown in Table 5 below, the affinities of all these clones have $K_D$ values of less than 6 pM and appear to have comparable or improved $K_D$ values as compared to Reference Antibody 1.

TABLE 5

| Antibody | hIL-23 $k_a$ (1/Ms) | hIL-23 $k_d$ (1/s) | hIL-23 $K_D$ (nM) |
|---|---|---|---|
| Reference Antibody 1 | $1.67 \times 10^5$ | $<1 \times 10^{-6}$ | ND |
| Clone 107 | $1.87 \times 10^5$ | $<1 \times 10^{-6}$ | ND |
| Clone 202 | $2.10 \times 10^5$ | $<1 \times 10^{-6}$ | ND |
| Clone 203 | $2.71 \times 10^5$ | $<1 \times 10^{-6}$ | ND |

Example 4: Inhibition of IL-23-Induced Activation of STAT3 in HEK 293F IL-23R+/IL-12Rβ1+ STAT3 Luciferase Reporter Cell Inhibition of STAT3 activation in HEK 293F cells expressing IL-23R, IL-12R1, and a STAT3-linked luciferase reporter was used to evaluate the functional activity of IL-23 antibody clones 107, 202, or 203 to block IL-23-induced biological activity. Reference Antibody 1 was used as a comparator. Briefly, reporter cells were seeded into a 96-well plate. A mixture of hIL-23 and purified IL-23 antibodies were allowed to associate for 30 min at room temperature before adding to cells, resulting in a final concentration of 20 ng/mL of hIL-23 and 0-50 nM of antibody. Cells were incubated at 37° C. for 5 hours and subsequently lysed with One-Glo luciferase assay buffer (Promega) at room temperature for 10 min under dark conditions. Luminescence was quantified by a SpectraMax® M5e plate reader (Molecular Devices) and subsequent data were analyzed using GraphPad Prism. $IC_{50}$ values were determined as the concentration of antibody required to inhibit 50% of the maximum luminescent signal detected with incubation of 20 ng/mL of hIL-23 alone.

As shown in Table 6, antibody clones 107, 202, and 203 demonstrated more effective inhibition of IL-23-induced activation of STAT3 as compared to Reference Antibody 1.

TABLE 6

| Antibody | Relative $IC_{50}$ |
|---|---|
| Reference Antibody 1 | 1.00 |
| Clone 107 | 0.57 |
| Clone 202 | 0.76 |
| Clone 203 | 0.66 |

Values relative to Reference Antibody 1. <1.00 is more potent.

Example 5: Inhibition of IL-23-Induced Phosphorylation of STAT3 in DB Cells

Inhibition of STAT3 phosphorylation in DB cells was used to evaluate the functional activity of antibodies to block IL-23-induced biological activity substantially as described below.

Briefly, $6\times10^5$ DB cells were seeded into TC-treated round-bottom 96-well plates. A mixture of hIL-23 and purified IL-23 antibodies (clone 107, 202, 203, or Reference Antibody 1) were allowed to associate for 1 hr at room temperature before adding to cells, resulting in a final concentration of 25 ng/mL of hIL-23 and 0-10 nM of antibody. Cells were incubated at 37° C. for 1 hr and phosphorylated STAT3 (pSTAT3) was quantified using a pSTAT3 Sandwich ELISA kit (Cell Signaling Technology). Subsequent data were analyzed using GraphPad Prism. $IC_{50}$ values were determined as the concentration of antibody required to inhibit 50% of the maximum pSTAT levels detected with incubation of 25 ng/ml of hIL-23 alone.

As shown in Table 7, clone 107 demonstrated improved inhibition of IL-23-induced phosphorylation of STAT3 as compared to Reference Antibody 1. Clones 202 and 203 exhibited comparable inhibition of IL-23-induced phosphorylation of STAT3 as compared to Reference Antibody 1.

TABLE 7

| Antibody | Relative $IC_{50}$ |
|---|---|
| Reference Antibody 1 | 1.00 |
| Clone 107 | 0.51 |

Values relative to Reference Antibody 1. <1.00 is more potent.

Example 6: Inhibition of IL-23-Induced Release of IL-17

Inhibition of IL-17 release was also assessed in both mouse splenocytes and human peripheral blood mononuclear cells (PBMCs). Reference Antibody 1 was used as a comparator.

Mouse Splenocyte Assay

Inhibition of IL-17 release from murine splenocytes was used to evaluate the functional activity of IL-23 antibody clones 107, 202, and 203 to block IL-23-induced biological activity. Briefly, fresh spleen tissues were harvested from adult C57BL/6 female mice (6-8 weeks) and were teased through a sterile 70-μm nylon cell strainer. Splenocytes were then treated with RBC lysis buffer (eBioscience) at room temperature for 5 min and single-cell suspensions were seeded at a density of $5 \times 10^6$ cells/ml. Anti-IL-23 antibodies and human IL-23 were allowed to associate for 30 min at room temperature before adding to cells, resulting in a final concentration of 100 ng/mL of human IL-23 and a range of antibody concentrations from 0-25 nM. Cells were incubated at 37° C. for 72 hr. IL-17 released in the supernatant was measured using mouse IL-17 ELISA (R&D systems). Subsequent data were analyzed using GraphPad Prism. $IC_{50}$ values were determined as the concentration of antibody required to inhibit 50% of the maximum IL-17 response.

Clones 107, 202, and 203 demonstrated comparable or improved inhibition of IL-23 induced release of IL-17 as compared to Reference Antibody 1.

Human PBMCs Assay

Inhibition of IL-17 release from human PBMCs was used to evaluate the functional activity of IL-23 antibody clones 107, 202, and 203 to block IL-23-induced biological activity. Reference Antibody 1 was used as a comparator. Briefly, frozen human PBMCs were seeded at a density of $5 \times 10^6$ cells/ml. Anti-IL-23 antibodies and human IL-23 were allowed to associate for 30 min at room temperature before adding to cells, resulting in a final concentration of 300 ng/ml of human IL-23 and a range of antibody concentrations from 0-400 nM. Cells were incubated at 37° C. for 72 hr. IL-17 released in the supernatant was measured using human IL-17 ELISA (Thermo). Subsequent data were analyzed using GraphPad Prism. $IC_{50}$ values were determined as the concentration of antibody required to inhibit 50% of the maximum IL-17 response.

The drawing shows results from these assays. As shown in the drawing and Table 8, clones 107, 202, and 203 all demonstrated superior inhibition of IL-23 induced release of IL-17 as compared to Reference Antibody 1.

TABLE 8

| Antibody | Relative $IC_{50}$ |
|---|---|
| Reference Antibody 1 | 1.00 |
| Clone 107 | 0.67 |
| Clone 202 | 0.79 |
| Clone 203 | 0.78 |

Values relative to Reference Antibody 1. <1.00 is more potent.

Similar improvements were also observed with clones 107, 202, and 203 in comparison with Reference Antibody 2, whose sequences are shown in Table 9 below.

TABLE 9

Reference Antibody 2-characteristic sequences
CDR sequences shown are according to Kabat.

| Heavy chain variable domain | Light chain variable domain |
|---|---|
| EVQLVQSGAEVKKPGESLKISCKGSGYSFSNY WIGWVRQMPGKGLEWMGIIDPSNSYTRYSPSF QGQVTISADKSISTAYLQWSSLKASDTAMYYC ARWYYKPFDVWGQGTLVTVSS (SEQ ID NO: 157) CDR-H1: NYWIG (SEQ ID NO: 159) CDR-H2: IIDPSNSYTRYSPSFQG (SEQ ID NO: 160) CDR-H3: WYYKPFDV (SEQ ID NO: 161) | QSVLTQPPSVSGAPGQRVTISCTGSSSNIGSGY DVHWYQQLPGTAPKLLIYGNSKRPSGVPDRFSG SKSGTSASLAITGLQSEDEADYYCASWTDGLSL VVFGGGTKLTVL (SEQ ID NO: 158) CDR-L1: TGSSSNIGSGYDVH (SEQ ID NO: 162) CDR-L2: GNSKRPS (SEQ ID NO: 163) CDR-L3: ASWTDGLSLVV (SEQ ID NO: 164) |

Summary of Examples 3-6

These results demonstrate that clones 107, 202, and 203 exhibited improvement over Reference Antibody 1 and Reference Antibody 2 in inhibiting IL-23-induced release of IL-17 in a human PBMC assay (the most physiologically relevant assay performed in these Examples given the use of human primary cells) and/or in inhibiting pSTAT3 activation (as assessed in HEK93 cells). At the same time, clones 107, 202, and 203 maintained or improved other functional aspects of Reference Antibody 1 (e.g., IL-23 binding affinity or inhibition of pSTAT3 phosphorylation).

Example 7: Pharmacokinetic (PK) Analysis of IL-23p19 Binding Proteins in Cynomolgus Monkey In order to evaluate the impact of half-life extension mutations on IL-23 antibody clones 107, 202, and 203, male cynomolgus monkeys (*Macaca fascicularis*) were administered a single bolus dose (50 mg/kg) of each clone, as well as Reference Antibody 1, by either intravenous (IV) and/or subcutaneous (SC) injection on Day 0. Serum samples were taken regularly through the study.

Half-life was determined from cynomolgus serum samples for each dose-cohort up to day 91. As shown in Table 10A, the β-elimination half-life of each clone was significantly extended in comparison to the β-elimination half-life of Reference Antibody 1. Tables 10B depicts clearance and half-life values relative to Reference Antibody 1.

TABLE 10A

|  | Clearance (mL/day/kg) | | Half-life (days) | |
| --- | --- | --- | --- | --- |
|  | IV | SC | IV | SC |
| Reference Antibody 1 | 10.7 | 12.3 | 9.6 | 9.4 |
| Clone 107 | 3.4 | 5.1 | 26.7 | 20.4 |
| Clone 202 | 2.1 | 2.9 | 33.9 | 30.3 |
| Clone 203 | 2.4 | 3.3 | 30.0 | 26.9 |

TABLE 10B

|  | Clearance relative to Reference Antibody 1 | | Half-life relative to Reference Antibody 1 | |
| --- | --- | --- | --- | --- |
|  | IV | SC | IV | SC |
| Reference Antibody 1 | 1.0 | 1.0 | 1.0 | 1.0 |
| Clone 107 | 0.3 | 0.4 | 2.8 | 2.2 |
| Clone 202 | 0.2 | 0.2 | 3.5 | 3.2 |
| Clone 203 | 0.2 | 0.3 | 3.1 | 2.9 |

EQUIVALENTS

The entire disclosure of each of the patent documents and scientific articles referred to herein is incorporated by reference for all purposes.

The disclosure may be embodied in other specific forms without departing from the spirit or essential characteristics thereof. The foregoing embodiments are therefore to be considered in all respects illustrative rather than limiting the disclosure described herein. Various structural elements of the different embodiments and various disclosed method steps may be utilized in various combinations and permutations, and all such variants are to be considered forms of the disclosure. Scope of the disclosure is thus indicated by the appended claims rather than by the foregoing description, and all changes that come within the meaning and range of equivalency of the claims are intended to be embraced therein.

The invention claimed is:

1. An interleukin 23 (IL-23) binding protein comprising a heavy chain variable domain (VH) comprising the amino acid sequence of SEQ ID NO: 145, and a light chain variable domain (VL) comprising the amino acid sequence of SEQ ID NO: 146.

2. The IL-23 binding protein of claim 1, wherein the IL-23 binding protein is a full antibody or an antigen-binding fragment thereof.

3. The IL-23 binding protein of claim 2, comprising an Fc region.

4. The IL-23 binding protein of claim 3, wherein the Fc region is a human IgG1, IgG2, or IgG4 Fc region.

5. The IL-23 binding protein of claim 4, wherein the Fc region is a modified human IgG1 Fc region.

6. The IL-23 binding protein of claim 5, wherein the modified human IgG1 Fc region comprises a half-life extending mutation or set of mutations.

7. The IL-23 binding protein of claim 6, wherein the modified human IgG1 Fc region comprises amino acid modifications M252Y, S254T, and T256E and/or M428L and N434S, all according to EU numbering system.

8. The IL-23 binding protein of claim 7, wherein the modified human IgG1 Fc region further comprises amino acid modifications L234A and L235A according to EU numbering system.

9. The IL-23 binding protein of claim 8, wherein the modified human IgG1 Fc region comprises an Fc chain having the amino acid sequence of SEQ ID NO: 15.

10. The IL-23 binding protein of claim 1 comprising a heavy chain comprising the amino acid sequence of SEQ ID NO: 143, and/or a light chain comprising the amino acid sequence of SEQ ID NO: 144.

11. The IL-23 binding protein of claim 5, wherein the Fc region comprises amino acid modifications M252Y, S254T, and T256E according to EU numbering system.

12. The IL-23 binding protein of claim 11, wherein the modified Fc region further comprises amino acid modifications L234A and L235A according to EU numbering system.

13. The IL-23 binding protein of claim 12, wherein the modified Fc region comprises an Fc chain having the amino acid sequence of SEQ ID NO: 15.

14. The IL-23 binding protein of claim 1 comprising a light chain comprising the amino acid sequence of SEQ ID NO: 144.

15. The IL-23 binding protein of claim 1 comprising a light chain comprising the amino acid sequence of SEQ ID NO: 144 and a heavy chain comprising the amino acid sequence of SEQ ID NO: 143.

16. A composition comprising the IL-23 binding protein of claim 1 and a pharmaceutically acceptable carrier.

17. A composition comprising the IL-23 binding protein of claim 13 and a pharmaceutically acceptable carrier.

18. An isolated nucleic acid encoding an interleukin 23 (IL-23) binding protein, wherein the IL-23 binding protein comprises a heavy chain variable domain (VH) comprising the amino acid sequence of SEQ ID NO: 145, and a light chain variable domain (VL) comprising the amino acid sequence of SEQ ID NO: 146.

19. The isolated nucleic acid of claim 18, wherein the IL-23 binding protein is a full antibody or antigen-binding fragment thereof.

20. The isolated nucleic acid of claim 19, wherein the IL-23 binding protein comprises a human IgG1 Fc region that comprises amino acid modifications M252Y, S254T, and T256E and/or M428L and N434S, all according to EU numbering system.

21. The isolated nucleic acid of claim 20, wherein the human IgG1 Fc region further comprises amino acid modifications L234A and L235A according to EU numbering system.

22. The isolated nucleic acid of claim 21, wherein the human IgG1 Fc region comprises an Fc chain having the amino acid sequence of SEQ ID NO: 15.

23. The isolated nucleic acid of claim 18, wherein the IL-23 binding protein comprises a heavy chain comprising the amino acid sequence of SEQ ID NO: 143, and/or a light chain comprising the amino acid sequence of SEQ ID NO: 144.

24. The isolated nucleic acid of claim 19, wherein the IL-23 binding protein comprises a human IgG1 Fc region that comprises amino acid modifications M252Y, S254T, and T256E according to EU numbering system.

25. The isolated nucleic acid of claim 24, wherein the human IgG1 Fc region comprises an Fc chain having the amino acid sequence of SEQ ID NO: 15.

26. The isolated nucleic acid of claim 18, wherein the IL-23 binding protein comprises a light chain comprising the amino acid sequence of SEQ ID NO: 144.

27. The isolated nucleic acid of claim 18, wherein the IL-23 binding protein comprises a light chain comprising the amino acid sequence of SEQ ID NO: 144 and a heavy chain comprising the amino acid sequence of SEQ ID NO: 143.

28. An expression vector comprising the nucleic acid of claim 18.

29. An isolated host cell comprising the nucleic acid molecule of claim 18.

30. An isolated host cell comprising the expression vector of claim 28.

* * * * *